United States Patent
Rast

(10) Patent No.: US 7,190,260 B2
(45) Date of Patent: Mar. 13, 2007

(54) REACTION ADVANTAGE ANTI-COLLISION SYSTEMS AND METHODS

(76) Inventor: Rodger H. Rast, Rastar Corporation 11230 Gold Express Dr. Suite 310 MS 337, Gold River, CA (US) 95670

( * ) Notice: Subject to any disclaimer, the term of this patent is extended or adjusted under 35 U.S.C. 154(b) by 0 days.

(21) Appl. No.: 11/437,356

(22) Filed: May 19, 2006

(65) Prior Publication Data

US 2006/0220826 A1   Oct. 5, 2006

Related U.S. Application Data

(63) Continuation of application No. 09/730,327, filed on Dec. 5, 2000, now abandoned.

(60) Provisional application No. 60/153,084, filed on Sep. 9, 1999.

(51) Int. Cl.
  *B60Q 1/44* (2006.01)

(52) U.S. Cl. .............. 340/479; 340/467; 340/903; 340/905; 340/901; 340/686.1

(58) Field of Classification Search .............. None
See application file for complete search history.

(56) References Cited

U.S. PATENT DOCUMENTS

| | | | | |
|---|---|---|---|---|
| 3,876,940 A | * | 4/1975 | Wickord et al. ............ 455/341 |
| 4,107,647 A | * | 8/1978 | Yoshino ...................... 340/467 |
| 5,369,591 A | * | 11/1994 | Broxmeyer ................. 701/301 |
| 5,424,726 A | * | 6/1995 | Beymer ...................... 340/902 |
| 5,717,377 A | * | 2/1998 | Gao ........................... 340/467 |
| 6,012,012 A | * | 1/2000 | Fleck et al. ................. 701/117 |
| 6,076,028 A | * | 6/2000 | Donnelly et al. ............ 701/45 |
| 6,100,799 A | * | 8/2000 | Fenk .......................... 340/467 |
| 6,121,896 A | * | 9/2000 | Rahman ..................... 340/902 |
| 6,225,896 B1 | * | 5/2001 | Sendowski ................. 340/467 |
| 6,278,360 B1 | * | 8/2001 | Yanagi ....................... 340/436 |
| 6,313,758 B1 | * | 11/2001 | Kobayashi .................. 340/932 |
| 6,437,688 B1 | * | 8/2002 | Kobayashi .................. 340/435 |
| 6,606,033 B1 | * | 8/2003 | Crocker et al. ............. 340/901 |
| 6,765,495 B1 | * | 7/2004 | Dunning et al. ............ 340/903 |

* cited by examiner

*Primary Examiner*—Benjamin C. Lee
(74) *Attorney, Agent, or Firm*—Rodger H. Rast

(57) ABSTRACT

A vehicle anti-collision system and method for is disclosed which provides drivers with additional time in which to react to significant roadway events which often precede accidents. The simplest implementation of the system and method (Phase I) employs a brake pedal mounted sensor packet for determining how hard a driver is braking. Hard braking information is relayed to approaching drivers by means of the reverse lights of the vehicle. Additional implementation phases (II through IV) are described wherein event information is communicated between vehicles over a communications link. Furthermore, additional vehicle information, such as an impact, swerving, emergency light activation, and roadway hazards may be communicated to approaching drivers by the communications link whereby drivers need not see the vehicle that has slammed on its brakes, or otherwise has created or responded to an event, in order to avoid an accident.

9 Claims, 27 Drawing Sheets

Side

Front

Emergency Flasher Sense

Driver Visual Alert Mounting

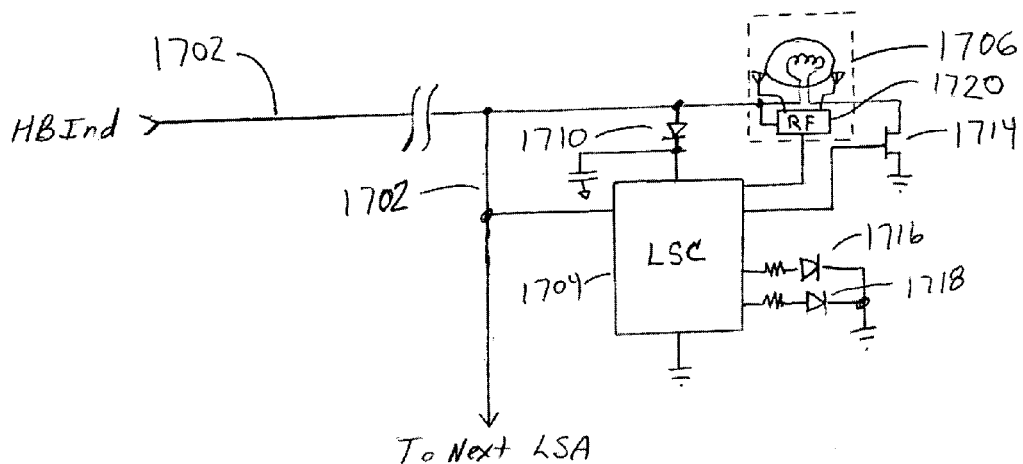
FIG. 36
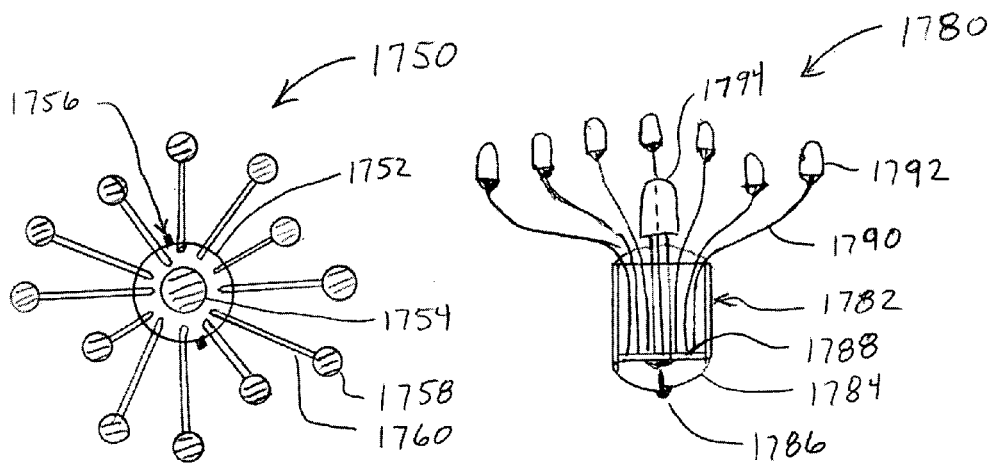
FIG. 37
FIG. 38

REACTION ADVANTAGE ANTI-COLLISION SYSTEMS AND METHODS

CROSS-REFERENCE TO RELATED APPLICATIONS

This application is a continuation of regular application Ser. No. 09/730,327 filed on Dec. 5, 2000, now abandoned. This application is associated in content with provisional patent application Ser. No. 60/153,084 filed Sep. 9, 1999, now abandoned.

This application also includes material from copending application Ser. No. 10/670,432 filed Sep. 23, 2003, which claimed priority from provisional patent application Ser. No. 60/413,199 filed Sep. 23, 2002;

This application also includes material from copending application Ser. No. 11/222,610 filed Sep. 9, 2005, which claimed priority from provisional patent application Ser. No. 60/608,789 filed Sep. 9, 2004;

These being commonly assigned with the present invention.

STATEMENT REGARDING FEDERALLY SPONSORED R&D

Not Applicable

REFERENCE TO A MICROFICHE APPENDIX

Not Applicable

BACKGROUND OF THE INVENTION

1. Field of the Invention

This invention pertains generally to vehicle safety devices and more particularly to a system and method for reducing vehicular rear-end collisions by the early sensing of events such as hard brake pedal activation and the communication of the said events to approaching vehicle so as to provide a reaction time advantage to drivers therein.

2. Description of the Background Art

Rear-end collisions on our highways are a major cause of serious injury. The incidence of rear-ends collisions has risen rapidly as our highway systems get increasingly congested. The bulk of these rear end collisions could be avoided, it is estimated by the National Highway Traffic Safety Administration (NHTSA) that about 88% of rear end collisions in the United States are caused by vehicles following too closely, and/or coupled with driver inattention. Further, it is estimated that rear-end collisions represent approximately 28% of all vehicle collisions nationwide. Rear-end collisions account for 36% of fatal and injury collisions in the state of California.

Drivers have been admonished and given a variety of guidelines for following distance, however, these have done little to alter driving habits. Drivers on the highway are often jockeying for position, and some feel that when attempting to follow at a "safe distance", the space just quickly fills with one or more vehicles. Unfortunately, when vehicles closely follow one another there is often insufficient time for a driver to respond to a situation and come to a stop prior to rear-ending the vehicle ahead. In existing vehicles, drivers are unable to gain sufficient information relating to the action of drivers and conditions farther up the road. Drivers may watch brake lights come on and go off again as they try to see what is occurring farther up the road. Often the view up ahead is obscured, or completely blocked, by the vehicle ahead, leaving the driver reliant on being extremely alert and having fast reaction times. Unfortunately drivers are also relying on luck which can run out at any time when the person ahead unexpected "slams" on the brakes. Under actual driving conditions, by the time a driver recognizes a "situation" they often have insufficient time to slow, or stop, in order to prevent colliding with another vehicle. Coming to a stop from highway speeds can require 3–4 seconds during which over 200 hundred feet of highway may be traversed. At highway speeds, every $\frac{1}{100}^{th}$ of a second that a driver delays in applying their brakes can translate to another foot of highway. The energy for these additional feet are often absorbed by the rear end of another vehicle. In many cases significant injuries may be prevented by decreasing reaction times by a few hundred milliseconds.

Another source of major rear-end accidents occurs within multi-car "pile-ups", where at times, over a hundred vehicles have been known to crash in a chain-reaction of rear-end collisions. These "pile-ups" are generally attributable to low visibility conditions which further reduce driver reaction time; by the time the problem is visually seen, there is not enough time to react at the speed being driven and another car is added to the pile of wreckage with additional lives often being lost.

Drivers have been continually admonished not to tailgate. Drivers know that they should not follow any closer than one car length for every 10 miles per hour of speed. Many drivers are also cognizant of the guidelines for driving in reduced visibility. Unfortunately under actual driving situations these driving guidelines appear to be widely ignored by drivers. Drivers push along trying to rely on their wits and reactions to save them from getting into an accident. Yet, given the wrong set of circumstances they will simply not be able to stop in time. Driver attitudes have been mentioned here because the success of any system or method attempting to reduce highway mortality must take driver attitudes and driving patterns into account. The rule of "one car length per 10 mph" is a simple system that technically works—however it totally ignores prevailing highway conditions and driver attitudes, and therefore is largely being ignored. More recently drivers have been directed to follow the "3 second rule", wherein drivers should follow the car ahead no less than 3 seconds. Again, the 3 second rule—if followed—would save lives. Unfortunately, drivers rarely follow such guidelines. Any system and method that is to have a wide range effect to lower the collision rate will be required to do so under prevailing highway conditions and driver attitudes.

Presently, the only alert provided by vehicles to approaching traffic is the brake light. It is interesting to note how the size and intensity of brake lights has increased over the years. In order to enhance recognition and driver response, brake lights have been made larger and brighter, while auxiliary deck mounted brake lights have been incorporated within vehicles. So important is quick recognition of braking that in fact it is a standard policy among numerous insurance companies to provide discounts for vehicles which incorporate the additional centrally mounted brake light. However, due to the still limited information conveyed, and coupled with the constant on/off flicking of brakes in traffic, a driver's reaction to seeing the brake lights come on one more time is rarely one of jumping to engage their own brakes. However, in many cases that reaction would be the only one capable of preventing an accident.

Numerous concepts have been considered for reducing rear-end collisions. The thought of computer driven automobiles, which control their own speed has perhaps been around since the advent of the first microcomputers. Programs at various automobile manufacturers, and universities have been testing elements of the concept for a number of years. However, wresting control of a vehicle from the driver is an approach that not only ignores driver attitudes, but ignores the complex dynamics that exist with highway driving. Recognizing the distance of objects or close vehicles on the road is already a function that the driver performs; drivers know how close they are, they just don't know when the driver ahead will "slam" on the brakes or swerve suddenly.

A huge variety of technical solutions can be arrived at which would theoretically reduce traffic accidents, however, in order to reduce actual traffic accidents any system or method needs to gain widespread use on the highway system. The system or method, therefore, needs to be designed with regard to the difficulties involved with gaining widespread acceptance and standardization. Any system or method that is to be successful at reducing traffic fatalities and injuries should in addition take into account present vehicle designs, the current highway infrastructure, the design differences between various manufactured vehicles, design cost, manufacturer liability, the cost of testing, reliability concerns, and implementation cost. Additionally, the results from the system or method should be capable of being progressively achieved. Implementations that can not be achieved in progressive steps, can require too large of a commitment from consumers, manufacturers, and government regulators.

As can be seen, therefore, the development of a system and method capable of sufficiently reducing driver reaction time could save thousands of lives, and eliminate or reduce untold injuries. Unfortunately, getting any system or method into widespread use is a complex issue. A safety system directed at widespread adoption must take into account actual highway driving patterns while it must be reliable and yet capable of inexpensive deployment.

So far societies' best implemented solutions involve accepting crashes and then protecting drivers with better restraint systems, crumple zones, and airbags. These protection solutions are wonderful for unavoidable accidents, yet statistics indicate that a vast majority of accidents can be avoided. These accidents can be avoided if enough reaction time advantage can be provided to drivers. The rear-end vehicle collision reduction system of the present invention is directed at providing solutions which provide this reaction time advantage while attempting to take into account the needs and attitudes of drivers, manufacturers and government regulators.

BRIEF SUMMARY OF THE INVENTION

The present invention provides drivers with a "reaction advantage" based on providing additional "event" information to approaching drivers. The systems and methods described herein are generally divided into four implementation phases, along with additional aspects, wherein each successive phase provides additional "reaction advantage" to the driver. The safety system according to the present invention described herein is referred to as a "reaction advantage anti-collision system", and may also be referred to as a "RAAC system", "anti-collision system, or simply as "system" in accordance the specific context. It will be appreciated that the numerous aspects of the present invention, which will be described in relation to the RAAC system, may be alternatively subdivided for incorporation within various integrated, or non-integrated, vehicle systems without departing from the principles of the invention herein.

One premise of all phases of the invention is that the majority of rear-end collisions result when an "event" or trigger condition occurs that approaching drivers are unaware of. To provide a "reaction advantage" the RAAC system communicates this event condition immediately to an approaching driver. The described inventive method and system seeks to provide an apparatus that reduces the incidence of rear-end collisions without relying on either drivers to actively change their driving patterns, or technology to do the "thinking" for drivers.

Is it possible to reduce the level of rear-end collisions without increasing the distance between vehicles? To answer that question another question may be considered: How does the Thunderbird™ aerobatic team of the United States Air Force, which often travel at over 500 mph in tight formation within a few feet of one another, prevent "rear-enders" and collisions. The answer being that each team member knows at all times what the other team members are doing. Each member maintains radio communication and the leader communicates each and every move prior to execution. If vehicles on the highway communicate their intentions to other drivers early in the cycle of response (such as braking or swerving) then drivers approaching from the rear would have more time to react and thereby avoid an accident. However, present day safety system have largely ignored systems which collect and diseminate information, in favor of systems which attempt to take the driver out of the control loop. This aspect of creating a safe driving environment has been largely ignored by safety systems to date.

Conventional vehicle signals are used to indicate "status", such as to answer the question are the brakes on or off, or to attempt to directly react to changes in the environment, such as vehicle following radars. Within the present system it has been recognized that if drivers knew the actual intentions of other drivers up ahead, they would have sufficient time to react. The system elements and methods described herein provide as based on the broad concept of anticipating the intentions or actions of drivers up ahead. Numerous embodiments and aspects are described herein which communicate this additional information to the driver thereby providing the driver with a reaction advantage.

In general, the system and method is required to solve two problems. Firstly, a method(s) is needed of detecting driver "intentions", and secondly a method(s) is needed of relaying that information under both normal conditions and under conditions when distance vision is impaired by other vehicles, or by weather such as fog. To instantiate the situations wherein many accidents arise, the following are provided by way of example as hypothetical driving scenarios wherein these problems need to be solved:

Normal Visibility—visualize driving along in traffic on a clear day, vehicles are slowing and speeding up, brake lights coming on and going off. Brake lights on the sports car ahead light up again, and you slowly ease off of the accelerator. Unfortunately, almost a half second later, as the smoke starts reeling off the car's tires, you realize too late that the driver ahead has slammed on his brakes, and as the front end of your car merges with the rear of the sports car, you wish you had applied the brakes just a fraction of a second sooner. Accidents of this nature are a daily occurrence.

Reduced Visibility—visualize driving in fog on the highway, vehicles are jostling back and forth around you and you can see the car ahead, yet nothing ahead of that, but a white veil of fog. The drive is basically dull and boring as you cruise along. You enter a denser fog as you see the car just ahead braking, your foot starts for the brake pedal as you now see the car ahead impact a pile of vehicles, . . . You can't stop! Each year huge "pileups" occur on the freeways due to a lack of reaction time caused in part by the low visibility.

Heavy Traffic—visualize driving in heavy traffic where you can't see past the car ahead of you. Unfortunately unbeknownst to you the traffic up ahead has stopped suddenly—you find out just in time to slow from 60 to 25 before creasing the bumper of that SUV blocking the view of the brake lights up ahead. It should be appreciated that the vehicle up ahead often totally blocks the view of the road and concomitantly prevents us from seeing the status of the brake lights and positional status of cars ahead. Although vehicles up ahead may be braking heavily, our first indication is often delayed until the brakes of the vehicle directly in front of us are applied.

These accident scenarios and numerous others are common reaction-time related events on highways and freeways. Unfortunately, short of being neurally connected to one another there is no way of truly detecting "intentions" prior to some form of action or execution. However, obtaining earlier comprehensive information regarding actions and execution "events" can allow the driver to react and apply the brakes earlier. The rear-end collision reduction system of the present invention performs this detection and alert function to thereby provide drivers with additional time to react to dangerous roadway events in any weather and/or traffic situation. The system design seeks to alert drivers at the earliest time possible of dangerous events ahead. The imperative of generating an alert with minimum delay will be appreciated in that with each $\frac{1}{100}$ of a second of delay can translate to a foot or more of roadway. A system which provides the driver with even an extra 20 to 200 milliseconds to react to an event ahead can appreciably reduce the risk of rear-end collision.

The RAAC system contains various levels of circuitry, which are primarily considered to be integrated within a "hard braking controller" (HBC). Each level of circuitry implementation contributes more reaction time advantage to drivers. The RAAC system circuitry implementation is described with regard to four evolutionary adoption phases; from simple systems providing small amounts of reaction advantage to more sophisticated systems capable of providing relatively large amounts of reaction advantage. The RAAC system can be implemented at any of these four phases, along with permutations and combinations thereof. Understanding the levels of advantages conferred by each of these four phases leads to an increased awareness of the underlying principles of the invention. The following descriptions detail the functional enhancement gained with each of the four phases, along with various additional inventive aspects.

HBC PHASE I Hard Braking Sensor and Indicator Light

This first level of protection within the RAAC system provides an additional visual indicator to approaching drivers when the brakes of a vehicle are applied forcefully. In its simplest configuration an additional brake pedal pressure sensor is coupled to a hard braking controller (HBC), and a hard braking indicator. The hard braking (brake slamming) sensor senses hard braking by measuring the amount of pressure applied at the brake pedal, along with pressure changes and optionally the acceleration of the pedal itself.

The pedal pressure can be sensed in a variety of locations starting at the brake pedal surface and leading back to the brake cylinder itself. The method of pressure sensing generally preferred herein employs sensing of pressure on the brake pedal itself, due to its direct and immediate response, and the consideration that a single sense unit design can then be manufactured to work with all vehicles. There are wide variations in the brake pedal actuation structures on vehicles which would need to be taken into account for pressure sensors mounted farther back in the brake linkage system. Additionally, there are delays inherent in the mechanical brake linkages with regard to sensing pressure. So a sensor on the pedal itself can discern that hard braking is occurring before sensors based on pressure increases at later linkage portions. Attempts to sense activation by the relative amount of pedal depression, although simpler to implement, unfortunately require that the system be very sensitive to minute movements near the end of the pedal travel. This form of sensing further requires that the system be adjusted for every set of brakes and that the system be adjusted regularly because the operation of the brakes will vary over time which will otherwise invalidate the sensor readings. Sensing of the pedal pressure represents an accurate and direct measure of the extent of braking and is therefore preferred. The threshold level of these signals may be set for a particular model of vehicle and need not be adjusted thereafter. Additional embodiments of alternate pressure sensors are also described.

In addition to the pressure sensor, an acceleration sensor is employed to enhance the early detection of hard-braking events by sensing the quick transition movement of a pedal prior to pressure buildup. It should be understood that many brake linkages employ a pedal biasing mechanism, such as a spring, wherein pedal pressure will be roughly equal to the biasing force until the pedal has been depressed sufficiently to begin brake activation.

The HBC constantly measures and correlates all sensor data to detect at the earliest instant if the driver is attempting to slam on the brakes. If a hard braking event is detected, then the HBC activates a hard-braking indicator to immediately warn traffic approaching from behind that the vehicle is in the process of a panic stop.

In visual uncongested traffic conditions, a hard braking light can provide an easily recognizable clue to the braking action of the vehicle directly ahead. As a driver we rarely get excited when the brake lights come on in front of us—in fact at times it barely registers, as many drivers vascillate on and off the brakes, while others ride their brakes constantly. So when brake lights come on we often intentionally delay or just move slowly by easing off the accelerator. As drivers we can be easily taken by surprise when the vehicle directly ahead actually is stopping suddenly. A driver often will not recognize the need for brake application until they notice that the vehicle ahead is decelerating rapidly, or skidding; over a second of possible reaction time may have been lost by this time. Yet a hard braking indicator that is activated only when a vehicle slams on its brakes, is better able to jolt us into heading to the brake pedal quickly without delay.

Indicators of many varieties may be used as a hard braking indicator. Rows of LEDs, for instance, can be configured as an indicator, or separate illuminated sections may be added. Additive approaches such as these, however, require changing existing vehicle designs and driver intuitions. Therefore, the preferred embodiment of the invention employs the existing reverse (backup) light of a vehicle, in a second role as a hard braking indicator. This use is immediately intuitive to drivers, since in relation to a constant speed, the act of stopping hard is a rearward acceleration. People are conditioned to think of vehicles whose reverse lights are on as being in reverse coming towards them. To increase recognition of the light, the reverse light is modulated (flickered) under hard braking. Use of the double duty reverse signal is not expected to cause any driver confusion—turn signals are already used for the double duty purpose of signaling emergencies, and the general populace understands immediately what is being signaled when both turn signal lights are flashing.

In addition, a forward brake light indicator detection (FBLID) system is described that may be utilized in combination with the aforementioned hard-braking controller, or as a separate unit to provide a reaction advantage. In typical congested traffic situations, a driver is often totally reliant on their following distance, and luck, for safety as they can not see the road conditions beyond vehicle ahead. A driver often is relegated to waiting until the driver just ahead hits their brakes before they themselves may react to the event. It will be readily understood that gaining the ability to see even one more car ahead would at least double the time available for reacting to the event. If the vehicle ahead were invisible, there would be little difficulty in stopping within the limited space. The FBLID system is a simple device that provide the advantage of letting a driver "see" up past the car ahead. In a general sense the FBLID relays the brake light indicator status of those vehicles ahead "through" a vehicle to the vehicle which is following that vehicle. The driver whose vehicle is equipped with an FBLID system is less likely to be rear ended because the FBLID system will alert the driver behind you at the same time you yourself see the brake lights ahead. In particular, the FBLID comprises a forward mounted brake light indicator detection circuit that senses sudden changes in the intensity of red light which correspond to brake application. One or more narrow forward paths of light is sensed by the system. Since intensity is a function of the square of the distance it will be readily appreciated that the system automatically has greater sensitivity to the vehicle directly ahead than to vehicles in other lanes, or light reflections. The detector circuit for the FBLID is configured to sense changes in red light intensity that occur within its field of view and not from red lights that move in or out of its field of view. Upon detecting that brake lights in the vehicle ahead have activated, the FBLID generates a signal that is used to activate a rearward indicator, such as the reverse lights, and as a result the braking indication has been passed rearwardly "through" a vehicle. The FBLID may be utilized with any of the phases of the hard braking controller described herein, or in conjunction with other safety system, or as a separate safety system. When utilized with the Phase I hard-braking controller, the FBLID senses that brake lights up ahead have been activated, the unit generates a signal to the HBC which in turn activates the hard-braking indicator, such as the reverse lights of the vehicle. Therefore, as the brake lights for a leading first vehicle activate, a second vehicle directly behind the first vehicle will see the brakes lights immediately. It will take an alert driver of the second vehicle about one second to see the lights and activate their own braking system. The driver of vehicle three would traditionally lose that one second of reaction time if they can not see the brake lights of the first vehicle and must wait for the response from the second vehicle. The FBLID system of vehicle two, however, senses the brake light activation of vehicle one, and immediately activates either the rear brake lights, backup light, or a hard braking indicator. Vehicle three as a result receives a braking indication, generated by the FBLID, within a few milliseconds after the brake lights of vehicle one activates—the added reaction advantage could be from one-half second on up depending on the level of alertness of the driver ahead. The advantages that can accrue as a result of reduced injuries, and vehicular damage should be easily appreciated as the result is somewhat equivalent to doubling the following distance between each vehicle on the congested roadway. The FBLID may be utilized as a separate system unit, sans HBC controller, wherein the FBLID unit controls the state of the brake light, reverse-light, or a hard-braking indicator. The FBLID is simple to implement and yet it provides a one-vehicle reaction advantage that is especially applicable to congested traffic situations.

In another inventive aspect described near the end of the specification, an forward looking audio correlation (FLAC) system is utilized within a vehicle in conjunction with the RAAC system, another safety system, or as an individual system. The FLAC system receives and analyzes audio from vehicles up ahead to detect if any event conditions exist, such as braking, hard braking, or accidents. Upon detecting one or more event conditions, the driver is alerted by audio or visual indication, so that they may react early. The FLAC system is preferably implemented with an audio detector mounted near the front of the vehicle, preferable near the bottom, and is configured to maximize the reception of sounds associated with brake application, especially hard brake application. The sounds are analyzed within a signal processing circuit which is capable of discriminating numerous audio events, and alerting the driver, for instance by providing audio output of the sound over a separate speaker or the vehicles audio system.

Therefore, HBC Phase I along with the FBLID system and FLAC system are simple to implement systems which provides a visual alert signal to drivers that the vehicle immediately ahead is decelerating quickly.

HBC PHASE II Non-Visual Event Signaling and Alerts

Phase II level of RAAC system implementation adds a signal link between vehicles, wherein events, such as vehicle crashes, vehicle brakes being slammed on, and vehicles quickly swerving, are communicated to approaching vehicles. Drivers are alerted even if the vehicle that is slamming on its brakes, swerving, or involved in an accident can not be seen. The hard braking sensor and HBC, as described above, are used along with a rearward projecting transmitter and a forward collecting receiver which together implement a coded messaging scheme for communicating events. It will be appreciated that numerous wide band communication techniques currently exist for short range communication, for instance, according to the Blue Tooth communication standard. Furthermore, short range RF communication can be implemented at very moderate cost with modular transmitters and receivers currently being available for under five dollars, with further reductions possible. To further enhance event detection, an input from a swerve sensor is preferably utilized to detect when a vehicle makes an abrupt swerve. Additionally, the HBC is capable of receiving input from: electronic speedometer, turn sensor, emergency flashers, headlight switch, a driver selectable sensitivity selector, and an electronic compass. These additional inputs further qualify events to minimize unnecessary alerts from the HBC. Also the preferred implementation of the HBC, incorporates a crash sensor which allows approaching drivers to be warned when a vehicle has been involved in an accident (impact). In order that the signal associated with a particular event, such as a crash, be rearwardly communicated a long enough distance, receiving vehicles in certain circumstances perform a limited regeneration of the original event signal. The signal is therefore repeated a controlled number of times. Therefore, upon severe events such as hard braking, brake slamming, and crashes; vehicles approaching the event are notified immediately upon occurrence of the event such that they may brake early.

Vehicles receive the event signal transmissions which are converted to audible and/or visual alert indications so that the driver may immediately engage the brakes. The communication of an event signal alerts approaching vehicles even when they are unable to see the vehicle that has crashed or slammed on its brakes. Therefore, the driver receives early warning alerts, regardless of the prevalent weather or traffic condition. It is anticipated that numerous highway accidents can then be avoided because drivers in approaching vehicles get extra time to react, . . . "a reaction advantage", so that they may properly respond to the event.

Additionally, a high power transmitter generating HBC protocol based signals can be used by emergency vehicles to alert drivers ahead to pull over, even when those drivers cannot yet hear or see the emergency vehicle. Also the transmit/receive protocol, when implemented within roadside call boxes, is capable of providing immediate accident information to dispatchers when accidents occur on the roadway and can disseminate downloaded roadway information about traffic conditions that exist up ahead.

The road side call boxes may be further augmented with circuitry, and a simple traffic detection system is described, referred to as a roadway audio status system, which does not necessarily rely on vehicles being equipped with Phase II or higher HBC units. Call box circuitry is described which is capable of quickly assessing various traffic pattern parameters, such as the number of vehicles per unit of time, the speed (average, maximum, median, and so forth), in addition to sensing accidents occurring near that area of the roadway. The circuitry may be implemented within the roadside call boxes or within alternative device periodically disbursed along the side of a roadway.

In summary, roadside systems may be adapted to generate additional safety information, while the aforementioned HBC Phase II system provides a large "reaction advantage" to drivers in low visibility situations caused by weather, such as fog, and when obstructions such as other vehicles in heavy traffic, or actual physical obstructions impair forward visibility. Therefore, HBC Phase II provides a major benefit with "blind" operation wherein approaching drivers are alerted to upcoming dangers in any traffic or weather condition.

HBC PHASE III Full Position Data and Communication

The HBC at this Phase III level of the RAAC system are augmented by additional information sources and functions which increase utility. Data from an electronic global positioning system can provide position data on incidents. Upon experiencing an event, the GPS data is transmitted along with the other event information. The GPS data is additionally used by a vehicle mounted phone system implementing an enhanced 911 (E911) service, wherein an automatic emergency call is generated when the crash sensor is activated, wherein the 911 call preferably provides location and severity information and can allow direct and immediate communication between the vehicle occupant (if still conscious) and the emergency 911 dispatcher within a Public Safety Answering Point (PSAP). (FCC has mandated an Oct. 1, 2001 deadline for handset based E911 deployment.) If vehicles generally adopt the GPS of phase III, then the signal transmission power used by the system may be increased to provide transmission over larger distances, as the GPS location information provides very selective discrimination of which events received within an event signal are relevant.

The HBC provides for utilizing GPS position data to calculate the relative position of a communicated event which may be utilized within vehicle systems receiving the event signal to determine if the associated event is of relevance for the subject vehicle. In addition, the system can be configured to provide the driver with a substantial amount of control over what event information is displayed and how the display is to be organized. With the low cost of GPS units, already in some instances below thirty dollars, many industry leaders anticipate that the majority of newly manufactured vehicles will soon contain a GPS unit for navigation purposes in the near future.

Additionally, Phase III of the RAAC system provides a method for communicating additional forms of information between vehicles and even between the highway itself and the vehicles traveling upon it. With GPS positioning information available, a virtual highway network is created wherein information about accident events, congestion details, roadwork, and emergency vehicles can all be communicated automatically.

HBC Phase III therefore extends functionality and driver convenience while providing additional communications.

HBC PHASE IV Partial Response Automation

The HBC at this level is augmented with inputs for a "tailgate" distance selector, a distance sensor, and an output for an assisted braking solenoid. Upon receipt of a significant event signal, the Phase IV HBC has sufficient information to determine with reasonably high accuracy the probability of the driver being able to stop in time to prevent an accident. The HBC provides a driver selectable level of early braking assistance based on this information and may thereby engage the brakes automatically if imminent danger exists. Once the driver reasonably engages the pedal, the system disengages the assisted braking solenoid. Assisted braking can get the brakes engaged in those critical early milliseconds after an event from up ahead has been detected; yet does not wrest control of the braking or driving process from the driver. Should the HBC Phase IV system be in error and engage the brakes in a situation when unwarranted, the driver will only experience a slight temporary slowing of the vehicle, and will not be harmed or unduly inconvenienced.

HBC Phase IV therefore is a first step in automating driver response based on event conditions occurring ahead.

HBC PHASE V Full Response Automation

The implementation of a phase V fully automated response system is not described in detail within this application. In a phase V system, however, the HBC determines the parameters of driving while automatically controlling variables such as vehicle speed, and braking, as well as possibly the steering of the vehicle to its destination. A Phase V system is a logical extension of the described HBC from Phase IV, and will benefit from the information and statistics collected from widespread adoption of Phases I through IV.

Phase I Visual early warning benefits can be immediately realized as drivers are provided with a reaction advantage.

FBLID—Forward brake light detection

FLAC—Forward looking audio correlation

Phase II "Blind" event sensing benefits can begin to be realized as a standard is established and widespread deployment begins.

Phase III Position related enhancement benefits can be realized, wherein both the specificity of event conditions and the utility thereof are improved.

Phase IV Reaction automation benefits begin to be realized.

An object of the invention is to reduce fatalities and injuries by providing added "reaction time" to events such as brakes slamming on, abrupt swerving, or a collision.

Another object of the invention is to provide a system and method for reducing rear-end collisions that may be implemented inexpensively without the need of redesigning vehicles and without requiring additional exterior vehicle modifications.

Another object of the invention is to provide a system which requires negligible maintenance or periodic calibration.

Another object of the invention is to provide a system whose implementation is directed toward current new vehicle designs wherein largely digital communication paths (Digital, SPI serial, CAN) are replacing analog signals.

Another object of the invention is to provide a system and method of reducing rear-end collisions wherein standardization is easily and inexpensively achieved and a variety of implementation levels/stages available to allow for a gradual implementation phase in if necessary.

Another object of the invention is to provide a system whose implementation does not incur a liability burden to vehicle manufacturers, wherein vehicle operation on system errors defaults to conventional operation, i.e. a systems breakdown becomes similarly equivalent to having one tail-light burned-out.

Another object of the invention is to provide a system and method for reducing rear-end collisions that requires no highway infrastructure changes.

Another object of the invention is to provide a system and method for reducing rear-end collisions that does not require drivers to adopt a new set of driving habits, or to learn new technology.

Another object of the invention is to provide a system and method for reducing rear-end collisions upon which enhanced safety features may be built.

Another object of the invention is to provide an easily recognized indication to alert drivers approaching from behind that the driver of a first vehicle is braking heavily.

Another object of the invention is to provide a system which rapidly communicates to approaching drivers when the brakes have been applied by a vehicle directly ahead.

Another object of the invention is to provide driver alerts in response to events that occur farther up the road beyond what can be seen immediately ahead.

Another object of the invention is to qualify the communication of event signals which provide driver alerts based on driving conditions; so that signals are only generated when conditions warrant.

Another object of the invention is to provide for event signal regeneration by vehicles in which an event is not occurring, so that the communication of event signals can be provided to all vehicles within a reasonable proximity despite vehicle communication path obstructions.

Another object of the invention is to provide this reaction time advantage despite conditions of reduced visibility (fog, rain, snow or traffic).

Another object of the invention is to provide the reaction advantage by means of visual and audio alerts to drivers approaching a possibly dangerous event.

Another object of the invention is to provide a system wherein the same elements may be incorporated into any vehicle regardless of the type of braking system and other equipment employed.

Another object of the invention is to provide a system which can be easily retrofitted to existing vehicles.

Another object of the invention is to provide a brake pedal sensing system that does not require adjustment to a particular set of brakes, or during the life of those brakes.

Another object of the invention is to encode information into generated event signals that may be used by HBC units within vehicles under driver control to allow the discrimination of event signal allowed to produces driver alerts.

Another object of the invention is to automatically limit driver alerts based on the information encoded within an event signal as determined by location and/or direction so that drivers are not alerted in cases wherein the event occurs on the other side of the freeway or is otherwise not pertinent to the driver.

Another object of the invention is to provide event signal regeneration wherein vehicles not directly receiving the initial event signal still receive an alert from a vehicle that received the event and retransmitted it.

Another object of the invention is to limit the regeneration of event signal transmissions to a reasonable distance and group of vehicles that actually need to respond to the event.

Another object of the invention is to allow airbag deployment to be used to trigger a "crash" event.

Another object of the invention is to provide a system that allows approaching emergency vehicles to alert drivers from beyond the range of hearing or sight in crowded traffic to pull aside.

Another object of the invention is to provide call box support wherein call boxes are configured to directly receive vehicle "crash" event signals so that emergency crews can be quickly dispatched to an accident location for which they will already know the number of vehicles and extent of the accident.

Another object of the invention is to provide call box circuitry which is capable of monitoring roadway condition as discerned by way of received audio.

Another object of the invention is to supports multiple levels of event signals that include: Crash, Slamming brakes, Hard braking, Emergency vehicle approaching, Emergency blinkers.

Another object of the invention is to supports a "road condition" level of event signal receipt wherein hazardous road conditions and special alerts may be communicated as a series of event signal data packets which can be annunciated and/or displayed to the driver.

Another object of the invention is to support automatic extended 911 service, wherein upon a crash of sufficient intensity vehicle systems and relevant conditions verify that a crash has occurred wherein a 911 call is automatically generated wherein the car sends data to the 911 dispatcher and the dispatcher can talk and listen to the passengers within the vehicle.

Another object of the invention is to provide levels of system error sensing—If HBC unit malfunctions monitor notifies driver, and tries to reasonably correct situation, or disables the HBC.

Another object of the invention is to provide autoassist braking for "early reaction" brake activation in dangerous event situations.

Another object of the invention is to generate an audio alert that can be heard and therefore reacted to when a car sound system is turned up to a high volume, yet not unduly disturb drivers in a low noise environment.

Another object of the invention is to provide a platform for the addition of extendable safety and convenience features.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 36 is a schematic of a light signal controller (LSC) according to an aspect of the present invention.

FIG. 37 is a top view of a lighting cluster according to an aspect of the present invention shown for providing external vehicle signaling.

FIG. 38 is a cross-section of the lighting cluster shown in FIG. 37.

DETAILED DESCRIPTION OF THE INVENTION

Referring more specifically to the drawings, for illustrative purposes, the present invention is embodied in the apparatus generally shown in FIG. 1 through FIG. 45. It will be appreciated that the apparatus may vary as to configuration and as to details of the parts without departing from the basic concepts as disclosed herein.

1. Implementation Considerations

In order for the rear-end collision reduction system to save lives and reduce injuries on our highways, it is necessary for it to be implemented on a large scale involving an increasingly large percentage of the vehicles on the roadway. To implement a traffic safety system on a large scale requires implementation standards. The embodiment described is directed at implementing the system to fit within a set of roughly four standards designed to simplify widespread implementation. The embodiment of the HBC described can be operated in any of the previously described phases, Phase I through Phase IV, and variations thereof.

2. Top Level System Description

Figure 1:
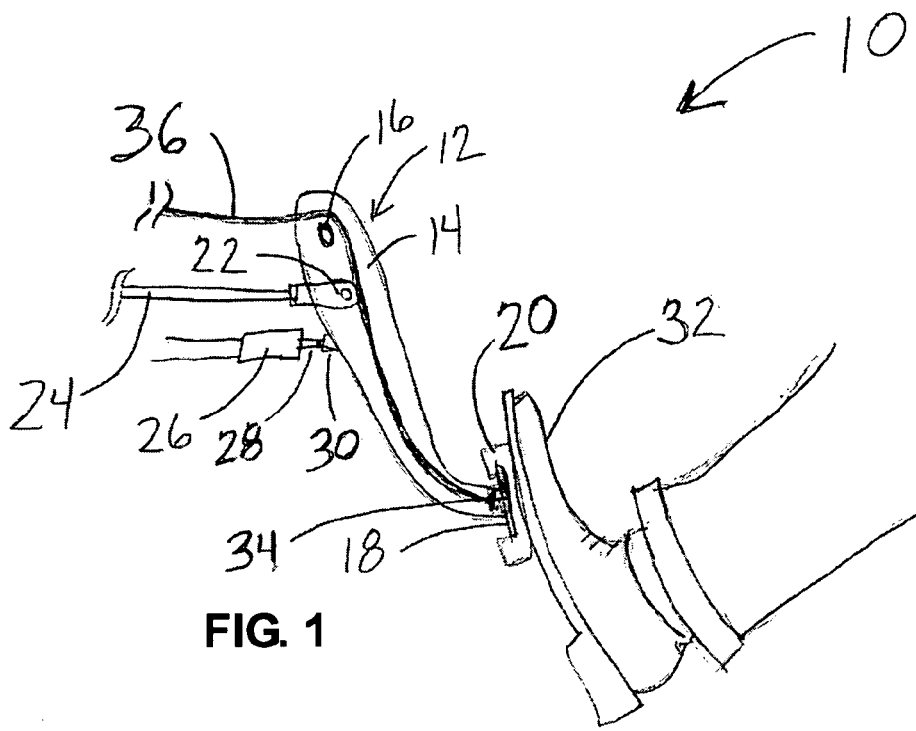
FIG. 1 is a side view of the pressure sensor module according to an embodiment of the present invention and shown attached to a brake pedal to which pressure from a drivers foot is being applied.

A pedal configured with a sensor for the rear-end collision reduction system 10 of the current invention is shown in FIG. 1. A brake actuation arm 12 contains a brake pedal lever 14 that rotates about a brake lever pivot 16, and a brake pedal 18 with a brake pedal cover 20. The pedal actuates the brakes of the vehicle by means of the brake linkage 22 which connects the pedal to a brake linkage rod 24 that connects with the brake actuation mechanism, typically hydraulic, of the vehicle. The brake lights of the vehicle are activated by means of the brake sense switch 26 which has a plunger 28 that when retracted by movement of the switch actuation protrusion 30, switches to an ON state whereby current powers the brake lights. Conventionally, the driver presses the brake pedal with a foot 32 which moves the brake pedal rearward, pushing the linkage rod 24 which begins activating the brakes. The brake sense switch 26 senses the brake pedal movement as the plunger moves, so that the brake lights (not shown) are activated.

An embodiment of the invention is shown in which a hard braking sensor 34 is attached to the brake pedal 18. Preferably the sensor 34 is attached to the front of the bare brake pedal and covered by a brake pedal cover 20, although it may be otherwise integrated or attached to the pedal. The hard braking sensor 34 contains a pressure transducer which senses applied pressure, preferably over a large surface area so that pressure applied anywhere on the pedal will be registered. The pressure transducer exemplified within this embodiment is a load cell whose output is generated across an internal Wien bridge. An acceleration sensor may be optionally incorporated within the hard braking sensor (HBS) 34. The exemplified hard braking sensor 34 may be mounted to the brake pedal 18 by any of various means, such as by fasteners, adhesives, or physical configuration. The wiring 36 from the HBS can travel through a hole in the pedal face or alternately be threaded around the pedal. The HBS may alternatively be configured as a transponder wherein no wiring is required, however, the present current requirements of the HBS may complicate the implementation. The pedal cover 20 provides a resilient cushion for the brake pedal 18 and distributes localized forces onto the underlying sensor.

Figure 2:
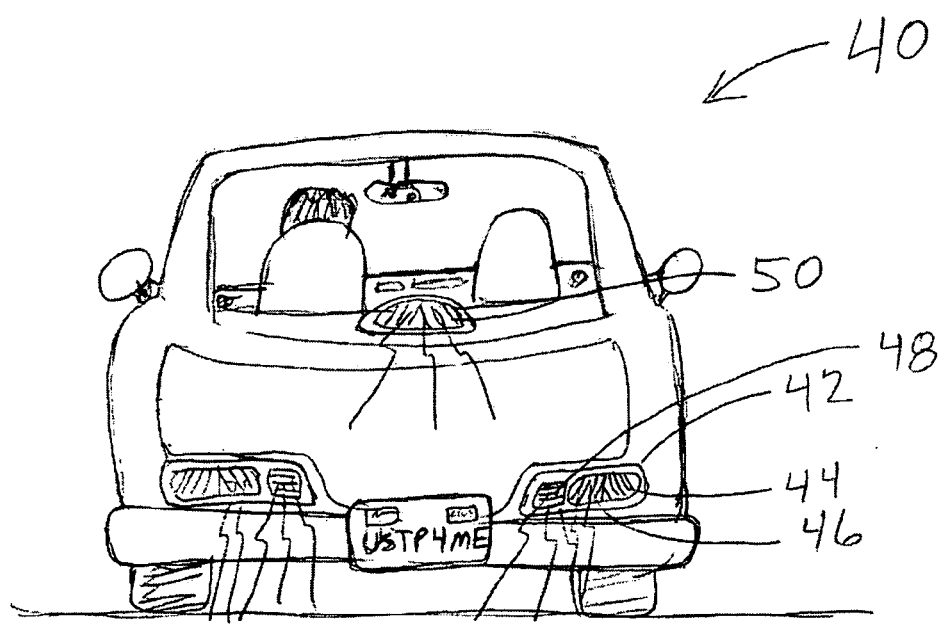
FIG. 2 is a rear-view of a representative vehicle showing the location of the tail-light clusters.

FIG. 2 depicts a small automobile 40 shown with a group of indicator lights 42 containing a turn signal light 44, a brake light 46, and a reverse light 48. Additionally an auxiliary brake light 50 is shown on the rear deck of the back window. The brake light 46, 50 and the reverse light 48 are shown activated, which indicates hard braking has been registered by the sensor which controls light output from the reverse lamps.

3. Vehicle Wired with HBC

Figure 3:
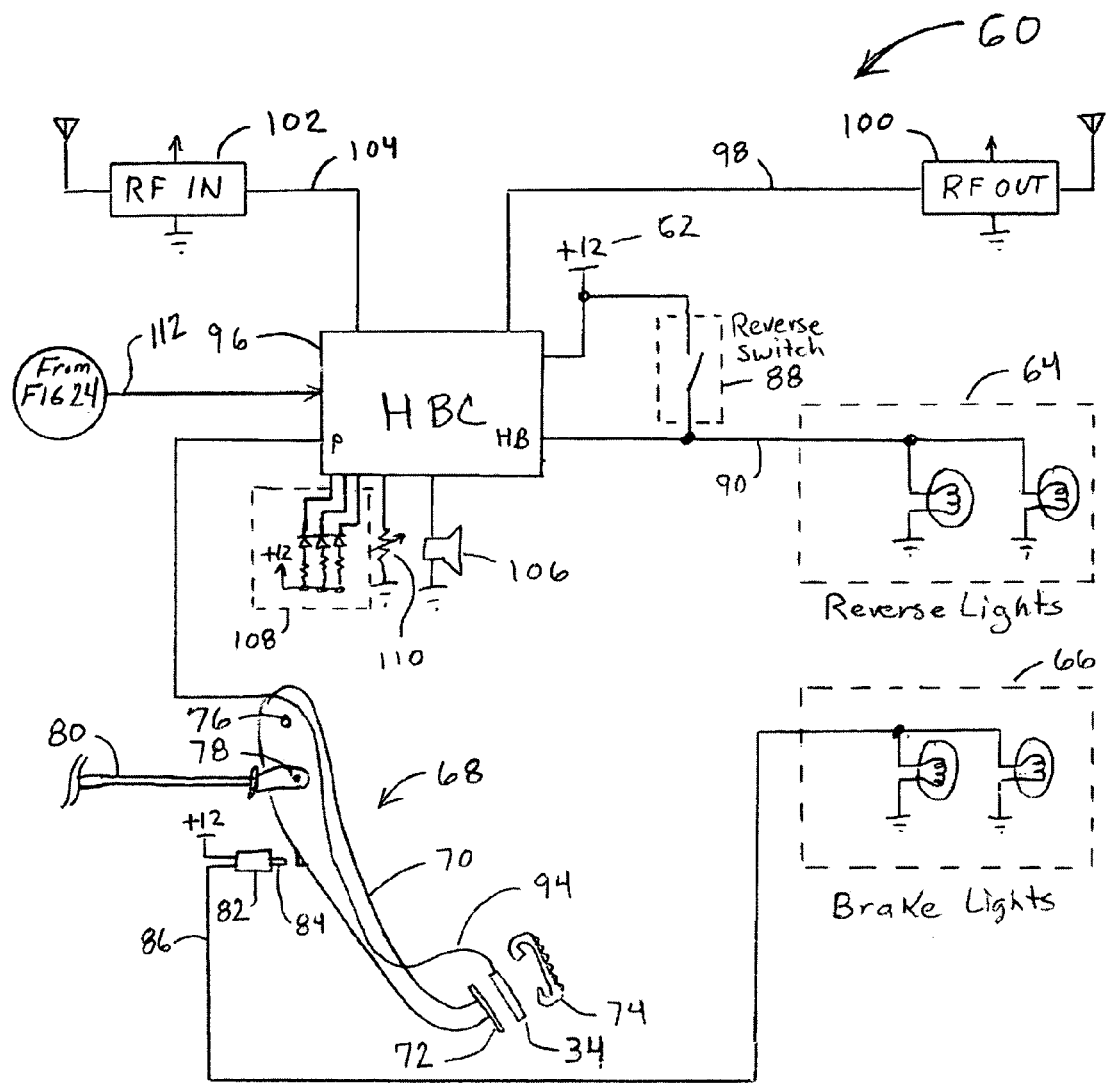
FIG. 3 is a simplified wiring diagram of a simple HBC (phase II) module and pressure sensing module according to an embodiment of the present invention shown being electrically connected within a vehicle.

A simplified wiring schematic 60 of an embodiment providing a Phase II implementation of the rear-end collision reduction system is shown in FIG. 3. Shown in the schematic is a simplified representation of the system with major elements depicted wherein numerous minor and qualifying inputs have been left off for the sake of clarity. This description will first detail the function of the parts shown in the wiring diagram and then will describe the functioning of the system in relation to FIG. 3.

3.1. System Elements

The simplified wiring schematic 60 of FIG. 3 shows that the system is powered by the conventional vehicle electrical system 62, which is nominally powered by +12 to 14 Volts. The majority of the items depicted in this figure are conventional vehicle components, such as: reverse lights 64, brake lights 66, brake actuation arm 68, brake pedal lever 70, brake pedal 72, brake pedal cover 74, brake lever pivot 76, brake linkage 78, brake linkage rod 80, brake sense switch 82 with plunger 84, brake light power lead 86, reverse sense switch 88, and reverse light power lead 90.

Additionally depicted are components of the rear-end collision reduction system. For clarity, the hard braking sensor module 92 is shown separated from the pedal 72 with the pedal cover 74 pulled away. (The sensor module is shown for simplicity without power and ground connections and with a single wire connection whereas a serial bus connection is preferred within this embodiment.) Alternatively, the sensor module may be wireless and communicate with the hard braking controller by radio or even audio signals. When installed, the hard braking sensor (HBS) 92 is preferably firmly attached to the pedal and covered with the pedal cover 74. Wiring 94 from the HBS module 92 is routed through a notch in the pedal 72 and routed up along the pedal where it is fixedly retained by fasteners (not shown). The wiring exits the pedal and connects with a "Hard Braking Controller" (HBC) 96, which controls the actions of the rear-end collision reduction system by receiving and interpreting all inputs and generating outputs in response to the input. It should be appreciated that although the described functions and circuitry are in reference to the hard braking controller, they may be equivalently implemented within or among other vehicle systems, which include airbag deployment systems, or vehicle control systems, without departing from the object of the present invention. The aforementioned functions of the rear end collision avoidance system have been described in accord with a Phase I implementation of the system.

Additional Phase II elements within the system comprise a remote communication mechanism. The HBC is shown connected via a serial line 98 to an event signal transmitter module 100, which is preferably implemented as an RF transmitter. The event signal transmitter (EST) 100 receives data signals from the HBC 96 which are modulated and transmitted as radio signals rearwardly to other vehicles. An event signal receiver (ESR) module 102, which is preferably implemented as an RF receiver, is also shown for receiving signals from HBC modules-in vehicles traveling up ahead. A coded signal is received by a signal collector, in this case a forwardly oriented antenna which is demodulated by ESR 102 with a coded serial signal being sent via a serial connection 104 to HBC 96. In addition, the HBC module of this embodiment preferably contains a crash sensor within its circuitry that generates an extended duration alerting signal upon encountering a high threshold acceleration event, as would occur only as a result of vehicular impact. The HBC will be subsequently described in added detail.

Annunciators are provided to signal the driver whose vehicle receives one or more transmissions that indicate a vehicle is braking hard, or is experiencing another important event. An audio annunciator 106 emits tones or voice output generated by HBC 96. A visual annunciator (indicator) 108 consists of a series of lights (exemplified as LEDs, although any form of display may be utilized) for displaying the severity or type of hard braking event. A sensitivity selector 110 allows the driver to select the level of audio sensitivity to events. Additionally, HBC 96 can generate indications or annunciations on a variety of output devices such as display screens, or dashboard instrumentation.

3.2. System Functioning

Briefly returning to FIG. 1, as the driver's foot presses the brake pedal 18, HBS 34 registers a new pressure value on the load cell. Returning to FIG. 3, HBS 34 generates a signal to the HBC 96. The HBC monitors all incoming signals and performs various tests of the information received to determine what action is to be taken. If the brake pressure is low and the variation from that low pressure level is small, then the HBC will keep recording but not generate any external outputs. If a marked transition occurs, for instance from NO braking to a distinct level of hard braking, then the HBC generates an alert indication, such as activating external lights, or other signals. Within the exemplified embodiment, the HBC 96 activates the reverse lights 64 by providing power on the reverse light power wire 90, and HBC 96 continues monitoring. If the transition immediately subsides (within about 10 mS) then the reverse light 64 is turned off. It is generally preferred that non-latched event indications, such as lights, be activated while an event is being verified, so as to reduce delay. It will be appreciated that the time required for event verification is generally of short duration, on the order of ten milliseconds, and if the event fails verification, the activation should not even be noticeable. For example, a hard braking event may be defined within the HBC 96 as a quick rise in brake pedal force which exceeds a minimum change value or a sustained pressure which exceeds a minimum pressure value level. When hard braking is detected by HBC 96, the reverse lights 64 are activated and if the pedal pressure is retained, then the reverse lights 64 can be flickered by means of the HBC software alternately applying and removing power from the reverse lights. The flickering of the reverse lights is expected to increase the attendant response from drivers in relation to steady-state lighting.

When the HBC 96 detects and verifies a given threshold level of hard braking, it additionally activates the EST 100, which is sent a coded transmission to be broadcast rearwardly of the vehicle. The coded transmission contains a code indicating the severity of the hard braking event along with additional information which may include but is not limited to HBC unit coding data (i.e. a VIN number encoded within circuit of HBC). The transmissions from the event signal transmitter are sent according to a particular timing pattern, described subsequently, so that event signal receivers barraged by more than one simultaneous signal can discern the number and severity of levels represented by the signals generated. The ESR 102 preferably contains a radio-frequency receiver section whose encoding protocol and receiving frequency are compatible for the receipt of information from the transmitter module.

4. Hard Braking Controller Sensors and Signals

This section exemplifies a specific implementation of HBC and sensor circuits in greater detail. The HBC and sensors described are generally according to a Phase IV implementation of the system and include exemplifications of transmission protocols along with additional signals and controls.

4.1. Overview

Figure 4:
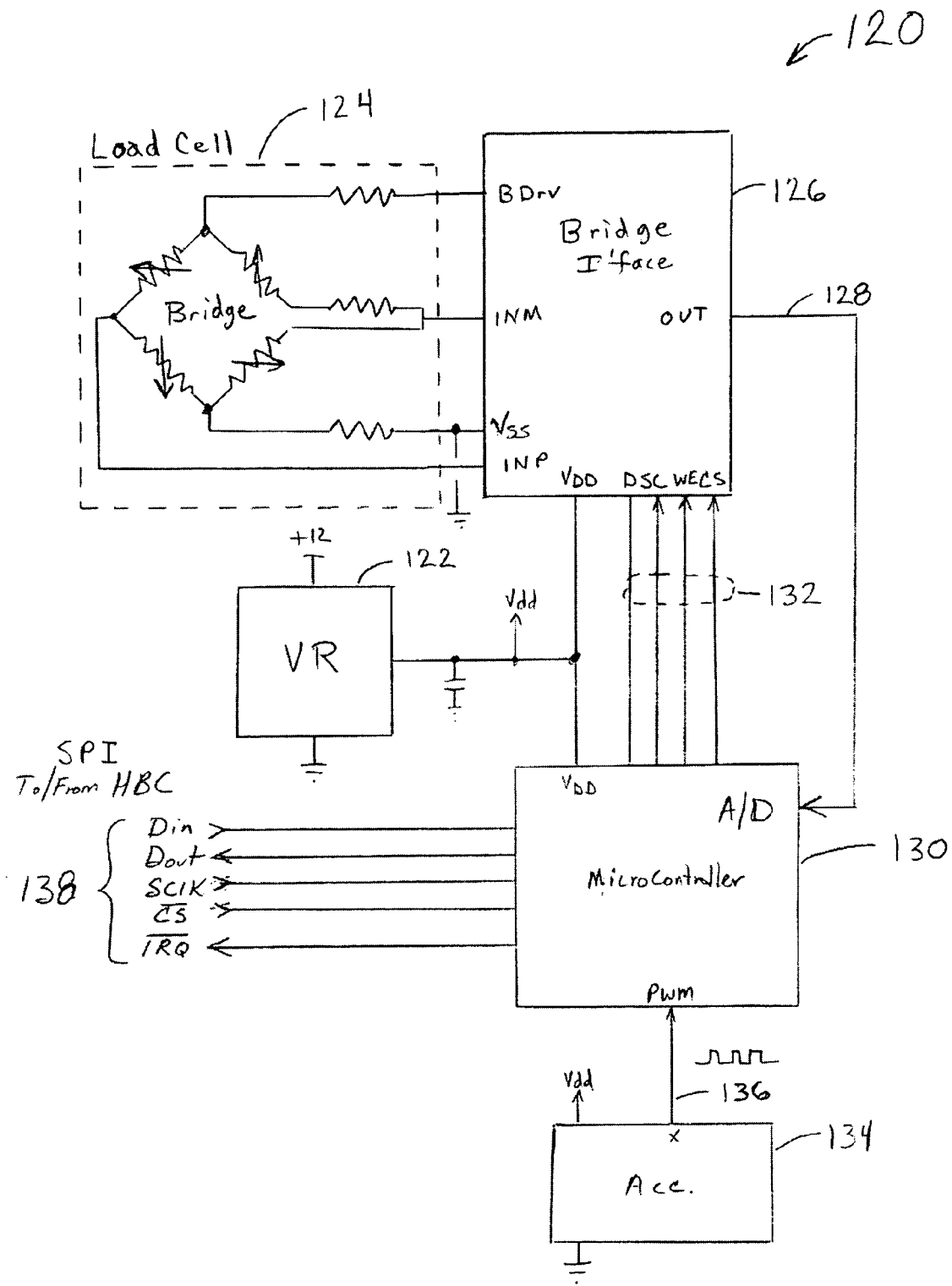
FIG. 4 is a schematic of a pedal sensor module according to an aspect of the present invention.
Figure 5:
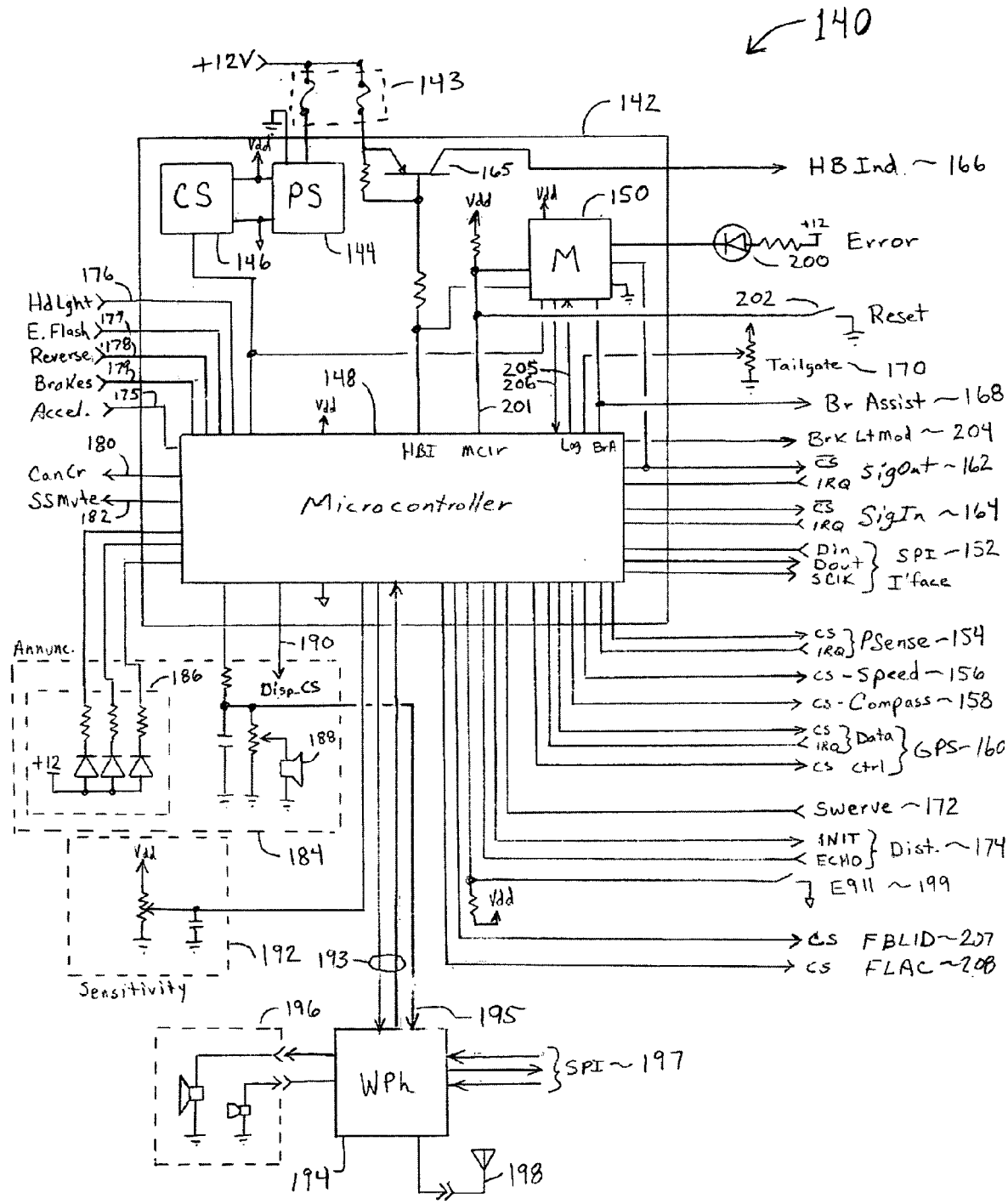
FIG. 5 is a schematic which exemplifies the internal circuits within an HBC according to an embodiment of the present invention, showing the various inputs and outputs for implementing a Phase IV rear-end collision reduction system.

FIG. 4 and FIG. 5 are schematics of the HBS and the HBC respectively. The HBC contained in this schematic exemplifies an implementation of an HBC that provides Phase IV HBC functionality. The HBC interprets inputs and generates visual signals, event signals, and audio alert signals. For the sake of clarity, a number of signals are shown in FIG. 5 without pull-up resistors and in some cases line termination resistors. The following sections describe portions of the HBC within the rear-end collision reduction system.

It will be apparent to those of ordinary skill in the electronic arts, that each of the sense functions, signal functions, and output functions depicted may be variously implemented without departing from the principles taught by the invention.

4.2. Pedal Sensor Module

FIG. 4 is a hard braking sensor (HBS) module 120 according to a Phase IV implementation according to the present collision reduction system. The HBS 120 is powered by the vehicle battery system of nominal 12 to 14 volts into a voltage regulator 122 which provides power for the sensor module circuitry.

A pedal activation sensor, such as pressure transducer 124 preferably provides a differential signal output with a Wien bridge. The pedal pressure sensor utilized within this embodiment is a load cell with conditioning resistors, an example of which would be a model ELW-D load cell with a full scale reading of 200 pounds that generates a full-scale voltage output of 250 mV and is manufactured by Entran Incorporated™. The load cell pedal pressure sensor 124 is connected to a bridge interface circuit 126. The bridge interface circuit depicted is a MAX1458™ sensor interface IC manufactured by Maxim Semiconductor™. The sensor interface provides internal EPROM based calibration of the load cell. Control lines 132 allow the functions of the bridge sensor interface to be controlled.

The bridge sensor interface 126 provides an analog output 128 which is read by control circuits, which are embodied as a microcontroller 130. The exemplified microcontroller is a PIC 16C72™ manufactured by Microchip Technology Incorporated™, that includes a RAM, ROM, and an A/D converter.

An acceleration sensor 134 is shown providing encoded brake pedal acceleration data to the microcontroller 130. The acceleration sensor described herein is an ADXL150™ manufactured by Analog Devices™ with a full scale G range of 50 G's. The acceleration sensor provides a pulse-width output wherein the duty cycle of the output square-wave represents the measured acceleration. A nominal 50% duty cycle corresponds to 0 Gs.

The microcontroller 130 is connected to the HBC by an SPI™ interface 138. The SPI interface is a serial interface allowing simultaneous sending and receiving of serial data. (SPI is a registered trademark of Motorola Corporation™.) The microcontroller additionally has an IRQ output to the HBC so that it may alert the HBC to changes that warrant data collection. The microcontroller 130 also contains calibration lookup data for the sensors so that corrected data is passed to the HBC, while sensor modules may additionally be replaced without performing any recalibration of the HBC module.

4.3. HBC Module Overview

FIG. 5 is a schematic 140 which exemplifies a hard braking controller (HBC) according to a Phase IV implementation according to the collision avoidance system of the present invention, which is capable of integration into a vehicle. It will be obvious to those of ordinary skill in the art, that incorporation of the functions herein described for the HBC according to the present invention, into one or more alternative vehicle systems to perform similar functions is still anticipated by the HBC description herein. The embodied HBC 142 is connected via two lines 143 from the vehicles power system which are fused for safety. The HBC contains a power supply 144 which preferably provides power to the circuits within HBC 140. A crash sensor 146 provides for the sensing of accidents, a microcontroller 148 contains a firmware program which controls all the HBC functions, and a monitor circuit 150 provides fail-safe operation of the HBC.

4.4. HBC Control

The microcontroller 148 contains the programming which determines the interpretation of the sensor signal data and the mapping of that data to the various outputs in the system. Within this embodiment, the exemplified microprocessor is a PIC 17C756A™ which is manufactured by Microchip Technology incorporated™. The microprocessor 172 contains 16K of program memory, 902 bytes of data memory, a 10 input A/D converter, 3 pulse width modulator outputs, USART controls to support a variety of serial interfaces. Various processors may be substituted for the PIC 17C756, and other circuit elements used within this embodiment while still adhering to the principles taught by the invention.

4.5. HBC Signal Types

HBC 140 inputs and outputs a variety of signal types, with serial data being often input and output as SPI data within this embodiment. A common set of serial signals (data in, data out, clock) are shared among the SPI slaves. When the chip select for an SPI slave is activated the slave uses the clock edges to clock in and out a serial bit stream which simultaneously sends out and brings in a group of 8 data bits. Slaves that can not just be polled by the master, are provided with an interrupt request line. When the interrupt request is asserted, the processor ISR routine retrieves data from the slave. Table 1A and Table 1B exemplify signals described in this embodiment of a Phase IV HBC within FIG. 5 (which is substantially a superset of Phase I through Phase III implementations) with the signals arranged by type and shown with the phase number to which they are considered to be implemented within the described embodiment.

4.6. Driver Alert Signals

The purpose of the rear-end collision avoidance system and the contained HBC is to reduce the chances of an accident occurring as a result of a highway "event". Primarily the system attempts to achieve this goal by alerting the driver to conditions surrounding the occurrence of events that occur up ahead. The system is sensitive to events that result in hard-braking, abrupt swerving, crashing and additional emergency situations. When such an event occurs, the driver is alerted by both external and internal alert mechanisms.

4.6.1. External Visual Indicator

An external visual indicator provides an alert to approaching drivers. When a driver of a vehicle begins forcefully applying the brakes, the HBC activates a rearwardly directed hard-braking indicator. Again referring to FIG. 5, the indicator is activated by the microcontroller 148, which activates a switching element illustrated by pass-transistor 165, which provides power to the hard-braking indicator line 166. The reverse light is preferred within this embodiment as a hard-braking indicator, its use being shared with the normal reverse light function. Under hard braking, and other event conditions the reverse light power within this embodiment is controlled by the microcontroller and further may include modulation thereof by periodically turning on and off a switching device, such as the exemplified pass transistor, to induce approaching drivers into reacting more readily to the event alert.

Upon an event occurrence in front of a subject vehicle being recognized and signaled rearwardly, vehicles containing receptive HBC units will generate alerts to their associated drivers. To provide an additional indicator and to provide an alert to drivers of older vehicles that do not contain the collision reduction system, the HBC preferably activates the hard braking indicator light upon receipt of a hard braking event regardless of whether the driver of the vehicle has yet applied the brakes. Therefore, the hard braking indicator light of a vehicle can activate before the driver of the vehicle responds to the event, thus providing additional reaction time for the driver.

Figure 35:
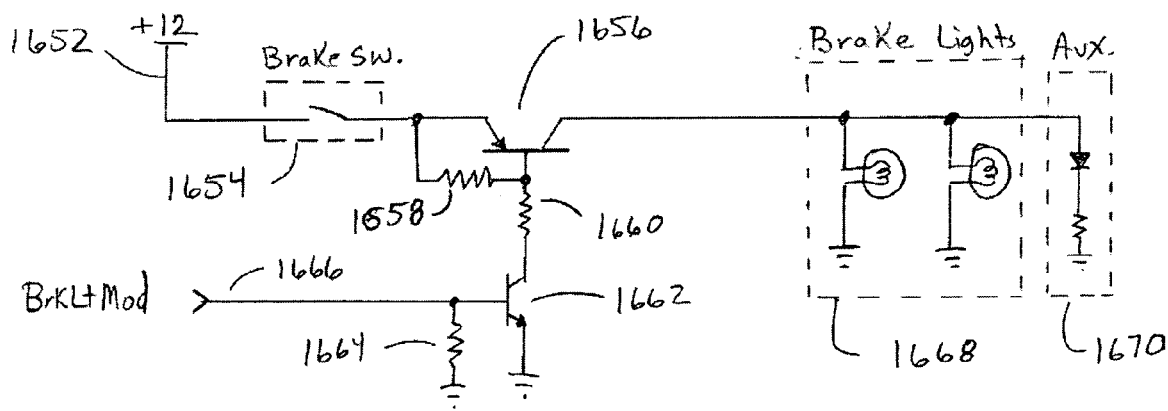
FIG. 35 is a schematic of a brake light modulation circuit according to an aspect of the present invention.

A brake light modulation signal 204 is preferably also provided by the HBC. FIG. 35 shows this signal connected via circuitry to the brake lights of a vehicle 1650. Vehicle power 1652 (+12 volts) is switched through the conventional brake light switch 1654 which is routed through a pass transistor 1656 (a bipolar transistor is shown, however a FET transistor and/or other switching elements may be substituted). The transistor is biased by resistors 1658 and 1660 and switched on and off by transistor 1662 which is held in the normally active state by the BrkLtMod signal 1666 being held high; therefore when power is gated by the brake switch 1654 it is provided to brake lights 1668 and any auxiliary braking indicators 1670. Negative going pulses of the BrkLtMod signal 1666 cause the brake lights to turn off to allow for flickering of the brake lights by the HBC when brakes have been applied. As the pressure level of applied braking increases, the HBC increases the pulse rate in response to provide a signal in which the hard braking condition is more readily recognized. The brake lights can thereby flicker even if the detected brake pedal pressure level is below the threshold selected for activating the hard braking indicator light. This brake light control line may be used in conjunction, or as an alternate to the use of other hard braking indicators. Additional embodiments of hard braking indicators are described later.

4.6.2. Internal Driver Indicator

Internal driver alert signals are used to alert the driver to dangerous event conditions occurring up ahead, such as an accident, a vehicle slamming on its brakes, a vehicle abruptly swerving, or other emergency conditions. Signals representing these dangerous event conditions are received from vehicles up ahead and received by the vehicle which is then communicated to the driver of the vehicle. These "alert signals", are in the form of audio tones or speech from an audio annunciator and/or a combination of dashboard visual display indicators. Referring again to FIG. 5, upon registering event conditions, the HBC via a digital output signal CanCr 180, cancels the setting of the Cruise control, if it is currently set. This provides an additional warning to the driver and slightly begins slowing the vehicle.

Shown also in FIG. 5 is a group of annunciators 184, which includes visual indicators 186, exemplified as LED lights, and an audio annunciator 188 with a volume control. The audio is driven by a PWM output from the microcontroller 148.

The display represented by the three LEDs provides a simple display means. The visual indicator, however, can be provided with various levels of information as provided by the HBC. By selective modulation of the three LEDs 186 shown in FIG. 5, a number of conditions can be represented. As it may be desirable to represent event conditions on a graphic display incorporated within the vehicle instruments, or within the GPS display, an SPI chip select signal Disp 190 provides for a serial interface to a display controller.

The driver of the vehicle can control the generation of alert signals through a set of user controls. A sensitivity selector 192 allows the driver to select the level at which the system generates audio driver alerts. The HBC will not generate audio in response to events of lesser importance than the user setting. The sensitivity selector shown employs a multi-position detented potentiometer whose voltage output is read by the internal A/D converter. Alternately a digital microprocessor I/O line can be used wherein the wiper I/O is pulled to ground by the microcontroller and then allowed to charge back to logic high via the potentiometer, wherein the potentiometer setting is determined by the time to reach a logic high level.

4.7. Sound System Muting Circuit

Figure 20:
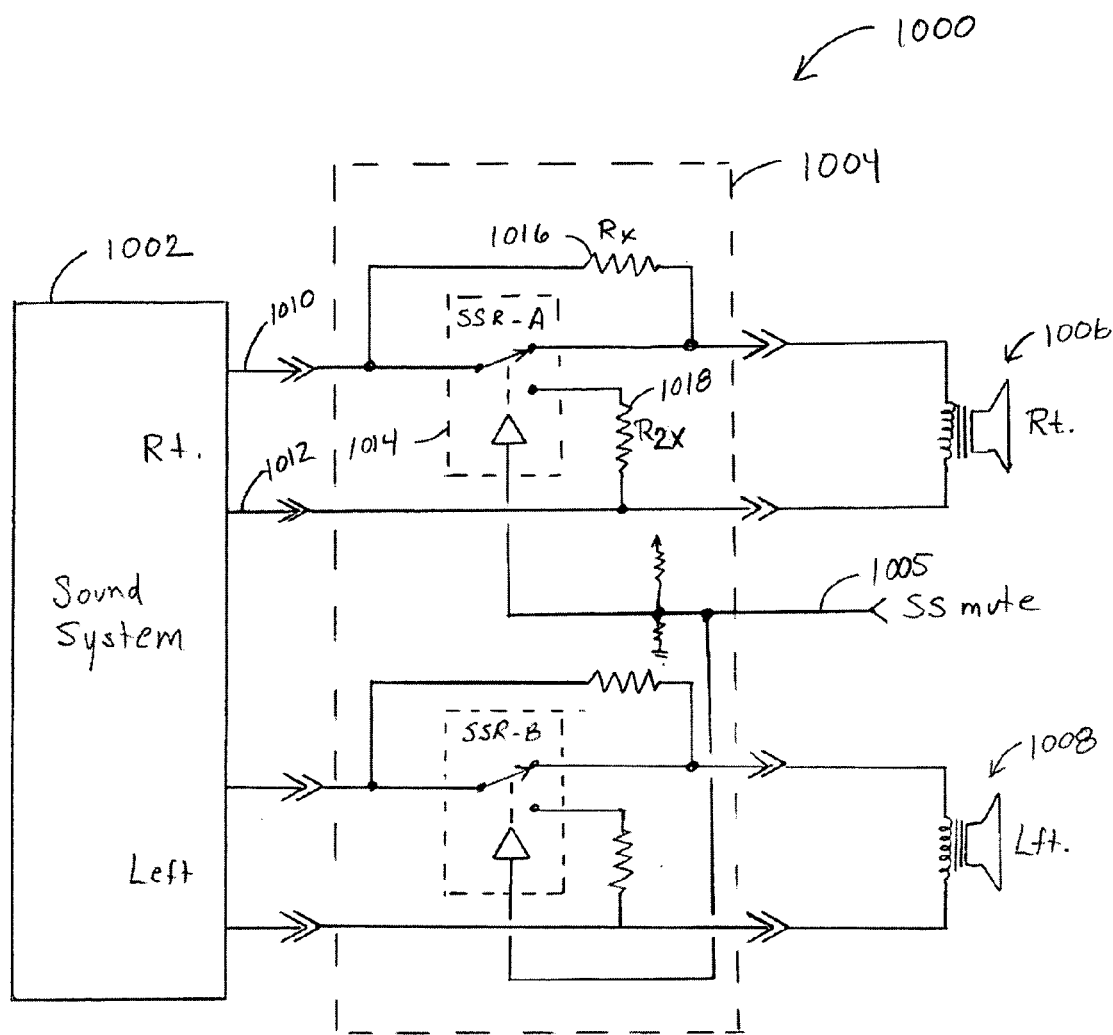
FIG. 20 is a schematic for a sound system muting circuit according to an aspect of the present invention.

In order to assure that the driver of the vehicle hears the HBC alerts, a sound system muting device output is provided 182 (FIG. 5). The HBC provides an output, SSMute, to control muting of the sound system 182. Muting the sound system during alert intervals can make it easier for drivers to hear and respond correctly to the alert. It is preferable that the mute circuit decrease output power by at least 6 dB to assure recognition of the alerts. It is anticipated that car stereo manufacturers will eventually incorporate a mute signal input into the design of the units, as is currently done with a headlight signal for controlling sound system display lighting levels. However, since these units do not now incorporate a mute circuit a separate mute circuit wired into a sound system 1000 is depicted in FIG. 20. The sound system 1002 has two sets of outputs for left and right channels. The Mute circuit 1004 is interposed between the sound system 1002 and the left and right speakers 1006, 1008. The right channel 1010 signal enters the mute circuit 1004. A solid state relay 1014 is presently set to normal (non-mute) mode, such that the input signal passes through to the speaker and current loops back around to the sound system. However, when the SSMute signal 1005 is active, the solid-state relay changes state. The speaker is now driven by current through resistor $R_x$ 1016, while a parallel return path is established through $R_2$). With $R_x$ value set to the speaker impedance (normally 8 ohms), the power to the speaker is dropped by 6 dB, while the amplifier of the sound system still sees the same load impedance. This balanced mute circuit can work with various amplifiers without risk of damage to the sound system or the speakers. The left channel contains an identical circuit responsive to the same received SSMute 1005 control signal.

4.8. Event Signals Communicated Between Vehicles

In order that drivers be alerted to conditions up ahead a mechanism is provided for communicating events between vehicles. Vehicles experiencing an event are considered event signal generators. Numerous events preferably are capable of recognition within the HBC which by way of example include a vehicle which is involved in an accident, slams on its brakes, or abruptly swerves. Upon recognizing a sufficiently important event condition, the HBC generates an event signal rearwardly. Additionally, a vehicle that is not directly experiencing an event may regenerate an event signal from a vehicle up ahead so that the event warning may be propagated to vehicles farther back from the event.

Figure 27:
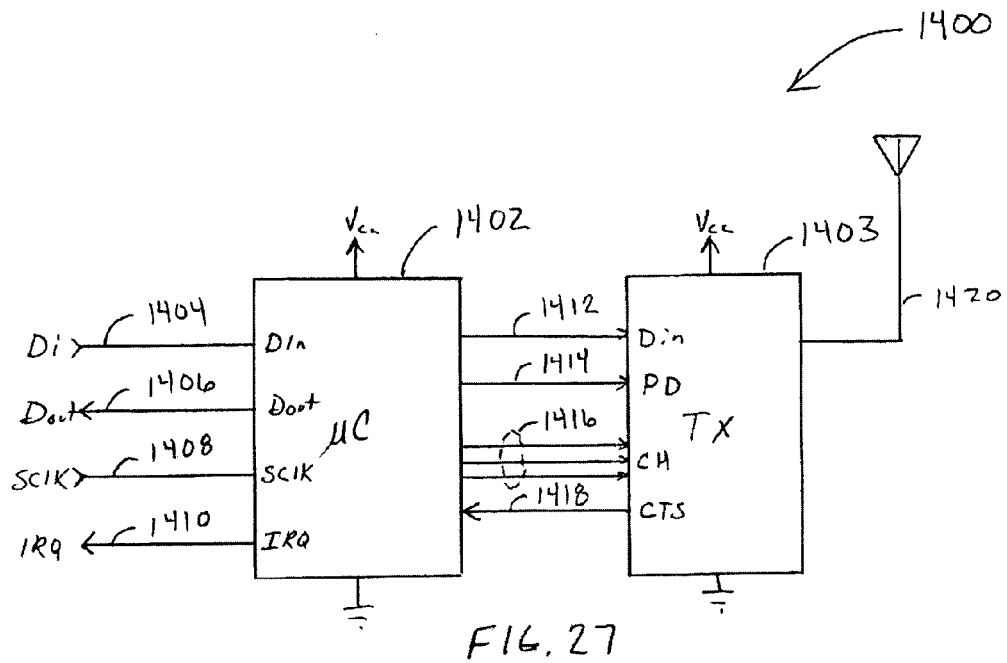
FIG. 27 is a schematic of a representative event signal transmitter shown with connections for interfacing with the HBC.

When the HBC qualifies an event for generation, output 162 of FIG. 5 is used for sending an alert signal, as a serial data stream, to an event signal transmitter (EST) module. An SPI serial bus is used for serial communication in both directions initiated by the microcontroller 148. FIG. 27 depicts an example circuit 1400 of an EST connected with the SPI bus of the HBC. A microcontroller 1402, in this embodiment a PIC 16C72™ manufactured by Microchip technologies Inc™, is used for controlling the RF transmitter 1403. Various transmitters may be utilized without the need of a microcontroller, however, the use of a microcontroller can assure that the interface to the EST module is generic wherein RF modules from various manufacturers may be incorporated without the need to alter the protocol definitions for the EST module. SPI interface lines: Data in, Data Out, Clk, and IRQ are supported by the microcontroller 1402. The IRQ line from the EST allows it to asynchronously signal the HBC when it needs service, such as when it has completed sending the data packet. The RF transmitter 1403 exemplified in FIG. 27 is a Linx Technologies™ model TXM-900-HP-II™ module, which provides FSK modulation with data rates to 50 Kbps. The transmitter module receives a data input signal 1412, and is controlled with a power down signal 1414, and three frequency setting bits 1416. A clear to send signal 1418, indicates when a new bit can be sent. RF from the EST module is directed generally rearwardly by an antenna 1420.

Figure 28:
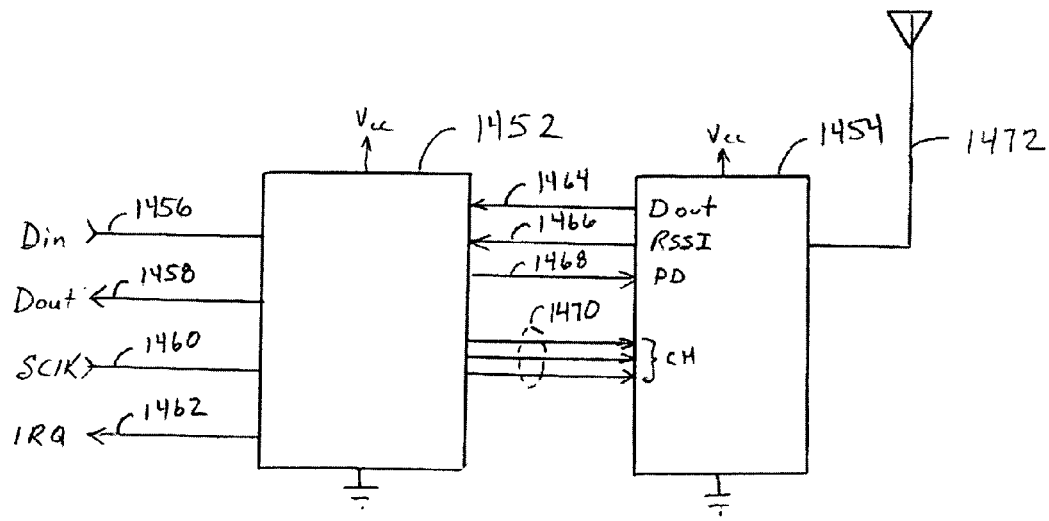
FIG. 28 is a schematic of a representative event signal receiver according to an aspect of the present invention shown with connections for interfacing with the HBC.

An event signal receiver (ESR) Input 164 of FIG. 5 receives alert signals in the form of a serial bit stream, from an event signal receiver (ESR) module. FIG. 28 exemplifies an ESR circuit 1450 connected with the SPI bus of the HBC. A microcontroller 1452, in this embodiment a PIC16C72™ manufactured by Microchip technologies Inc™, is used for controlling the RF receiver 1454. Various transmitters could be used without the need of a microcontroller, however, the use of a microcontroller can assure that an ESR module is created with a generic protocol. SPI interface lines Data in, Data Out, Clk, and IRQ are supported by the microcontroller 1452. The IRQ line from the ESR allows it to asynchronously signal the HBC when it needs service, such as when it has received data. The RF receiver 1454 illustrated within this embodiment is a Linx Technologies™ model RXM-900-HP-II™ module, which is compatible with the transmitter module above. Received data is output 1464 to the microcontroller 1452. A received signal strength signal RSSI 1466 is an analog output which can be used for determining when data is being received. The Rx module is controlled with a power down signal 1468, and three frequency setting bits 1470. RF is received by the ESR module by an antenna 1472 which is forwardly directed from the vehicle. It will be appreciated that the transmitter and receiver may be implemented with any form of remote communication mechanism capable of integrating with the RAAC system.

4.9. Forward Brake Light Detection System

Figure 29:
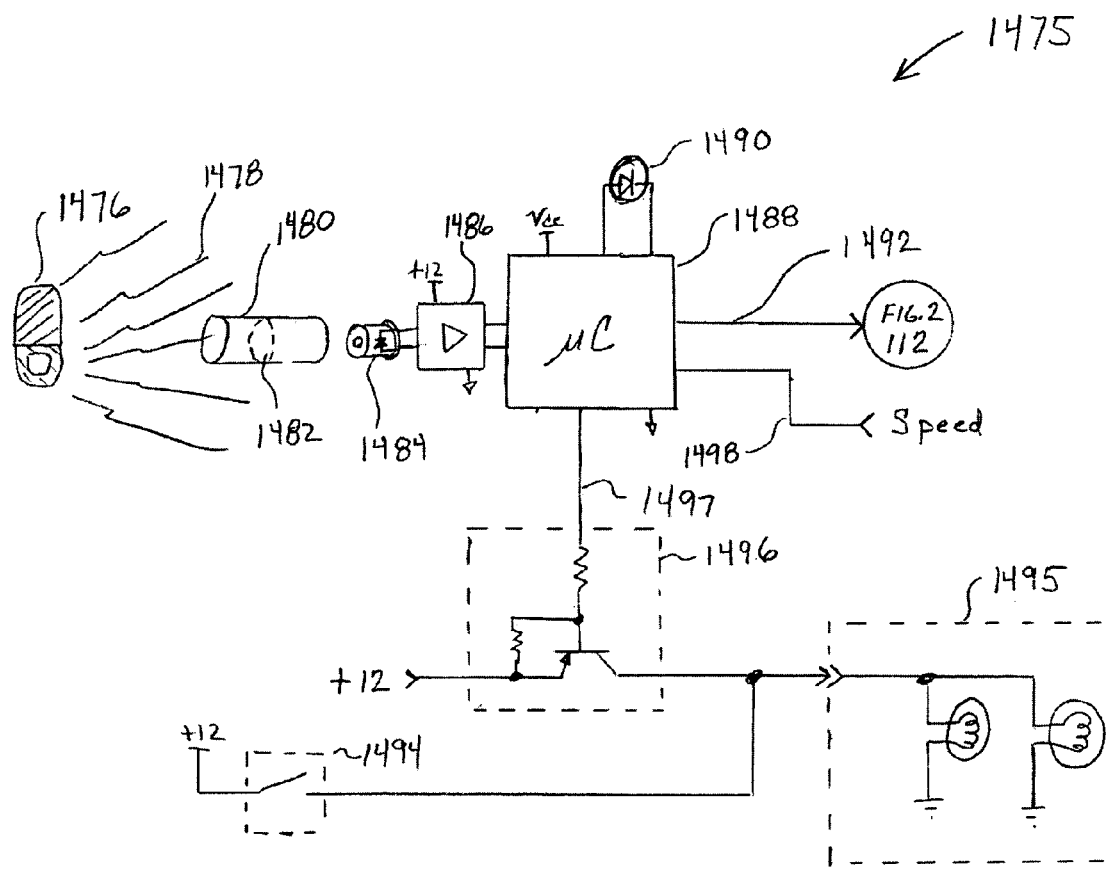
FIG. 29 is a schematic of a forward brake light detection (FBLID) system according to an aspect of the present invention, shown with alternative connections to an HBC (Phase I–Phase IV) and for individual use.

Referring to FIG. 29, a forward brake light detection (FBLID) system 1475 is exemplified. The system may be utilized in accord with any of the described phases of implementation (I through IV) or utilized in with other safety systems or in a standalone configuration. The FBLID is capable of detecting the activation of brake lights in front of the vehicle, within which the FBLID is installed, and immediately rearwardly conveying that information to drivers following that vehicle. The drivers following a vehicle, equipped with FBLID technology, is immediately alerted to brake application by the vehicle, or vehicles, ahead of the vehicle equipped with FBLID, such that a reaction advantage is gained that may be equivalent to doubling the following distance. The vehicle thus equipped with FBLID is, as a result, far less likely to be involved in a rear end collision than conventional vehicles. Drivers behind the vehicle containing the FBLID system may be alerted to the brake light conditions ahead by any of a number of indication mechanisms. First, a rearward facing indicator light may be activated on the vehicle with the FBLID system, by way of example the indicator light may include activating the brake lights, reverse lights, or a separate visual indicator. Secondly, the FBLID system can additionally provide an alerting signal by way of the HBC which is capable of generating a low priority alert signal that can be received within vehicles that are farther behind.

The FBLID system 1475 detects the activation of a brake light 1476 by receiving light 1478 therefrom. A light collimator 1480 provides for limiting the light input to a selected forward area directed forward of the subject vehicle. The light collimator 1480 preferably includes a lens 1482 configured with a red color filter and a gradiation filter. The light collimator 1480 is coupled to a light detector 1484 capable of registering the intensity of light incident thereupon. The red filter provides for filtering out all non-red illumination components, so that only changes in red light intensity are registered. The gradiation filter is configured with concentric filtering whereby the amplitude of illumination is increasingly attenuated moving from the center of the lens to the exterior of the lens. Vehicles are moving tranversely in relation to one another, and therefore incident red vehicle lighting is subject to rapid changes near the perimeter of the focal area as red light sources enter and exit the focal area. The use of perimeter filtering reduces the effect of these motion-effects, so as to more easily distinguish activations of brake lights instead of the movement of tail lights. It will be appreciated that a number of light receptors may be utilized to further aid in discriminating the movement of brake or tail lights from the activation of a brake light. Furthermore, the use of light sensor arrays, or camera elements can provide increased discrimination ability, albeit at an increased cost. The light detector 1484 is capable of registering light intensity and may be additionally provided with a filter, or implemented as a filtrode device (a photodiode containing an integral wavelength-sensitive filter directly on its input surface). The light detector 1484 is coupled to a preamplifier 1486 which conditions the signal for a controller 1488, herein exemplified as a microcontroller having an internal A/D converter for digitizing the light intensity to allow digital processing. It would be tempting to augment the light sensor with an infrared detector, however, the circuit would then need to distinguish incandescent lighting from the future use of solid state LED lighting, which is a narrow band light source. The controller circuit 1488 is shown configured with a ambient light intensity detector 1490 coupled to another AND input such that the controller may adjust processing of the received red light in accord with the amount of daylight. The FBLID may be connected 1492 to the HBC or used as an input to another safety device, or may be utilized as a separate system. Utilized as a separate system, the FBLID exemplified in FIG. 29 is shown configured for flashing the reverse lights of the vehicle when brake light activation is detected ahead. The reverse switch 1494 of the vehicle is connected to the reverse lights 1495 as is a light driver circuit 1496 responsive to an activation signal 1497 from the FBLID 1488. The FBLID in the illustrated embodiment is therefore able to activate the reverse lights in response to brake light activations sensed ahead. It should be appreciated that should the FBLID be used to activate the brake lights of the vehicle, that a chain reaction could occur whereby as one vehicle activates its brakes, the FBLID system on all following vehicles would in turn be activated. It is therefore preferable that the light activated by the FBLID be a light source that will not generate a feed-forward signal that is capable of registering as a brake light activation by a subsequent FBLID unit. Furthermore, the FBLID is shown with a speed input 1498 so that the FBLID may be conditioned for inactivity at low speeds, for instance at speeds below 40 mph. Redundant light intensity detectors are also preferred, wherein the output of the two detectors should remain equivalent, and if enough difference exists between their output then the system is disabled and a warning light activated. It will be appreciated that a forward looking optical sensor is subject to impacts from bugs an debris and may need periodic cleaning.

To increase the accuracy with which FBLID systems may optically detect the status of braking indicators, the brake lights of the vehicle are preferably modulated at a predetermined rate, wherein the FBLID system can more readily discern activated brake lights from other optical light sources. It will be recognized that fast brake light modulation, such as at 100 Hz, especially of solid state indicator lights (i.e. LEDs), is easily detected by the sensor in the FBLID while being generally undetectable to the human viewer. Furthermore, the RAAC system (or other safety system) preferably encodes the intensity of brake activation into the modulation of the brake light, so that the FBLID is capable of registering not only that vehicles ahead are braking, but in addition registers the intensity of the braking being applied. The HBC of both FIG. 3 and FIG. 5 are shown inclusive of inputs from an FBLID system. The HBC of FIG. 5 is shown with a brake modulation signal 204 which may be utilized by an external brake light switching circuit, such as shown in FIG. 35, to provide the aforementioned modulation of the brake lights. It will be appreciated that such modulation may be easily incorporated into any phase of RAAC system implementation.

4.10. Crash Sensor

In FIG. 5 a crash sensor 146 is incorporated within the hard braking controller 142. The crash sensor detects a threshold value of acceleration (generally above 5–10 Gs) and generates a logic signal in response. It will be recognized that an accident is a high severity hard braking event that approaching drivers should be made aware of. When a crash occurs, the G-loading indicative of the crash is a temporary event, . . . although the crash itself may not be so temporary. Therefore, in the case of a crash (Severity Level=HB1 Crash) the HBC continues to generate a hard braking signal both visually and by transmitted alert signal for a period of 5 minutes after the incident. (Providing that vehicle speed is negligible, stopped.) During this time drivers are alerted by the alert signal transmissions, which upon receipt audibly indicate trouble ahead. Alternately, an input from the impact sensor within the vehicle airbag system (not shown) can be used in place of, or along with, the internal crash sensor. Data from the pedal-mounted acceleration sensor is correlated with the crash sensor so that false crash indications may be eliminated. This is possible since the pedal mounted acceleration sensor is subject to the same accelerations as the crash sensor, even without the foot pressures. A "G" spike will be seen at the output of the pedal sensor upon any sizeable impact (i.e. sudden deceleration). An error condition is signaled to the driver if erroneous events are being registered by the crash sensor.

4.11. Headlight Sense Input

An input 176 of FIG. 5 receives input from the headlight switch to indicate if headlights are on. The binary voltage levels to the headlight are translated by a voltage divider and filtered by a capacitor prior to entering a logic input of the microcontroller 148 within the HBC 142. The HBC uses the headlight on/off sense to control the light intensity for the visual driver alert indicators used by the HBC, such as the LEDs shown, based on the headlight setting. Furthermore, the headlight condition can be utilized for establishing additional operating parameters of the system, while the status of the lights can be registered within the crash data logging system.

4.12. Emergency Flasher Input

Figure 18:
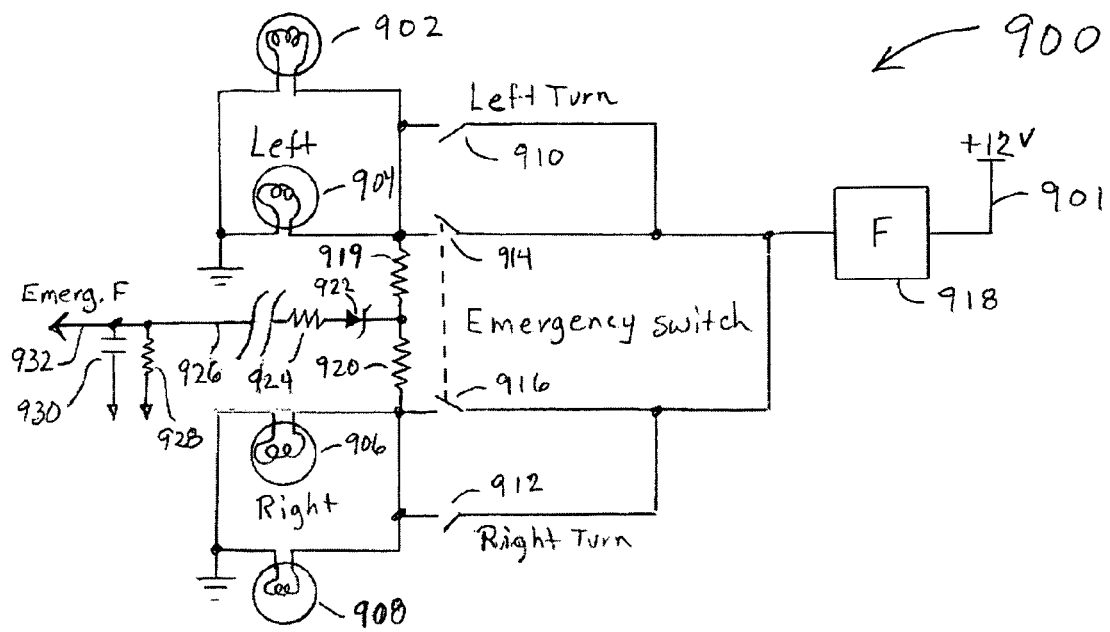
FIG. 18 is a schematic of a circuit for sensing emergency flasher activation within a vehicle according to an aspect of the present invention.

An input 177 of FIG. 5, from the emergency flasher circuits of the subject vehicle allows external communication of hazards that the driver considers an emergency, these are embodied herein as low level events of level HB5. FIG. 18 is a schematic of a representative vehicle turn signal/emergency flasher circuit 900. Vehicle power 901 (12 Volts), is used in the powering of a left front indicator 902, a left rear indicator 904, a right front 906, and a right rear indicator 908. A left turn signal switch 910 controls power to both left turn lights, while a right turn switch 912 controls power to both right turn lights. A double pole switch simultaneously controls power to both sets of indicators. A flasher unit 918 periodically turns on and off. Previously flasher units were implemented as bimetallic strips wherein current flow through the combined strip caused heating which resulted in strip separation and loss of contact. The current flow was therefore intermittently allowed and the lights flashed when the circuits were closed. A variety of current flasher implementations exist but the concept represented can be used or modified by anyone skilled in the art to provide a signal indicative of emergency flasher operation. Activating a right turn signal switch 912 causes current to flow from the power 901 through the flasher circuit 918, through the switch 912 and through both right turn indicators 906, 908. The left lights operate similarly. Activating the emergency flasher switches 914, 916, causes power to flow through both right and left sets of indicator lights to ground. A voltage divider with two resistors 919, 920 is placed between the two signal circuits. If a turn signal is activated then the voltage at the center between the resistors is about ½ the supplied voltage. If the emergency flasher 918 is activated, then the voltage is almost equal to the supplied voltage. A Zener diode 922 is used to drop about ½ the applied voltage (6 Volts). If the emergency flashers are activated then about ½ the supply voltage reaches resistor 924 and current flows out through a length of wire to the HBC side pull down 928 and filter capacitor 930, wherein the voltage of ½ the supply is translated to the an appropriate high voltage for the HBC power circuit and noise spikes are filtered out. The emergency input could be fashioned in a variety of ways, for instance another poll of the switch could be used with a pull-up to the supply voltage on one side and the pull down at the HBC side.

4.13. Reverse Light Input

A Reverse input 178 of FIG. 5, provides a binary signal from the reverse light switch of the vehicle which is capable of serving multiple functions. First, it provides another status input that can be taken into account by the HBC for qualifying HBC event signals or controlling the output state of the reverse light indicators, and secondly the state of this signal can be logged within an extended monitor circuit. When the reverse signal is high, the HBC correspondingly sets the HB Ind output to high. The reverse lights can then be incorporated conventionally, with the output of the HBC hard braking indicator power coupled in parallel to the reverse light power signal from the reverse light switch, or by using a separate reverse sensing sensor which provide the signal to the HBC which generates the HB Ind output in response to both conditions.

4.14. Brake Light Input

A Brake input 179 of FIG. 5, provides a binary input from the brake light switch or alternately a brake light sensor. In a conventionally wired system, the Brake input provides a check on HBC functioning. If the Brake input goes active and the pedal pressure sensor has not sensed pedal activity, then the operation of the HBC is faulty and the error signal is activated. The HBC also internally registers the pedal pressure setting at which the Brake input goes active. This minimum recorded value of pedal pressure when the Brake input goes active corresponds to the bias force on the brake pedal system. This bias force is taken into account in determining medium levels of hard braking. Systems with higher bias forces will require a higher pressure before any form of hard braking is indicated by the HBC. In addition, if the HBC is registering pressures largely in excess of the recorded minimum recorded value of pedal pressure, but the Brake input signal has not gone high, then the brake switch or wiring may be faulty. The HBC will signal a fault condition if this condition continues. Additionally, the Brake input is logged if an extended monitor circuit is implemented within the HBC, so that the state of the brake is recorded with other related data in the event of a crash.

4.15. Vehicle Speed Input

Figure 19:
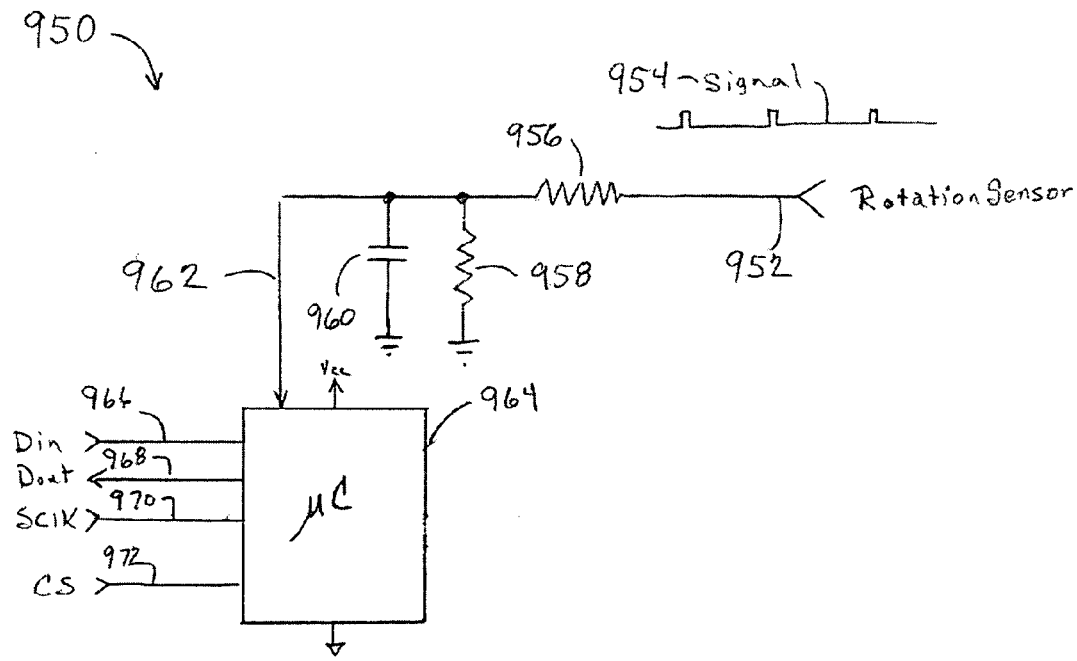
FIG. 19 is a schematic of a circuit for sensing and communicating speed data to the HBC according to an aspect of the present invention.

A speed input 156 of FIG. 5 allows the HBC to interpret all received signals in relation to the speed of the vehicle. This allows the system to be more discerning as to the generation of event signals and driver alerts. Speed signals are typically already generated for use by electronic control purposes within the vehicle. FIG. 19 shows speed signal conversion 950 providing serial speed input to the HBC. A signal from a Hall-effect style speed sensor 952 is received. The signal is shown as the square wave pulse train 954. A resistor divider 956, 958 translates the voltage of the signal that is filtered by capacitor 960. A resultant pulse train 962 enters a microcontroller 964. The microcontroller is exemplified as a Microchip Technologies™ 12C508™, which is a small 8 pin controller chip. The firmware within the controller 964 calculates the speed of the vehicle based on the received pulse train. An SPI serial slave interface is also implemented in firmware so that the controller can receive control information and send out speed data. A data in line 966 receives data from the HBC. These can be commands on how to process the information and constants. One constant sent to the controller is based on the intervals between the pulses and takes into account the tire sizes. If tire size is altered, then new calibration data must be entered. (Calibration data can be determined by the GPS unit over time and used to recalibrate the tire size value.) Speed data is sent to the HBC via the data out signal 968 upon HBC request. A request occurs when the chip select 972 line goes low. One bit is received and transmitted for each transition of the SClk signal 970. The HBC could directly use the pulse train, but then the HBC design would need to be modified for each form of vehicle speed sensing apparatus being employed. The use of the microcontroller provides for a generic speed data protocol to the HBC. Furthermore, it is preferable that two sources of speed data be correlated within the HBC system, such that errors may be detected.

4.16. Vehicle Acceleration Pedal Input

Figure 41:
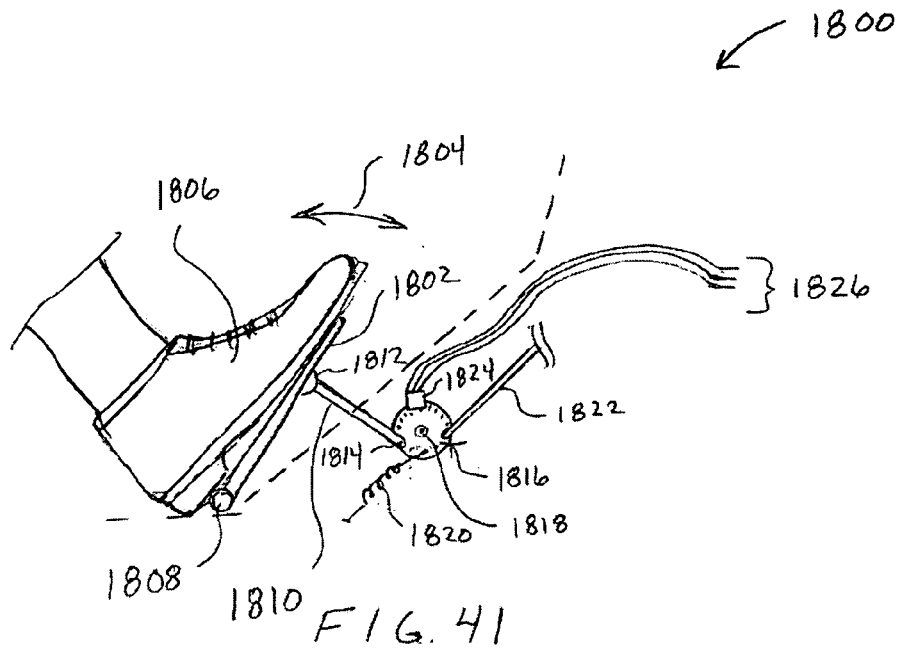
FIG. 41 is a schematic of an accelerator pedal sensor utilized for registering accelerator pedal depression according to the present invention.
Figure 42:
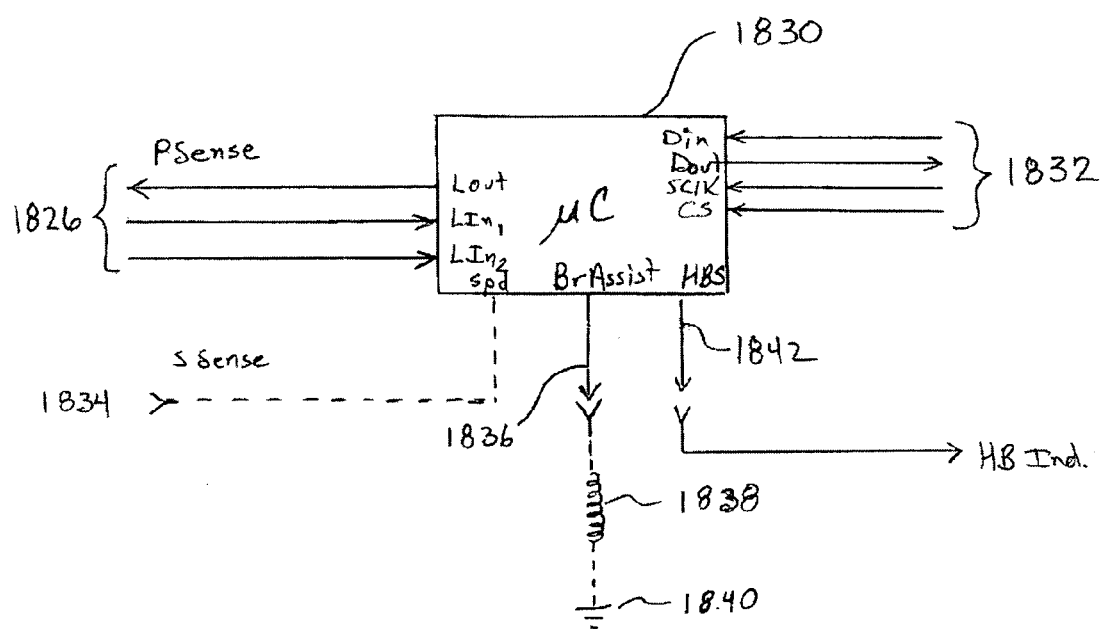
FIG. 42 is a block schematic of an accelerator pedal conditioner and event indicator according to the present invention.

Related to the aforementioned speed input is an optional input from the acceleration pedal 175 which may be utilized to increase reaction advantage. It will be appreciated that a driver typically operates the brake and accelerator with the same foot, therefore, prior to a driver applying pressure to the brake pedal they must first release their foot from the accelerator pedal. The acceleration pedal sensor input to the hard braking controller 148 senses the amount of accelerator pedal depression, and is capable of registering changes in the amount of pedal depression. FIG. 41 and FIG. 42 depict an accelerator pedal sensing arrangement capable of registering the amount of pedal depression. An HBC equipped for monitoring the accelerator pedal can utilize the data to modify actions in relation to the other sensors. For example, if the driver is increasing depressing the accelerator pedal then the severity of received event conditions may be elevated, since it is likely the driver has not perceived any such danger, by virtue of their increasing acceleration. By way of further example, the system can sense for an abrupt release of pressure, consistent with a driver removing his/her foot from the accelerator pedal to activate the brakes, wherein the HBC can generate an alert signal, such as by activating a hard braking light or transmission. It will be appreciated that the HBC may utilize the status of acceleration in a number of ways consistent with providing enhanced reaction advantage to the driver.

FIG. 41 exemplifies a sensor 1800 for detecting the amount of accelerator pedal depression. Any form of accelerator pedal sensor may be utilized within the present invention to provide the reaction advantages outlined herein. An accelerator pedal 1802, is capable of single axis movement for depression and release 1804 is acted upon by the foot 1806 of the driver. The accelerator pedal is often hinged 1808. A linkage 1810 is connected at a joint 1812 with the accelerator pedal and traditionally connected through a joint 1814 with a motion transfer mechanism 1816 whose output is utilized to control the throttle of the vehicle. The motion transfer mechanism 1816 is exemplified as an encoder disk with a central axis 1818 about which the disk rotates in response to accelerator pedal position changes. A biasing device 1820 biases the transfer mechanism 1816 toward a state of accelerator pedal release. The output of motion transfer mechanism 1816 is exemplfied as a linkage 1822 for further connection toward a throttle connection. A sensor 1824 is shown proximal to the disk encoder of the motion transfer mechanism 1816 for sensing the position of the attached accelerator pedal 1802. The sensor 1824 may utilize any of various sense methods, such as Hall effect, optical, resistive, such that the position and relative change of motion of the accelerator pedal may be determined and output as a signal 1826. It will be appreciated that accelerator linkages may be implemented in a wide variety of formats, and that the linkage shown in FIG. 41 is provided by way of example to indicate a single method of providing sensing of accelerator pedal depression. Furthermore, in the near term vehicles are being comtemplated utilizing electronic throttle control wherein the accelerator pedal is converted to a position signal for driving an electrical throttle input, such that no further need of an output linkage is required.

FIG. 42 illustrates an accelerator pedal signal conditioner 1830 which is configured for use with an HBC, or optionally as a standalone system. The signal conditioner 1830 is shown for connection with the accelerator pedal sensor 1824 by the wiring 1826, which is shown having three leads consistent with a two row optical or Hall effect encoder. The signal conditioner 1830 is shown exemplified as a microcontroller so that an intelligent calibrated output may be provided, such as the serial interface 1832 exemplified within the figure that may be connected to the HBC, such as line 175 shown in FIG. 5.

When utilized without an HBC, the acceleration sensor and conditioner of FIG. 41 and FIG. 42 may provide for a direct reaction advantage in a number of ways. First, the by sensing for an abrupt release of accelerator pedal pressure above a given speed, as registered by speed input 1834, the unit can slightly begin engaging the brakes. It can be presumed that at highway speeds, the driver will generally not abruptly yank their foot from the accelerator pedal unless they are attempting to engage the brakes. The system can start the process of engaging the brakes through a brake assist output 1836 which is capable of driving an activation device, such as solenoid 1838 connected to ground 1840. The system may also alert drivers behind the vehicle to the impending quick deceleration by activating a hard braking indicator, such as reverse lights, through the hard braking signal (HBS) line 1842. In the case of either HBC use, or use with other systems or as a standalone system, the sensing of accelerator pedal position can provide enhanced reaction advantages to the driver of a vehicle, as well as to those following said driver.

4.17. Swerve Sensor Input

Figure 15:
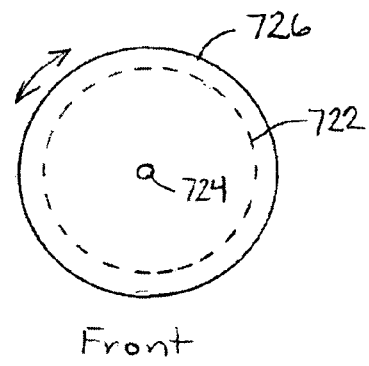
FIG. 15 is a front view of the rotational sensor of FIG. 14.
Figure 16:
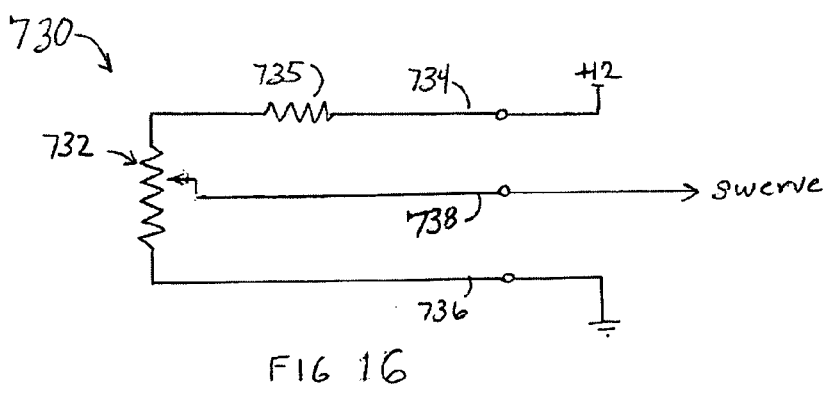
FIG. 16 is a schematic of the rotational potentiometer as shown in FIG. 14 providing a swerve signal to the HBC.

A swerve sensor input 172 of FIG. 5 is shown connecting to the microcontroller 148 of the HBC 142 so that information regarding abrupt swerving actions are communicated to approaching drivers. The sensor data is an analog signal received by an A/D bit of the HBC. A representative circuit for the swerve sensor is shown in FIG. 13, FIG. 14, FIG. 15, and FIG. 16. A means of sensing movement 700 of the steering shaft is shown. A steering wheel 702 coupled to a steering shaft 704 allows the driver to control the vehicle. A swerve sensor 706 is in mechanical connection with the steering shaft 704 and contains electrical connections 708 for interfacing with the HBC. This embodiment of the swerve sensor 720 employs a free-turning potentiometer 722 with an input shaft 724 on which is mounted an engagement wheel 726. The engagement wheel in this case has a compliant rubber exterior in contact with the steering wheel shaft 704. Rotation of the steering shaft is coupled to the wheel which in turn rotates the potentiometer thereby altering the output 728. FIG. 15 is the front view of the round wheel 726. FIG. 16 is a schematic of this simple swerve sensor 730. A free-turning potentiometer 732 (potentiometer can spin freely any number of turns) is used with a sense tap that changes with the angular position of the wheel. With power supplied 734 and a drop resistor 735, current passes through the potentiometer resistance 732 to ground 736. Potentiometer output 738 provides a voltage proportional to the position of the steering wheel shaft and therefore the steering wheel. Numerous alternative sense arrangements may be configured by anyone skilled in the art. For example, the potentiometer may be directly replaced with an optical encoder that provides a digital output. Additionally, Hall effect sensors may be employed, or a rotational acceleration sensor on the wheel, or response sensors connected to the mechanism of the steering box. The yaw movement of the vehicle could be used as alternate way of sensing vehicle swerving. The swerve would then be sensed by measuring the sideways acceleration of the vehicle by means of one or more acceleration sensors. Another axis may be utilized within either of the acceleration sensors already incorporated for sensing a crash within the HBC, or for sensing pedal acceleration within the pedal sense module.

4.18. Compass Heading Input

A compass input 158 in FIG. 5 provides direction of travel information to the HBC wherein approaching vehicles can be alerted to the danger selectively based upon their travel direction. Inexpensive electronic and electronically read mechanical compasses are reliable and readily available. This embodiment employs the output of a compass which is encoded in the output signal from the HBC, so that only vehicles traveling in the same general direction alert their drivers to the generated event signal. Although the transmitters and receivers are directionally oriented, this precaution further reduces the probability that vehicles traveling in the opposing direction will pick up enough signal intensity to trigger an unnecessary hard braking alert.

Figure 23:
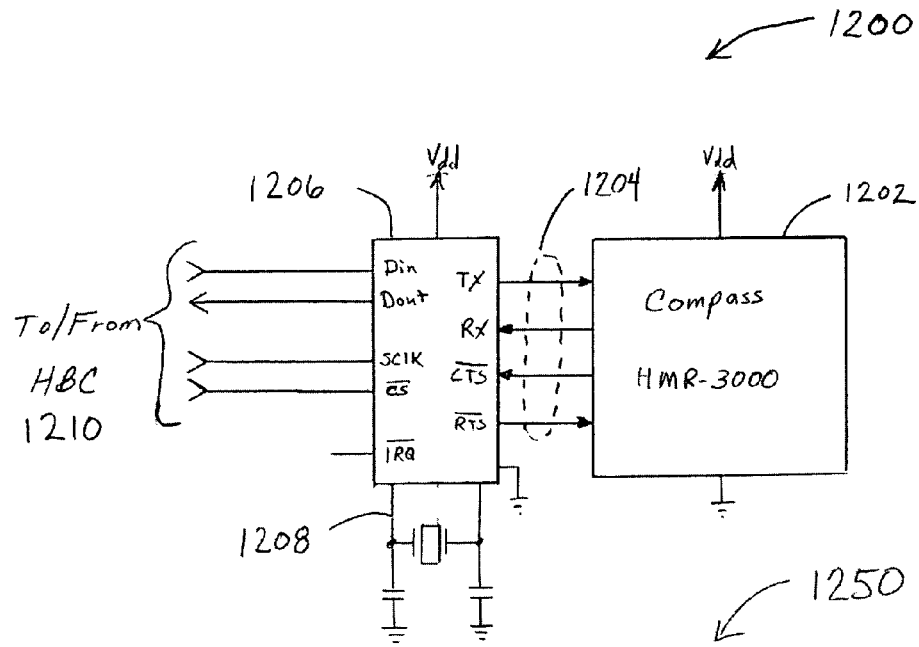
FIG. 23 is a schematic of a representative compass module according to an aspect of the present invention shown with interface to the HBC.

FIG. 23 exemplifies a compass 1200 shown configured for connecting to the HBC of the RAAC system. The compass utilized within this embodiment is a Honeywell™ HMR-3000™ Electronic digital compass which uses magneto-resistive sensors for detecting compass orientation. The compass provides high accuracy (0.5), an ability to tolerate tilting, and an RS-232 interface. The compass 1202 has a serial interface 1204 provided by a UART 1206. The UART shown is manufactured by Maxim Semiconductor™ as a MAX3100™, and it provides an SPI to RS-232 interface. The UART has a crystal section 1208 to provide the timing needed for the RS-232 interface. The UART is connected to the HBC via an SPI interface 1210.

The high accuracy of the compass used herein is not necessary for providing the rough readings required in quantifying the direction, as an accuracy of 15 would be sufficient. A simple compass, such as those currently manufactured within watches and other inexpensive consumer electronics could alternately be used. However, the high accuracy of the compass is useful when coupled with a GPS unit used as a navigation system. Often the direction information provided by the GPS alone is insufficient to determine navigation and turning information, but when coupled with high accuracy compass information, the GPS navigation system can more easily determine exact vehicle location on the roadway. Therefore the high accuracy compass used performs double duty.

4.19. GPS Coordinate Position Input

Additionally this embodiment contains a pair of serial data lines 160 from an optional global positioning system, GPS system. The position data from the GPS is transmitted as an auxiliary data packet by the HBC to approaching traffic upon the occurrence of an event. The coordinate data provided by the GPS allows precise alerting of drivers relative to location of dangerous events. Upcoming phase II GPS satellite location service (not to be confused with phase II HBC) provides distance accuracy within 125 meters, while systems developed using differential GPS can provide resolution of from 2 to 15 meters. The use of differential GPS requires the reception of differential error signals from ground based sources such as those provided by Coast Guard GPS beacons. Numerous GPS units are being manufactured currently and many of these contain internal microcontrollers capable of providing serial output.

Figure 24:
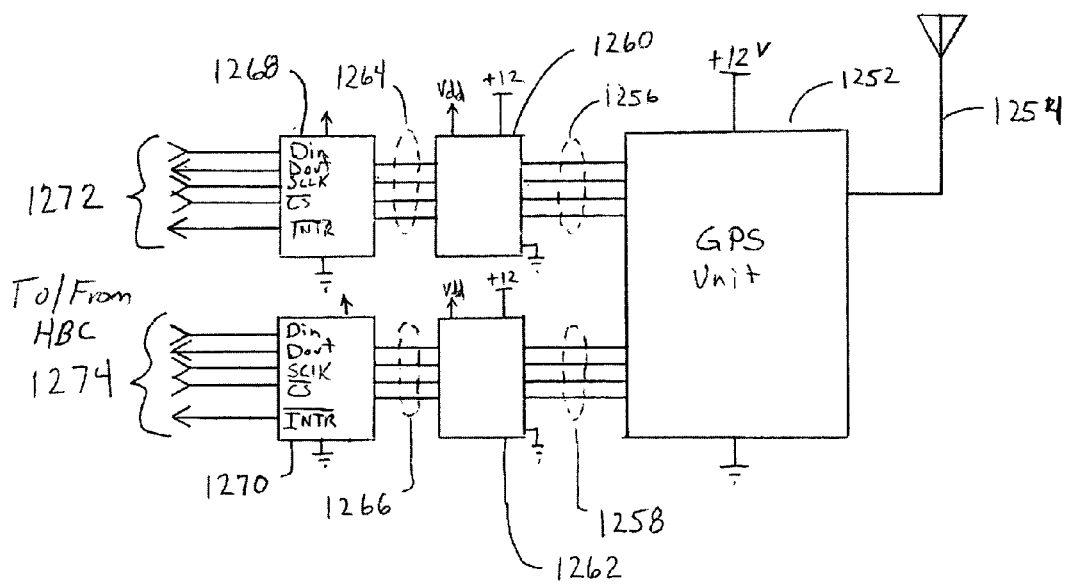
FIG. 24 is a schematic of a representative GPS unit configured for connection with the HBC system according to an aspect of the present invention.

Two serial interfaces are provided for the GPS. A serial data interface that is accompanied with an IRQ line for timely receipt of coordinate data, and a serial control channel for controlling the actions of the GPS. FIG. 24 is a preferred circuit 1250 wherein GPS coordinate data is generated by a Lassen-SK8™ GPS Board 1252 within a starter kit which is manufactured by Trimble Tracking and Communication Products™. (Lassen-SK8 is a registered Trademark of Trimble). GPS receives 1.575 GHz signals from orbiting satellites wherein the received time relationships of the time-stamped transmissions are used for triangulating the position of the receiver. The GPS antenna 1254 is a small antenna mounted on/near a top surface of the vehicle so that minimum signal impairment occurs. The GPS unit 1252 employs dual-serial channels, one for control while the other for data output. Since the RS-232 data ports are set for 12 Volt signal levels the serial data lines are translated to match the HBC unit. Each set of Tx, Rx, CTS, RTS, signals 1256, 1258 are level translated and buffered by circuits 1260, 1262, so that signal levels match those in use by the HBC. The RS-232 serial streams are then converted to SPI data by MAX3100 UARTS 1268, 1270 so that SPI control and position data 1272, 1274 can be communicated between the HBC and the GPS.

Various GPS circuits are available for providing coordinate data. Widespread inclusion, besides allowing the addition of numerous features, allows the power level of the transmitted event signals to be increased because the coordinate data from the GPS provides a nearly optimum event location qualifier. Additionally, the GPS provides the basis for additional features such as emergency 911 call out described below.

4.20. Emergency 911 Call Outs

With the addition of the GPS system, the HBC can register precise roadway position information. In order to further speed emergency crews to the scene of an accident, a wireless phone module 194 of FIG. 5 is connected to the HBC 142. The wireless phone module is connected with an SPI serial interface. The SPI serial interface bus 197 is provided along with a pair of module signals 193 for module selection by HBC and for IRQ generation by the wireless phone module. The IRQ allows the wireless phone system upon receiving calls to interrupt the HBC for other signaling purposes. User I/O devices 196 are connected to the wireless phone module, in this case a microphone and speaker. The phone transmits via the antenna 198. When the crash sensor is activated, or the airbag deployed, the phone generates an emergency 911 call. When the call is picked up, then the phone module transmits voice data from the HBC over the phone connection. The annunciator speaker 188 is already driven by the HBC to generate tones or voice, and this capability is extended with a signal 195 provided to the wireless phone system, so that specific emergency data may be provided over the wireless phone as audio tones or voiced info. It is assumed that the wireless phone module includes at least a DTMF generation chip, and possibly a modem, so that signals from the HBC, passed via the serial bus may be more quickly sent to the dispatchers. It should be noted that the HBC unit also provides the HBC unit ID number (which may be the VIN number of the vehicle) which is additionally provided as a voice so that the 911 operators can record in which vehicle the event has occurred. (And provide a means of eliminating possible false signals, should the need arise.)

The speaker and microphone 196 within the vehicle are activated in the case of a crash so that the emergency dispatch operator may attempt to speak with the driver and occupants to assess their condition. A special Emergency 911 button 199 is also provided within the HBC should 911 help be required in other emergency situations. Preferably the button is provided with a latched flip open cover to prevent accidental activation. When pressed, button activation is detected by the HBC which first asks for a user confirmation via audio or display such as "E911 activated— turn it off unless this is an emergency". Then if it remains activated, then a call is made wherein the HBC sends pertinent location and ID information while the microphone and speaker can be used by dispatch personnel to speak with the occupants.

Depending on configuration, the wireless phone with its microphone and speaker may additionally be used by the driver for non-emergency phone calls, so that the unit can perform double duty. The phone module contains a standard plug-in interface to the system to facilitate replacement when wireless infrastructure changes warrant updating.

4.21. Distance Sensor Input

A distance sensor input 174 of FIG. 5 is used to provide information to the HBC about the forward distance to the next vehicle and the closing speed on that vehicle. The current implementation employs a 6500 Series™ sonar ranging module from Polaroid™. This front-mounted forward-directed sonar-ranging module contains a SN28827™ circuit from Texas instruments™. The 6500 series module drives an electrostatic transducer from Polaroid Corporation. The module provides an acoustical ultrasonic signal at about 50 kHz, whose echo (reflection) is displaced in time proportional to the distance and the speed of sound under present atmospheric conditions. The module can sense distance up to about 35 feet, although the acoustic technique employed can be extended with improved sensors.

Figure 25:
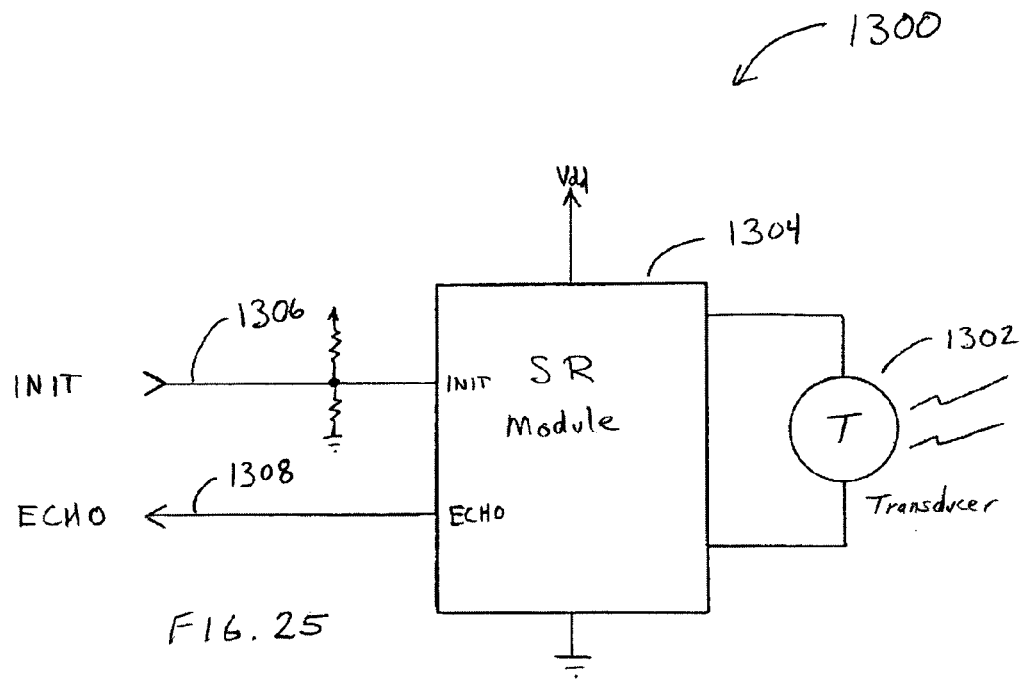
FIG. 25 is a schematic of a representative sonar ranging module according to an aspect of the present invention which is shown configured for connection with the HBC.

FIG. 25 is a schematic 1300 of the distance sensing module set up for connection to the HBC. An ultrasonic transducer 1302 is used to both send and receive sound ultrasonic sound pressure waves. The sonar ranging (SR) module 1304 provides the drive and analog signal correlation circuits. The module provides an INIT input wherein the start of transmission commences after the INIT signal 1306 goes high. (input is shown with terminating resistors) When the SR module has received an echo from the sound transmission it sets the output ECHO signal 1308 to high. The HBC in this way can set INIT high and then measure the time until the ECHO signal goes active.

In FIG. 5 a pair of microcontroller signals 174 are shown, an INIT signal is activated and then the time is measured until the ECHO signal arrives. The time between INIT and ECHO is divided by approximately 1.78 by the microcontroller firmware to arrive at the round trip distance in feet. By taking successive measurements, the approximate closing speed may be calculated in relation to the vehicle ahead. The distance information, when used with the speed information is useful for qualifying events in relation to their relative risk, or danger. For example a hard braking event that occurs 35 feet ahead at 50 miles per hour may not be regenerated to additional vehicles since this car and subsequent vehicles should have adequate reaction time. The "danger" level sense provided by the distance sensor coupled with a speed sensor allows the HBC to assist the driver in reacting to the dangerous event.

4.22. Assisted Braking with "Tailgate" Control

A brake assist output BrAssist 168 of FIG. 5 and tailgate sensitivity adjust 170 are employed so that the HBC may apply initial pressure to the brakes of a vehicle in cases where an event occurs ahead and the data received by the HBC indicates that the driver will/may not be able to react in time. The HBC applies the brakes until the driver applies a sufficient level of braking pressure, as measured by the brake pedal pressure sensor. The release of assisted braking is similar to that employed within a cruise control device. It will be appreciated that the brake assist signal, as is the case of many other signals within FIG. 5, are optional and dependent on the desired implementation phase and desired features of the subject RAAC system.

Assisted braking can improve the reaction time of the driver. Under normal circumstances of use, it is anticipated that assisted braking will be able to apply the brakes at least a few hundred milliseconds before the driver. This extra time when the vehicle is at top speed can dramatically improve the chances of the vehicle stopping/slowing from highway speeds in time to avoid an accident. Applying the brakes even 200 mS earlier from a speed of 70 mph allows the vehicle to stop about 20 feet earlier.

If the HBC determines that the driver will/may not be able to react quickly enough to an event signal which has been received, the HBC triggers a braking assist solenoid by activating the brake assist signal 168 of FIG. 5. The solenoid may be a conventional electrical solenoid with a winding through which current is applied to move a plunger which pulls or pushes the brake system into activation. Brake activation under HBC control can be accomplished with various alternate actuators, such as electrically activated hydraulic cylinders, servo motors, or even exotic actuators such as "muscle wire". The signal driving the braking assist solenoid within this embodiment is pulse width modulated so that any desired level of brake activation may be achieved under the control of the HBC.

Figure 26:
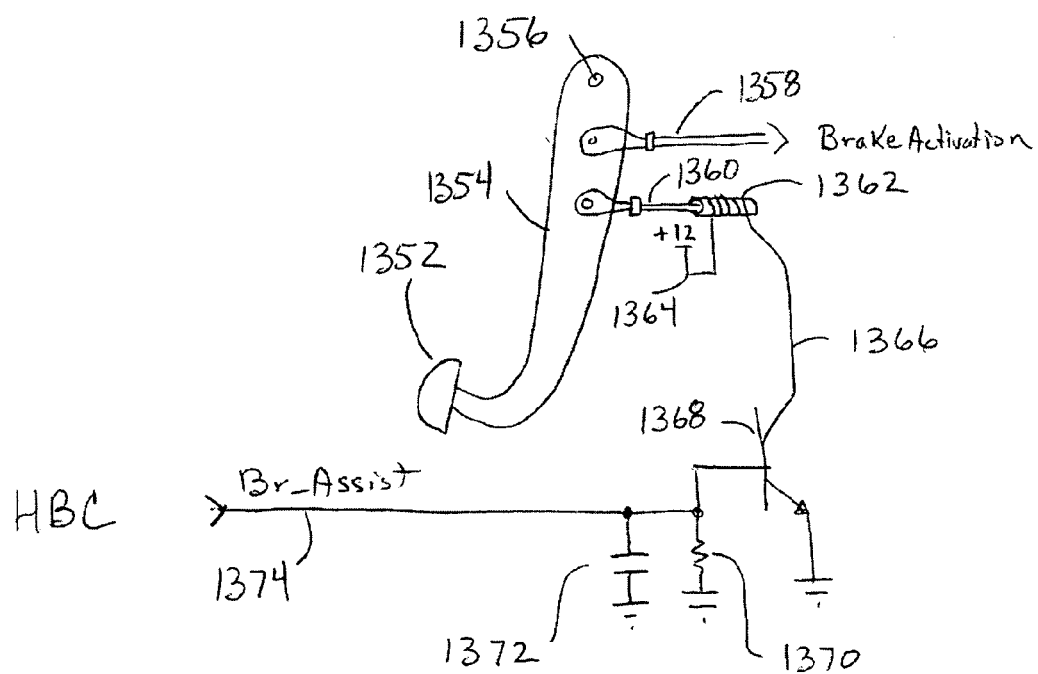
FIG. 26 is a diagram of a representative assisted braking mechanism according to an aspect of the present invention which is shown with a drive schematic for connection with the HBC.

FIG. 26 is a diagram of an assisted braking solenoid 1350 connected to the brake pedal lever. The brake pedal 1352 is attached to the end of the brake pedal arm 1354 which can rotate under foot pressure about pivot 1356. Depressing the brake pedal 1352 causes a compression of the brake actuation link 1358 which engages the vehicle's brakes. An assisted braking linkage 1360 is also connected to the brake pedal arm 1354, and terminates on one end as a slidable engagement with a solenoid 1264. In this case the solenoid 1264 is provided by a cylinder wrapped with a wire coil. One end of the coil 1364 is at nominal 12 volts while the other end 1366 is connected with a drive circuit. The drive circuit is exemplified as a transistor 1368 with emitter to ground, base connected with a resistor 1370, capacitor 1372 to ground, and a signal input 1374 supplied from the HBC. Activation by the HBC of the signal 1374 turns on the transistor such that current flows through the coil of the solenoid whose magnetic field increases which draws the ferro-magnetic activation rod further into the coil which thereby activates the brakes to assist the driver.

In order to determine tailgating danger, the distance information is correlated with both speed and closure speed information which is correlated to a driver selected "tailgate" value. A "tailgate" sensitivity control 170 of FIG. 5 is provided to allow the driver to set the amount of assistance desired from the assisted braking device. The tailgate sensitivity adjustment 170 herein is preferably presented to the driver in relation to the number of car lengths per every 10 mph of speed. The sensitivity control within this embodiment uses a simple potentiometer whose wiper value voltage is read by the microcontroller 148 to determine the setting of the tailgate control. It must be understood that various means of providing user input can be substituted for the potentiometer while still adhering tot he inventive principle outlined.

Perhaps the majority of drivers have heard that their following distance should be at least one car length for every 10 mph of vehicle speed. However, in the actual world of commuting, a large percentage of drivers appear comfortable with values as low as 10 feet at 60 mph; which is less than ⅙ of a car length per 10 mph. The sensitivity adjustment of this embodiment is set to allow as low as ¼ car length per 10 mph and provides a range up to over 1.0 car lengths per 10 mph. A detent position below ¼ car length per 10 mph allows the brake assist function to be disabled. It must be noted that the braking assist solenoid is not activated at the time when "tailgate" parameters are violated; however a very short audio alert is generated (depending on driver audio sensitivity setting) by the HBC when the distance in relation to speed falls below the tailgate value selected. The brake assist solenoid is only activated if a hard braking event (HB1, HB2, HB3) occurs directly ahead, while the tailgate parameter is being violated. The HBC activates the brake assist solenoid to apply the brakes so that the vehicle can begin to slow down before the driver reacts to the alert. It can take drivers as much as one second to get on their brakes once an event occurs. The time from event recognition to brake application by the HBC can be performed in under 20–50 mS. Keeping in mind that highway speeds can often exceed 100 feet/second (70 mph), the time saved may translate to a significant reduction in collision related destruction.

4.23. HBC Monitor Circuit

The firmware of the microprocessor 148 contains various self tests to ascertain the functioning of the system. Should the microprocessor fail, a monitor circuit 150 prevents the false generation of event signal output. Failure rates of modern microprocessors are almost insignificant, and the chance of a microprocessor failing in a mode with only signal generation affected is even lower. However, the addition of a small microcontroller to monitor the system is a very inexpensive method of being certain that invalid, or even malicious, event signals are not being generated on the roadways. Monitor 150 is connected to a common SPI serial bus (not shown) having controller inputs 205 and outputs 206 as shown in Table 2.

If the monitor detects errors in the generation of signals by the HBC, it turns on an error indicator 200 and can pull the Master Clear line of the Microprocessor 201, being held up by a resistor, down to a low state to thereby hold the microprocessor in a state of reset. Additionally, an external reset switch 202, can be toggled to allow service personnel to disable the HBC system. If monitor 150 detects problems with HBC functioning, it has numerous options depending on severity. It may signal the HBC by Log IRQ signal 205 and thereby send it a command packet, such as a restrictive functioning command. The HBC functions are checked and the HBC can be set to reduced functionality, or even a state of passivity, by the monitor circuit. As previously mentioned, monitor 150 may also hold processor 148 in a reset mode if the processor operations can not be trusted even in a passive mode.

The HBC is shown with a connection 207 to an FBLID system according to an aspect of the present invention. The FBLID system generates a signal to the HBC in response to the optically detected brake light status of vehicles ahead.

The HBC is further shown with a connection 208 to a FLAC system according to an aspect of the present invention. The FLAC system provides information to the HBC in response to correlated external audio events, such as brakes squeeling as a result of hard application. The FLAC thereby extends the reception of event conditions which have not been transmitted by a Phase II, or higher, RAAC system; such as may occur prior to the inclusion of the RAAC system, or similar, in all subject vehicles.

5. Event Signal Mapping 5.1. HB Event Levels

Within this preferred embodiment seven braking event levels are delineated. It should be recognized that the present invention may be implemented with event classifications designed in a variety of ways with a varying number of levels.

The highest severity event with regard to this system is considered to be a crash event. A crash event is considered a level 1 hard braking event (HB1). The seven hard braking levels exemplified within the present invention are described in Table 3.

Additionally, it should be understood that in relation to a particular vehicle, a few of the event levels may be either created as a generated event or a received event. Differences exist in the handling of generated events versus received events.

Causative events are mapped to the event levels shown in a variety of ways. Level HB1 Crash occurs when the vehicle itself experiences an impact which sets off the crash sensor. It is not determined by the braking of the vehicle, but one could say it is determined by the "breaking" of the vehicle, as per an impact. HB1 may also occur as a received event wherein the vehicle itself receives a message from another vehicle which has experienced an impact. The crash sensor is triggered if a sudden deceleration exceeds a certain level. Braking itself can produce only a nominal force based on tire adhesion forces which rarely exceeds around 1 G. Impact forces can be on the order of 50 Gs of deceleration. In this embodiment the crash sensor activates above 5–10 Gs, although any large value distinguishable from hard braking can be utilized. The crash sensor data is checked against the pedal acceleration as it too will show a sudden acceleration at the time of impact. By correlating the two sensors, he probability of false alarms is reduced.

Level HB5 Emergency flashers are similar to the crash event in that it is generated by a vehicle event unrelated to the extent of braking. Emergency flashers can be deployed by a driver that has experienced a roadside condition or at some time after an accident has occurred. The event is significant to approaching drivers as they should approach with caution and reduced speed. Obviously a level HB5 is not as important to safety as an HB1 event. The emergency flasher event can additionally be received from other vehicles.

Level HB4 Emergency vehicles/Incidents is a level provided to allow emergency vehicles traveling on the road which are equipped with a special transmitter to alert drivers that they are approaching. Drivers so alerted are to provide a path for the emergency vehicle. Presently drivers often do not see or hear the emergency vehicle until it is directly behind them. Consequently, emergency vehicles are often catastrophically delayed while victims occasionally die awaiting paramedic attention.

Levels HB2 Brake Slamming and HB3 Hard Braking provide the core of the system. These two events can be either generated or received events. These two events are generated when the level of braking as perceived by the hard braking controller exceeds certain thresholds. These may be sensed in a variety of ways involving the pressure and/or acceleration of the brake pedal.

Level HB6 Abrupt Swerving is provided since drivers may respond to certain dangerous roadside conditions by either braking or swerving. If a large piece of debris is in the road, a lead driver may abruptly swerve since they can see the object from a distance. Drivers subsequently arriving at the debris may not have sufficient time to react. The HBC system in this case would alert approaching drivers to the swerve hazard ahead.

Level HB7 Condition reporting is provided to allow large low priority data packets to be transmitted and received. These transmissions are encoded with a packet number and a total number of packets so that sequences of packets can be ordered correctly for display to the driver. Level HB7 signals are utilized herein primarily for allowing roadside equipment, such as call boxes or vehicles of roadside crews, to transmit road condition information to drivers via their HBC units.

5.2. Speed in relation to HB Event

Speed data is used within the HBC of this embodiment to minimize unnecessary event signal generation, and unwarranted internal driver alert signal. Vehicle speed is herein divided into four representative categories which are shown in Table 4.

The speed data therefore is used to modify the generation of event actions related to the speed. For example, it is not generally necessary for vehicles traveling in parking lots to be generating alert signals to other drivers. Allowing event signal generation under any condition would allow surface street activities in some instances to affect highway traffic. In addition, the speed data is correlated to the rate at which the wheel is turned to arrive at a swerve value. Abrupt swerving that exceeds a set value within the firmware triggers an HB6 alert. For example at speeds in excess of 45 mph, a turn rate exceeding ⅛ wheel-turn per 100 mS wherein the turn rate continues for a total of two consecutive intervals may trigger the generation of the HB6 alert. Internal audio driver alerts are also repressed when the vehicle is stopped or moving slowly in situations where the event is not considered a dangerous event under present speed and conditions.

5.3. Direction in relation to HB Event

In order to even further limit the possibility of false triggering, this embodiment of the present invention employs an electronic compass heading sensor. The signal from the compass is used within the HBC to generate a set of 3 direction bits corresponding to the 8 compass points (N, NE, E, SE, S, SW, W, NW). Vehicles receiving alerts compare the direction of the vehicle sending the alert with the direction as generated by their own compass. Events HB2, HB3, and HB5 are preferably ignored if the difference between the vehicle directions exceeds 90. Largely this feature reduces reflective alerts to drivers traveling on a highway in the opposite direction. Alert signals are generated rearwardly to front directed receivers, therefore, a natural disposition favors a given direction of travel. However, signals projected rearwardly can reflect from vehicle surfaces and be received by drivers traveling in the opposite direction. Employing the compass data reduces this possibility.

5.4. Interpretation of Pedal Sensor Data

This embodiment employs both a pedal pressure sensor and an acceleration sensor for sensing hard braking events. The interpretation of the sensor data is a complex process that must take into account a number of factors. Additionally, the interpretive settings used can vary from one vehicle type to another, i.e. electronic brakes versus manual brakes. Therefore, the values discussed are representative values wherein the actual settings depend on calibrations tests within a given vehicle. In the current embodiment a set of sub-events are associated with the sensor information. These events are classified into tables from which the microcontroller firmware discerns events and produces action. The microcontroller firmware operates from these event and action tables in generating control responses. The sub-events could be both determined and categorized within the firmware itself but then a different set of firmware would be required for each instance, wherein a value substitution was required. Within the embodiment described, values for the event and action tables are retained as data tables stored within the program data store which is contained in Flash memory. Manufacturers can then vary the table data itself to accommodate any desired configuration without the need of altering and testing the underlying firmware program.

Table 5 provides a representative table of sensor threshold levels in which each of the three measured parameters are broken down into sub-event ranges with thresholds within each range. It should be noted, that acceleration data is sensed as a positive value only for positive accelerations, wherein zero and negative accelerations (which may indicate releasing of the brake pedal) are ignored.

An event table whose states are represented in Table 6, translates the threshold values for the pressure and change in pressure readings into events. The event table is used when the current system state is inactive with no hard braking events signaled. The event "-none-" indicates no hard braking activity, while the event "-Alert-" indicates that the system must prepare for a change, the firmware drops extra non-essential activities (processing of incoming signals) to concentrate on processing sensor data.

Similarly, tables preferably contain data for each system state and set of events to be generated. Table 7 exemplifies events generated from an HB3 state. The acceleration sensor data is not shown within the above tables as it is used as a modifier to weight the event responses. When the acceleration sensor indicates the pedal is transitioning rapidly (value=High) then if the system is in a non-active state (no hard braking being signaled) then the transition is considered to be a non-confirmed indication of hard braking, wherein the hard braking indicator would be signaled to following vehicles, but a transmitted signal would not be generated until a confirmation was found. If the system is already signaling a hard braking event, then the acceleration data is ignored. Additionally it must be recognized that the event to be signaled is also determined by the state of the system and by any signal receptions from vehicles ahead.

It will be appreciated by anyone of ordinary skill in the art that the aforementioned events may be alternatively categorized and determined without departing from the teachings of the invention.

6. Event Signal Transmission and Receipt 6.1. Communicating Events

As described previously, event signals are utilized for remotely alerting drivers to possible dangers ahead so that they may take preventative actions, such as braking, to avoid being involved in an accident. Event signals within the system are communicated from event signal transmitter (EST) modules to event signal receiver (ESR) modules.

An embodiment of the invention comprises a pair of FSK modulated radio-frequency data modules for the transmission and receipt of data between vehicles. The particular RF transmitter and receiver described are manufactured by Linx Technologies™ as their HP Series™ of high-performance digital/analog modules. This transmitter/receiver pair operates in the high UHF band (902–928 MHz) and provides serial communication up to 50 Kbps. The use of high frequency transmissions allows for the use of small antenna structures which can be easily configured, or shielded, to provide a directional orientation to the transmitted signal. The power output of the transmitter is very low, and when coupled to the small directional antenna, provides a maximum unobstructed signal reception distance between a transmitter and a receiver of approximately ⅛ of a mile.

Numerous methods of providing remote communication may be alternatively utilized, which by way of example include, discrete RF solutions, and Blue Tooth communication modules. One of the alternate RF coding techniques is the use of simple On/Off Keying (OOK), although it generally provides a lower data rate than other techniques. Additionally, QPSK, broad-band transmissions, as well as others can be employed within the system. Although RF signaling is used in this embodiment data transmissions between vehicles may be communicated with audio signals (such as ultrasonic), or even with light signals, such as infrared. It must be realized that various transmitter/receiver pairs can be substituted within an embodiment of the invention without departing from the inventive principles, since any form of transmission and low-level transmission protocol can be adopted, so long as the event signal transmitter module can transmit data bits which the event signal receiver module can register.

When an event occurs such as a crash, or the slamming of brakes, an event signal is transmitted to approaching vehicles. On a crowded freeway the event signal may be attenuated by closely approaching vehicles. As a result, the event signal may not propagate sufficiently to alert all drivers to the event so that they may apply their own brakes. Therefore, an embodiment of the invention provides for controlled signal regeneration capability, wherein vehicles receiving event signals selectively retransmit those signals to allow drivers farther behind to be alerted so they may start slowing.

6.2. Regeneration Limitation

If each event signal generated by a vehicle were to be regenerated at the same intensity level by every vehicle within range, then on a crowded freeway the possibility would exist that one event signal could be propagated for miles. To eliminate this possibility, a novel approach is taken with regard to generation of signals in response to those received. Each event signal transmission is coded with unit code, severity, and a regeneration counter. Received transmissions are checked and are regenerated a maximum number of times as set by the severity of the hard braking incident. In other words, an event received for a crash will be regenerated for a larger count than a simple hard braking event. A crash event within this preferred embodiment regenerates up to five times, a brake slamming event for two, and a hard braking event for one. Signals are regenerated with a count value of one less than the lowest count value being received. The HBC of the vehicle which originally generated the event, sets the maximum regeneration count, as the number of levels of regeneration is largely dependent on the conditions surrounding the event for which a signal is being generated. It should be kept in mind that the transmissions are generally line of sight transmission and that a whole series of vehicles could receive the primary transmission, wherein a whole series would receive the secondary and so forth. Since a crash event is a static event the transmission frequency of the coded signal is sent with longer intervals between each transmission (generally 200 mS instead of 50 mS), this extra time allows the receiver to receive a larger number of transmissions.

Figure 6:
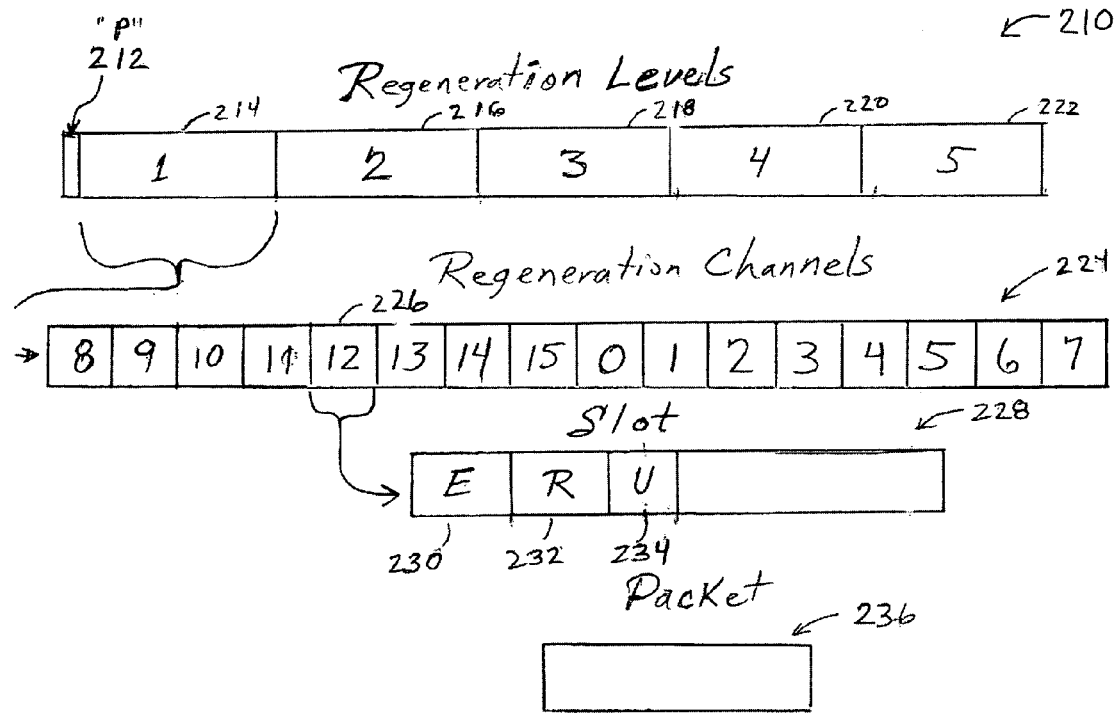
FIG. 6 is a diagram of the regeneration levels used for regeneration of event signals within phase II, III, and IV according to an aspect of the present invention.

FIG. 6 shows a diagram of regeneration levels utilized within this embodiment of the invention. When a vehicle crashes into another vehicle, the crash sensor is activated by the high G forces and a crash event is transmitted. Within this embodiment a crash signal is regenerated up to a maximum of five times in a set of five regeneration levels 210 as seen in FIG. 6. The primary transmission "P" 212 is generated by one of the event generating vehicles involved in the crash. The system is designed such that within any event situation, there is but one primary transmission. The first car to signal an event within a given group is the primary event generator, whereas subsequent event generators and regenerators synchronize with the event signals of the primary generator. The mechanism by which this is accomplished is explained later. The primary event signal represented by "P" 212 is received by a number of following vehicles within the reception range of this primary signal. A certain number of these vehicles will regenerate the signal as a regeneration level 1 signal 214. Those behind the level 1 group, which receive the level 1 regeneration signal, but not the primary signal, can then regenerate the signal as a level 2 signal 216, those that receive the level 2 signal but not the primary signal, or level 1 signal, can regenerate the signal as a level 3 signal 218, and so forth back for up to five levels. Each HBC only acts to regenerate a single signal which is the one at the highest level received. In this way unproductive multiple regenerations are not produced.

6.3. Event Signal Data Packet Bits

It can be seen that the primary signal "P" 212 is shown in FIG. 6 as a short transmission segment while the remaining retransmissions are shown as longer blocks of signal. This depicts the manner in which the regeneration intervals are implemented. The level 1 regeneration interval 214 is shown in greater detail as sixteen regeneration channels 224. Regenerated signals and additional events are signaled within these channels.

After checking that no other vehicles are in the process of transmitting an event signal, a vehicle signals an event by transmitting a packet of event information. Fields and bits contained within a representative event data packet are represented in Table 8. The data in an event signal packet is arranged with higher priority information at the head of the packet. Therefore, should a packet be cutoff during receipt, the critical information thus far received can still be used to alert the driver, although the regeneration of an invalid packet is generally not performed. The data packet for the primary event generator contains a hard braking level (HB1–HB5) which indicates the severity of the event. An active event flag signals whether the event is active or regenerated (always=1 in the primary). The regeneration number contains a value for the number of times the signal can be regenerated. A maximum value of five is preferably utilized for crash events, with a value of two for brake slamming events and a value of one for hard braking. These are representative values and can be set to other levels as desired while still adhering to the inventive principles. An auxiliary data flag is set to one when additional data is contained within the packet and alerts the receiver to properly collect this auxiliary data. Slot number is derived from combining the HBC unit ID number with the present timestamp, wherein the slot number can vary slightly over short periods of time. Slot number is used for splitting up prospective respondents into various slots within a set of regeneration intervals. A set of direction bits are provided in which the direction of the vehicle experiencing the event is encoded. The direction information is used by receiving HBCs to determine if the event signal is relevant to them. An ID field contains the unique ID number of the HBC unit.

This ID is propagated through all regenerations so that respondents can determine and react if another vehicle begins acting as the primary vehicle. An auxiliary field for containing position data is also shown. This field is optionally included in the packet if the vehicle generating the original event signal employs a GPS connected to the HBC. This auxiliary field may contain other data as well.

The packet used for passing condition reporting data as HB7 data is in a different format than the normal packet, and is outlined in Table 9. The structure of the HB7 packet is similar to a standard packet. A condition report can consist of a number of associated packets. To assemble these packets into a report for display to the drivers (or to be spoken by an audio annunciator) the relative packet number and total number of packets in the condition report must be known. Therefore a Packet number is added. The regeneration information was eliminated as HB7 packets are never regenerated. The ID field was also eliminated as well as the GPS data field; these fields were replaced with a packet data field of 64 bits. The data in the packets within this embodiment can be encoded in two ways. ASCII data can be passed as 8 bit bytes, wherein a total of 8 bytes are passed per packet. The maximum number of character which could be sent is then 128 characters. Also a set of standard condition phrases can be sent by sending an ASCII control code which is interpreted into a string of ASCII bytes. For example rather than sending "Roadcrews" working on left shoulder prior to Watt Ave. exit", a control code is sent which translates to "Roadcrews working", another control code for "left", another for "shoulder", and another for "exit", as these are all common terms used for building condition reports. A standard set of these control codes are defined for use in the system. A translation table is retained by the HBC non-volatile memory.

6.4. Regeneration Channels, Slots and Regions

Event signal regeneration occurs in slots within regeneration levels 210 of FIG. 6. The first signal generated is considered the primary signal "P" 212, it is the event from which the approaching drivers need to be alerted. Up to five regeneration intervals 214, 216, 218, 220, 222 can follow an HB1 event. The first interval 214 is subdivided into 16 regeneration channels 224. In the example shown, the 16 regeneration levels begin with a slot "8" then wrap back to a slot "7". The event signal packet generated by the primary sender in this example had a slot number of "7" encoded. The HBC within the vehicles which received this primary data packet recognize that the event is to be regenerated. If they all were to regenerate the signal a transmission confusion would result, therefore, the slots allot respondents an interval in which to regenerate the signal. Those receiving the transmission calculate a slot ID from their embedded ID number and a portion of the timestamp value. The calculation provides a time variance of a few slots, so that a particular HBC may for example be able to arrive at slot numbers 4–7, or 11–13 as determined by changes in the timestamp. This calculated slot number is used to determine the preferred slot number in which to transmit a regenerated signal. A prospective responder upon receiving the primary event signal, sets up a time-base wherein all transmissions are synchronized to slot sized intervals. Event signal receivers synchronize to the center of bit sized intervals within the slots. For the example of FIG. 6, if the slot calculated were 8, then the HBC would check for a clear transmission channel and then wait until it reached slot 8 to regenerate the signal. However, the above description is a slight oversimplification of the embodied process. The slot is actually further broken down into regions so that various classes of respondents can be accommodated. First of all, other vehicles may also be slamming on their own brakes and wish to generate an event signal. Secondly, the handling of multiple instances of multiple respondents on the same channel requires accommodation. Slot 12, 226 is shown broken down 228 into four regions: event region 230, regenerator region 232, and unused region 234. The actual packet size is shown 236 in relation to the slot which is twice as long. The use of the regions is determined by the state of the prospective slot user and the value in the timestamp register of the microcontroller. A prospective HBC event signal generator after receiving the primary transmission delays to reach its designated slot value for transmission and then delays again for a calculated region interval. The region calculation takes into account the various factors.

$$\text{region\_delay} = (\text{Regen\_}f * E\text{Const}) + (T\text{Stamp XOR } T\text{Const})$$

A hard braking controller within a vehicle experiencing an event have their Regen_f=0 and can attempt to secure the transmission channel ahead of HBCs whose vehicles are just wishing to transmit a regenerated signal. The value of (TStamp XOR TConst) is a pseudo-random value created from the timestamp that artificially separates respondents seeking the transmission channel. So in practice, vehicles that have their own hard braking event will delay a short random period within the slot, while checking for other transmissions, and will send at the appropriate time if the channel is ready. As there are actually two events occurring here, the HBC will send the highest priority event. Therefore, if a crash were to occur ahead, and an approaching vehicle were then to slam on its brakes, the signal passed rearwardly as the crash signal is the more important signal. Vehicles whose HBC is trying to regenerate the primary event will delay within the slot to give active respondents time to secure the channel, then they delay a short random period within the slot, while checking for other transmissions, and will send the regenerated signal at the appropriate time if the channel is otherwise clear. This embodiment additionally encourages the transmission of generated events over regenerated events by transmitting regenerated events at 6 dB lower power. All respondents desiring to generate a transmission within their own slot will have started transmission by the time region "U" 234 arrives. If no one is transmitting by the time region "U" is reached within the slot, then responders unable to transmit during previous slots, due to other respondents using the channel, can then secure the channel and use it to respond starting in the "U" region. All transmissions are started within the first three intervals of the slot to assure that transmission completes within the slot and does not spill over into subsequent slots.

Regeneration at subsequent levels is similar. A prospective regenerator can fall into, one and only one, of the regeneration levels. The region which they fall into is determined by the highest level of transmission received. All prospective regenerators that received the primary transmission can ONLY respond as level 1 regenerators. Those that do not receive the primary signal, but receive a signal from a level 1 regenerator, then become prospective level 2 regenerators, and so on. This method provides a maximum depth of signal dispersion for the particular regeneration count used.

If an event is still active, such as a hard braking action, then the primary event signal is regenerated at regular intervals. Each time the primary event is regenerated, the slot number is recalculated and bumped. In this example the slot number is intentionally bumped by five on each iteration of the transmission. This slot bumping allows reapportioning of the slot numbers so different slots will come first. Additionally, the calculation within each prospective respondent will provide a new time delay in which different respondents within the same slot interval will then get the chance to transmit. By allowing various respondents within a group to perform the transmission, the transmission can reach farther back in the group of vehicles and receipt of the packets are thereby less prone to obstructive influences.

One significant case has not been discussed. Vehicle "A" begins generating an event signal (primary vehicle), such as hard braking, and within a few milliseconds a vehicle "B", only slightly farther up the highway than vehicle "A" also begins generating an event signal. Vehicle "B" does not receive the primary event signals from vehicle "A", as it is ahead of vehicle "A", and therefore "B" appears to have a clear communication channel and sends an event signal packet. The system handles this condition by allowing the signal from "B" to become the new primary signal. Other vehicles that have just received the primary packet will receive this new primary packet which contains a different ID. The new ID alerts them to the fact that it is a new primary signal, the old primary sender also received the new primary signal and now queues up behind the new primary transmission. Vehicles receiving the alert will alert their drivers but retransmissions are then based only upon the new primary signal. If a transmission is cut off, then the alert information is passed to the driver as a visual or audio alert while any retransmissions to other vehicles must wait for error free packets. In this way the data within the group resynchronizes to the lead event generating vehicle and the approaching vehicles respond and synchronize accordingly.

6.4. Start Bit Sequence

Figure 7:
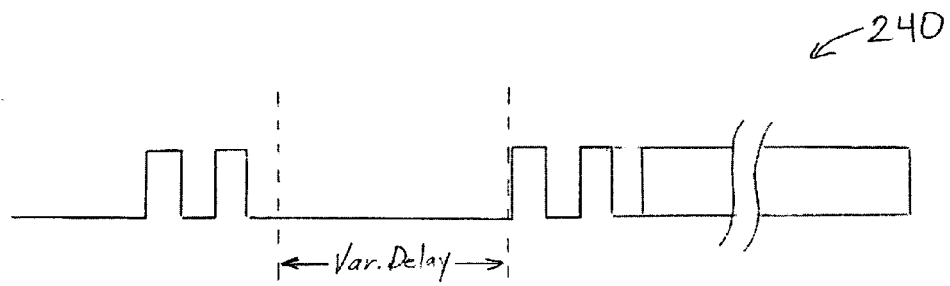
FIG. 7 is a representative bit string header for an event signal packet according to an aspect of the present invention.

It was mentioned that each prospective respondent waits for a clear communication channel before sending a signal within its respective slot and region. FIG. 7 shows a possible start bit method 240 used for determining if the communication channel is being used. If no other signals are being received, then a pair of start bits are transmitted in a specific time relationship. Each start bit is half the duration of a normal data bit used in transmissions and therefore the start sequence is identifiable even when it overlaps transmissions from another signal source. After transmission of the first pair of half-width bits, a delay interval occurs during which the transmitter checks for received transmissions. If no other transmissions are received then another pair of start bits prefaces the packet of data being sent. The delay used herein is a variable delay calculated with a constant to which a limited random number is added. This randomness helps stagger the responses of respondents whose first start bits are coincidentally transmitted simultaneously with one another. Following the data packet is a checksum value that can be used to validate the entire packet.

7. Firmware 7.1. Overview

The firmware within the microcontroller of the embodied HBC measures hard braking information within the vehicle, keeps track of the event status of the vehicle, it controls the activation of hard braking indicators, it receives status from other vehicles, it sends status to other vehicles, it provides driver alerts, and it can receive input from the driver about how to process the alerts. From the discussion of the signal regeneration mechanism it is apparent that the rear-end collision reduction system is an event driven real-time system with numerous input and output devices.

Figure 8:
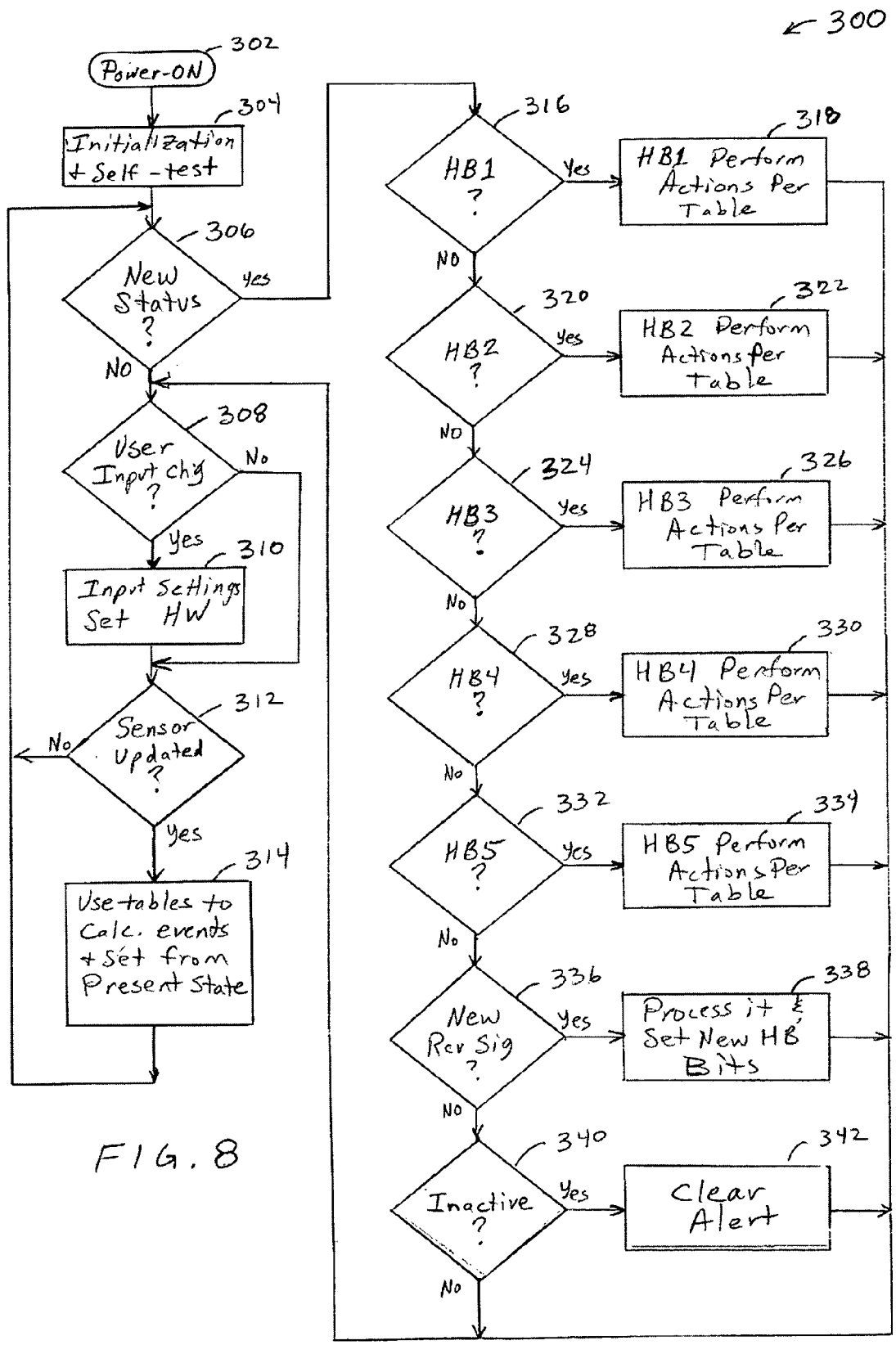
FIG. 8 is a simplified flowchart for the main loop of the HBC firmware according to an embodiment of the present invention.

In order to keep costs low and maximize performance and reliability the firmware of this embodiment is preferably written in assembler code as a main loop with interrupt service routines (ISRs) that handle time and event dependent activities. FIG. 8 is a simplified flowchart representation of the Main loop 300 within the system. At power on 302 the system initializes all data registers, memory, and hardware; after which it performs a self-test on its circuitry 304. A new_status byte is checked 306. If no new status information has been received (as a result of ISR operation) then the user input is checked for changes 308. If the user has input a change, such as changing sensitivity, then the system hardware is set for this new condition 310. A check for sensor updates is made 312 and if no updates then the Main loop restarts again. The ISRs process the sensor data to create a set of instantaneous and averaged values of pressure and acceleration. Large instantaneous changes can set off a hard braking event immediately, those that are less severe are averaged over a short period to create data which is periodically reviewed by the main loop to determine if a new hard braking state needs to be entered. The measured values are processed 314 according to tables (described previously) which determine what actions are to be taken in accord with the measured results. After checking status 306 and finding a change the main loop acts upon the status information based upon its current state. It drops down through a subroutine calling tree, blocks 316 through 342, starting with checking for state HB1 316. If the new state is to be as hard braking event level 1, i.e. Crash, then upon entry 318 the hard braking indicator is turned on, the driver is alerted, and the sequence for generating event signals to other drivers commences. In a similar fashion the other states, blocks 320 through 342, process their own state sequences. When a state transition occurs, the prior state is always retained as decisions are often based on the direction in which states are changing. When event inducing conditions are no longer present then this is also registered as a change of state which is processed. The main loop operates as other loop based routines.

Figure 9:
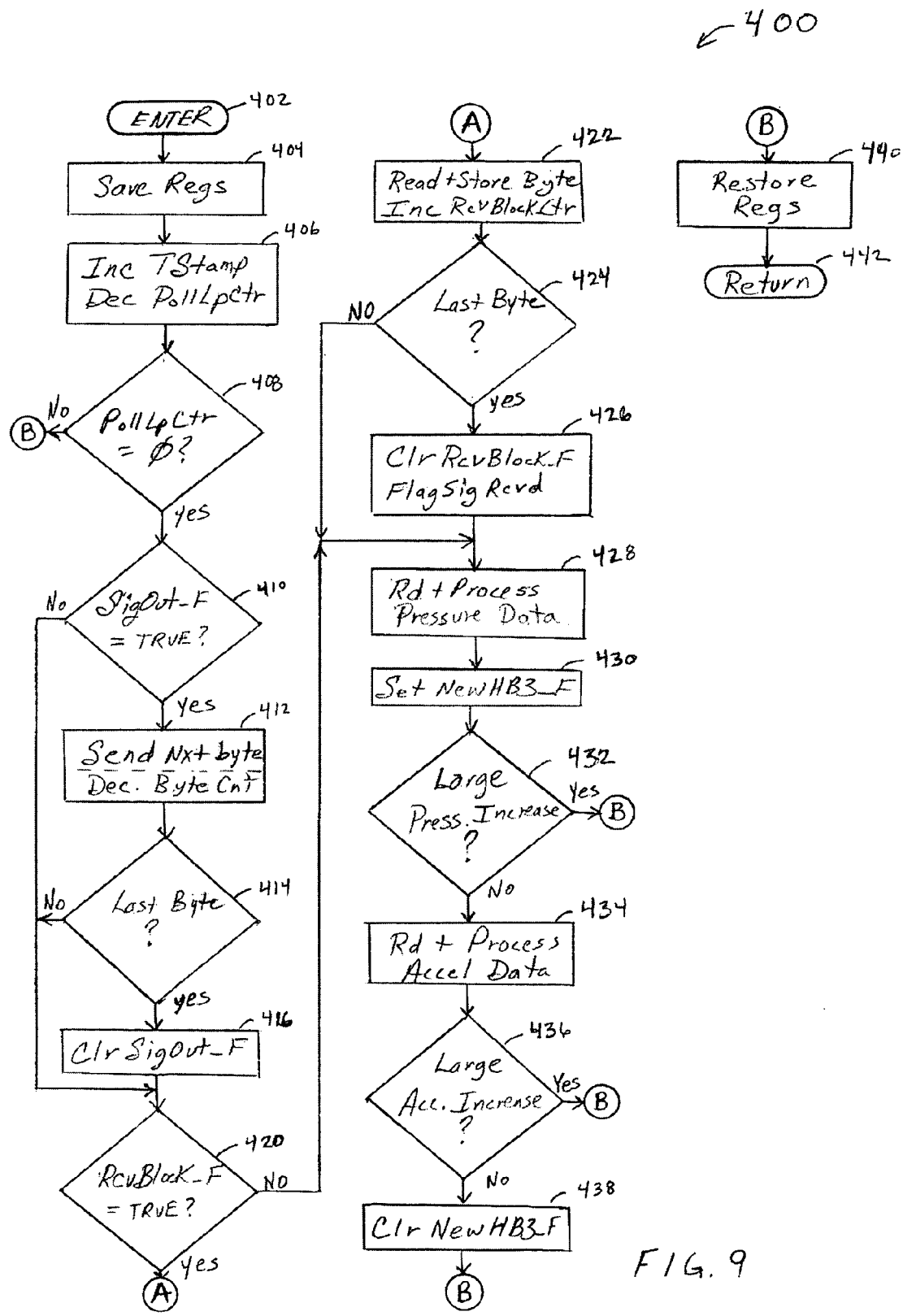
FIG. 9 is a simplified schematic for the ISR_Tick routine as used within the firmware of the HBC according to an embodiment of the present invention.

FIG. 9 is an ISR_Tick routine 400. This interrupt is driven by a periodic interrupt every 50 uS. When the interrupt occurs the ISR routine is entered 402 and the registers and status are saved 404. Upon each tick interrupt the timestamp, TStamp of the HBC is incremented 406. This time stamp is used throughout the system for relating events times. Additionally, a polling loop counter, PollLpCtr, is decremented. If the polling counter decrements to zero 408 then sensor data is processed. The time for the polling loop is set to match the basic serial data rate between the HBC and the event signal transmitter and the event signal receiver. A check for output signals is made 410 by checking SigOut_F. If the HBC has sent the previous byte then a new byte is loaded 412 for transmission to the serially connected event signal transmitter, and the byte transmission count decremented. A check for last byte is made 414 and if it is the last byte to be sent, then the SigOut_F is cleared. Similarly RcvBlock_F is checked 420 to determine if an event data packet is being received. If it is then the next byte of it is picked up and stored 422 and the count value is incremented. A last byte is checked (taking into account the auxiliary information bit) 424 and the RcvBlock_F is reset 426. A flag FlagSigRcvd is set to indicate to the main loop that new data exists for processing. Raw pressure and acceleration data are read from the sensors 428. An HB3 level is assumed 430 followed by a check for a large pedal pressure increase 432. ISR exit is made 440 with HB3 level set when any very large pressure increase is detected which appears to be certainly indicative of a hard braking level. The acceleration data is next read and processed 434. Again upon finding a large acceleration increase indicative of a hard braking event the ISR is exited 442 after register restoration 440. If neither case occurs then the assumed HB3 level is cleared 438 followed by register restoration 440 and exit 442. It should be noted that changes of pressure and acceleration are averaged over a number of these ISR intervals to produce a set of average and peak related values stored in memory. These stored values are processed within the Main loop to determine if they indicate the occurrence of a hard braking event.

7.2. Event Signal Receiver Module Firmware

Figure 10:
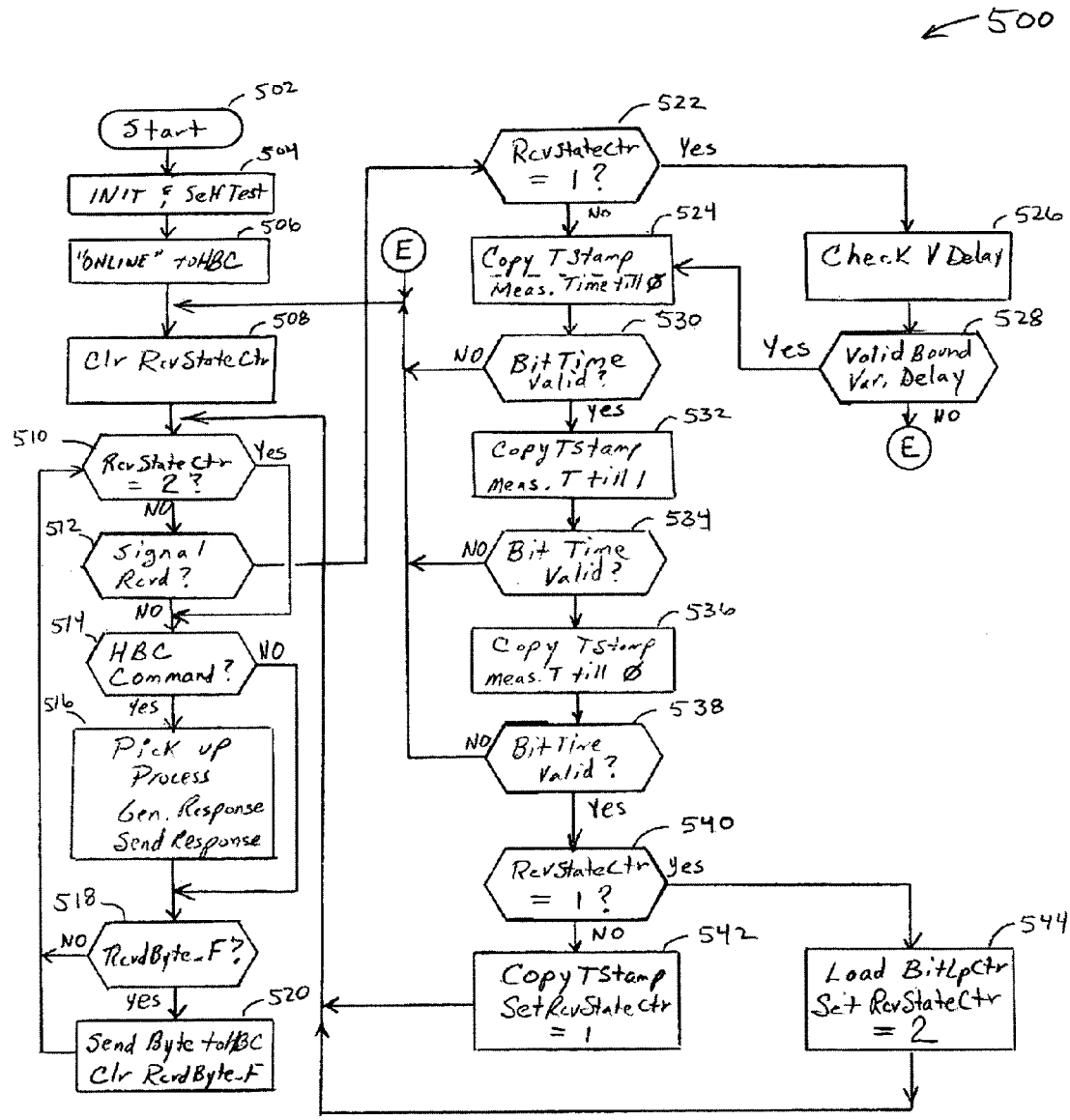
FIG. 10 is a simplified schematic of representative main loop firmware for the processor within the event signal receiver according to an embodiment of the present invention.
Figure 11:
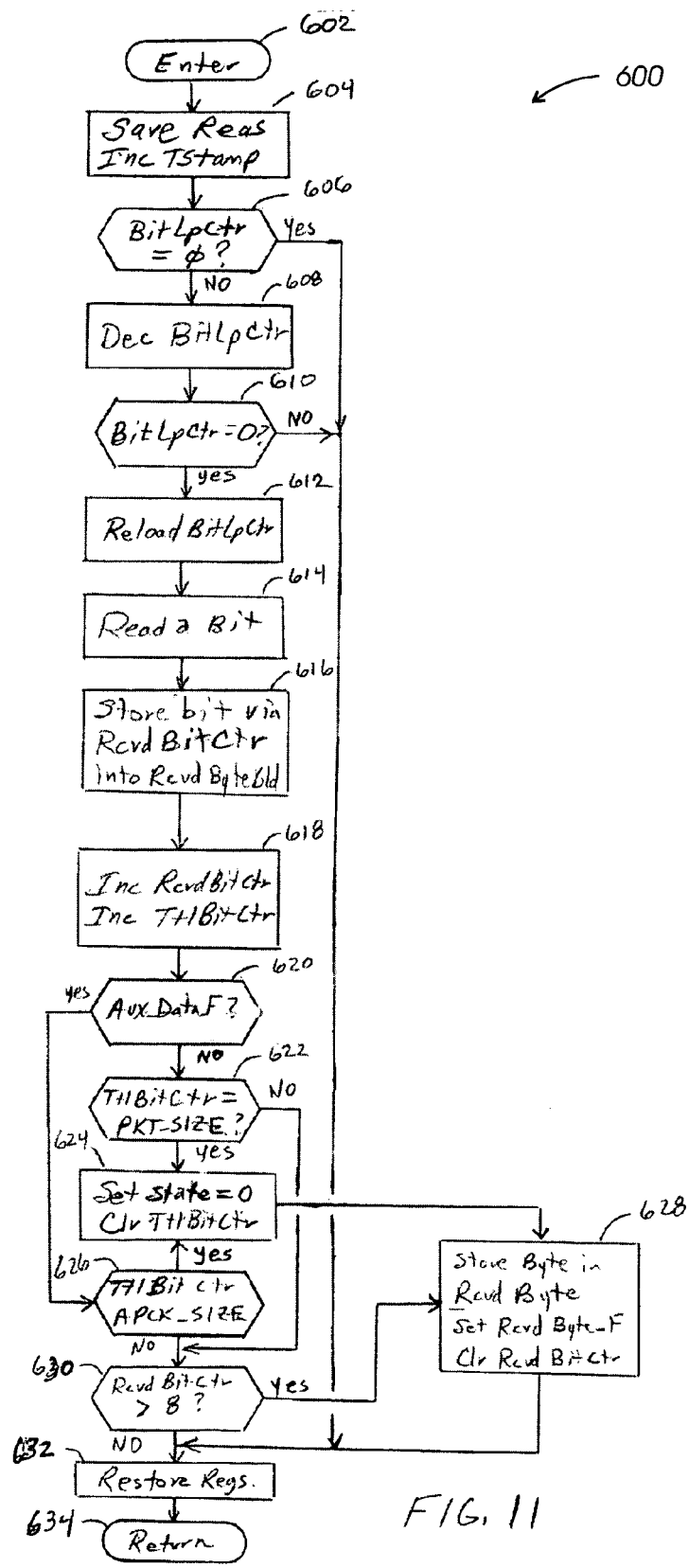
FIG. 11 is a simplified schematic of representative "tick" interrupt firmware for the processor within the event signal receiver according to an embodiment of the present invention.

The start bit logic on the event data packets was briefly described earlier. The ESR module validates the start sequence of incoming packets and collects packet data byte by byte which are sent to the HBC. The HBC determines the meaning of the packets, while both the ESR and EST are responsive to serial commands from the HBC. FIG. 10 and FIG. 11 are flowcharts of the firmware within the event signal receiver such that the general flow of processing within one of these event signal communication modules can be understood.

FIG. 10 exemplifies processing within an ESR main loop 500. Upon power-up the processor leaves reset state 502 and performs initializations and self-test 504. If all is normal a serial message of "On-line" is sent 506 to the HBC, to let it know that the module is functioning normally. The loop is basically a state machine for verifying the start bit sequence and processing data to and from the HBC. An interrupt service routine ISR_Tick 600 is described below in reference to FIG. 11, collects the bits of the event data packets. The state, RcvStateCtr, is cleared 508 (re-entry point). A check is made 510 for RcvStateCtr being set for packet reception (=2). The state is 0, so a check is made on signal data receipt from the receiver 512, as no data is being received a check for commands from the HBC is made 514. If no commands from the HBC then a check to see if the ISR_Tick interrupt has collected up a byte to be sent to the HBC 518. If no bytes to be sent then the main loop restarts with the RcvStateCtr check 510. When the beginning of an event sequence is being received the check for signal received 512 will cause the initiation of a start bit sequence check routine. The start bit check comes in two parts, one during state=0 and a second half during state=1. A check is made for the second half of start sequence 522. As this is the first part the timestamp value TStamp is copied to a variable and a limited polling loop is entered which checks for the signal transition to a "0", which signals the end of the first "1" bit of the start sequence. The interrupts are still running keeping the value for the timestamp updated. When a transition to "0" is detected, or a timeout occurs, a validity check is performed 530. If the sequence is invalid then the system clears the RcvStateCtr 508 and continues looking for other events. If the first "1" length is valid at about ½ the interval of a normal bit size, then the following "0" is checked for duration in the same manner 532, 534. The second "1" bit is then checked 536, 538. After the second "1" bit is a variable length period of no signal in which checks are made by the transmitter to prevent "stepping on" other signals. This period is checked within the main loop. The check for state 540 determines if this is a first half start verification or a second. Since it is a first half, the timestamp value is copied and the receiver state is bumped 542 to RcvStateCtr=1, which indicates to process the second half next time. The main loop then continues processing while the timestamp is being incremented. When another signal is received 512, then the check 522 for RcvStateCtr=1, causes execution of a verification step for the variable delay 526. If the variable delay is not within bounds then the receiver state returns to "0" and main loop entered 508. If the variable delay is within the bounds then the start bit loop 522 commences to check the two short "1" bit durations and the intervening short "0" bit. If the bits are validated then the start sequence has been completely validated and a data packet should be forthcoming. A check for state 540, finds RcvStateCtr=1, indicating that the start sequence has been validated, so the system is setup to process an incoming data packet 544. The ISR_Tick interrupt service routine actually processes the data packet, so it is initialized by setting a BitLpCtr to a timer decrement value to synchronize the bit collection times with the interrupt rate. The RcvStateCtr is set to "2" so that the system will not be looking for start bits. The main polling loop resumes 510 with the state check. The interrupt will collect bits of data into bytes and set a flag RcvdByte_F when a byte has been collected into RcvdByte. The main loop is checking for this condition 518, and if a byte is ready to be sent, it is sent to the HBC for processing 520. The HBC at any time that the ESR module is not using the serial line, may sent a command to the ESR module. The main loop checks for HBC commands 514. Received commands are picked up, processed in view of ESR state and a response is collected and sent to the HBC 516. Various status gathering commands or data setting commands can be received. One such message informs the ESR module that auxiliary data is to be picked up within the current packet; the flag Aux_Data_F is accordingly set for use by the interrupt routine. The ESR module does not interpret the packet data and so has no manner to understand if the auxiliary data bit is set. It can be seen in the main loop that while the interrupt ISR_Tick is gathering bit data the main loop is bypassing the signal received check, as the ISR is collecting the data synchronized to a execution loop cycle derived from the timestamp.

FIG. 11 exemplifies an interrupt service routine ISR_Tick 600 which is called within the ESR module at intervals set by a hardware clock. The interrupt keeps the timestamp ticking and can receive the data bits of event data packets. When the periodic timer interrupt occurs, the ISR is entered 602. Registers and status are saved, and the timestamp value TStamp is incremented 604. A polling loop counter is checked for activity 606. If the polling loop is not active then the ISR is finished, therefore registers are restored 632 and a return 634 to the Main loop is performed. The polling loop is only used when data packet bits are collected. These bits are collected synchronous to the timing of the start bit sequence which was initialized by the main loop. Once the start bit sequence is validated (RcvStateCtr=2), and the BitLpCtr loaded then the ISR will collect the requisite number of data bits. The check 606 therefore succeeds and the loop counter is decremented 610, if the check for loop completion fails, then the ISR is exited 632, 634. If the loop expires then the counter is reloaded 612 and an event signal data bit is collected 614 and stored via a bit pointer value into a variable where the collected byte is built 616. A bit counter, RcvdBitCtr, and a total bit count for the packet, TtlBitCtr, are incremented to indicate receipt of one more bits. Checks are made to determine if the packet has been completed or if auxiliary data needs to be collected. A check 620 on the auxiliary data flag, Aux_Data_F, is made. If no auxiliary data then the total bits received is checked against the packet size 622. If all bits still aren't received, then a check is made for all bits within the byte being received 630.

The total check is performed before the 8 bit check since the packet may be defined on an off-byte boundary. If 8 bits have not yet been collected then the ISR is exited 632, 634. If the 8 bits had been collected, then the built up byte would be stored in RcvdByte and the flag RcvdByte_F would be set 628 in addition to the clearing of the bit counter so that the next byte can be collected. If auxiliary data is being collected then a check against a different total value are made. If the data packets are expanded, the HBC can dynamically read a size from within the auxiliary data which determines the size. The size can be conveyed to the ESR for proper collection.

7.3. Event Signal Transmitter Module Firmware

The firmware used in the event signal transmitter (EST) module is similar to that of the receiver. The EST transmitter receives commands and data packets from the HBC. The EST responds to HBC commands and transmits event data according to HBC directives.

8. Alternative Embodiments 8.1. Alternate Brake Pedal Pressure Sensors

It must be recognized that a variety of brake pedal pressure sensing mechanisms can be employed within the rear-end collision reduction system. Two additional examples are now provided.

Figure 12:
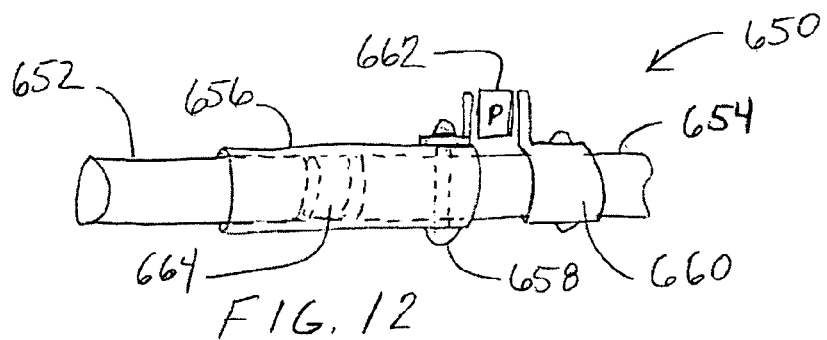
FIG. 12 is an alternate pressure sensing device for sensing pedal pressure being applied by the driver according to an aspect of the present invention.
Figure 13:
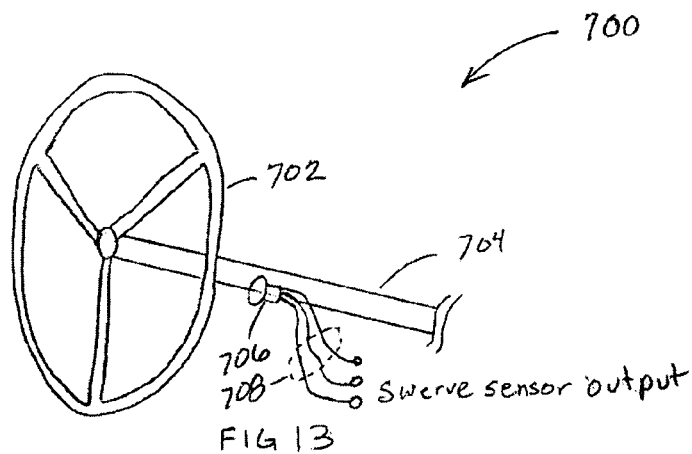
FIG. 13 is a diagram representing one method of sensing steering actions according to an embodiment of the present invention showing a sensor for registering what may be classified at highway speeds as a "swerve".
Figure 14:
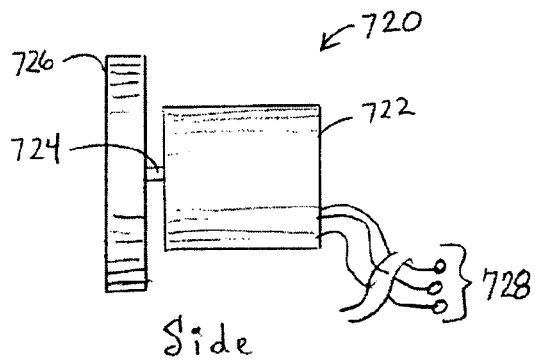
FIG. 14 is a side view of a rotational sensor with engagement wheel as shown in FIG. 13 for sensing steering wheel movements.

FIG. 12 depicts the incorporation of a strain gauge load sensor within the activation rod of the braking system 650. The rod is comprised of two section 652, 654 which are slideably engaged via a sleeve 656 attached to the proximal end 652. A slide stop pin with a sensor retention structure 658 retains the sleeve through a slot in the rod preventing separation of the two halves of the rod 652, 654, while providing a mount for the sensor. A sensor retention structure 660 is attached to the distal rod end 654, wherein a load sensor 662 is mounted between the two sections. Pressure applied to the activation rod creates force across the load cell that can be registered by the HBC. The use of this brake pedal pressure sensing embodiment may require manufacturers to design, test and stock a variety of activation rods for various vehicles. Additionally, the unit shown does not sense acceleration of the brake pedal, while it can induce a sense time delay when compared with the embodiment previously described.

Figure 21:
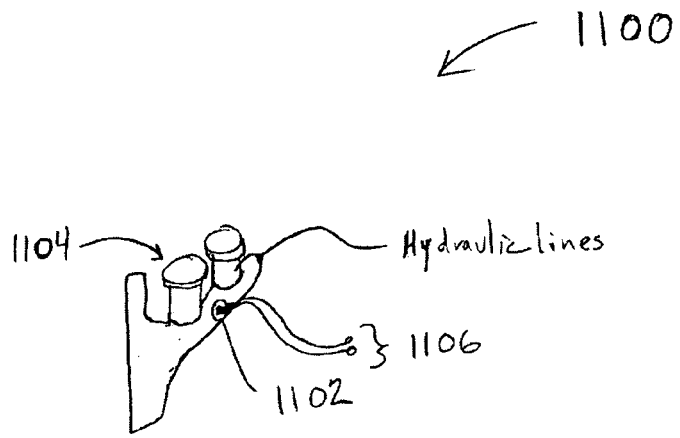
FIG. 21 is an alternate embodiment of pressure sensing, wherein master cylinder fluid pressure is registered according to an aspect of the present invention.

FIG. 21 depicts an alternate pressure sensor 1100 that incorporates a liquid/gas pressure transducer 1102 coupled with the brake master hydraulic cylinder 1104, for sensing the braking force applied by the driver. The pressure transducer output 1106 can be measured by the HBC in the same manner as the pedal pressure sensor described earlier. This hydraulic mechanism of sensing is simpler to implement, however, it is generally less sensitive to pedal pressure changes and provides a delayed output in comparison with direct pedal pressure sensing. In addition, this hydraulic sensing lacks the accompanying pedal acceleration sensor described earlier.

8.2. Wireless Brake Pedal Pressure Sensors

The brake pedal pressure measurement unit was previously described as being connected to the HBC with a set of wires forming a serial link. Alternately, the pressure sensor can be configured with a transmitter on which the pressure signal is encoded, and the HBC would thereby require a receiver for registering the transmitted pressures. A variety of transmitter receiver pairs could be considered.

(1) Audio Output—The pressure sensor could generate a unique audio signal pattern that is picked up by a microphone in the HBC and processed using digital filtering within the microcontroller firmware within the HBC. The audio could be in the normal audio range of human hearing or ultrasonic frequencies could be used. If false triggering of the audio were found to be a problem, the firmware would adopt a learning algorithm in which the sound input would be correlated to the brake input to store corrective information so that the system would be able to distinguish other normally occurring sounds from that of the brake pedal pressure sensor.

(2) Radio Frequency—The pressure sensor can incorporate an RF transmitter wherein the HBC would house an RF receiver. Simple single chip RF units are available currently at low cost for transmitting and receiving digital data at low speed. An example of such a receiver is manufactured by Micrel Semiconductor™ which manufactures a line of single chip receivers, currently MICRF001™ through MICRF033™ which provide various RF receiver rates and functions in package as small as an 8 pin surface mount.

In utilizing any form of wireless link, such as those described, it must be realized that the pressure sensor would require another form of power, as no wiring connection would then be provided. The use of battery power by the pedal sensor module obviates the need of reduced power levels in the sensor, which suggest providing transmissions from the pedal only when the pressure level exceeds predetermined thresholds. Maintenance of such a system is questionable, as vehicle owners may be disinclined to replace the batteries on the system as a large part of the benefit is to approaching drivers. Transponder technology may alternatively be applied to the pedal sensor, however, it use with presently available circuits would reduce reliability of the unit and increase costs.

8.3. Roadside Condition Reception and Reporting 8.3.1. HBC Protocols integrated within a Call Box HBC compatible protocols and communication can be incorporated into equipment to provide additional communication capability along highways and roads. When the RAAC system according with the present invention has been widely implemented, a number of other positive benefits can be easily derived therefrom. Emergency crews can be summoned more readily to accidents and drivers may be automatically alerted to various road hazards and conditions ahead.

One location in which to implement these features is within roadside call boxes. Roadside call boxes are self-contained wireless phones along the highways that allow drivers to call for help in the case of an emergency or a road-side breakdown. Call boxes are already being tested for use in collecting traffic data, which is then uploaded to computers via the wireless phone within the call box. Portions of the described HBC functionality can be added to these call boxes to extend functionality.

Figure 30:
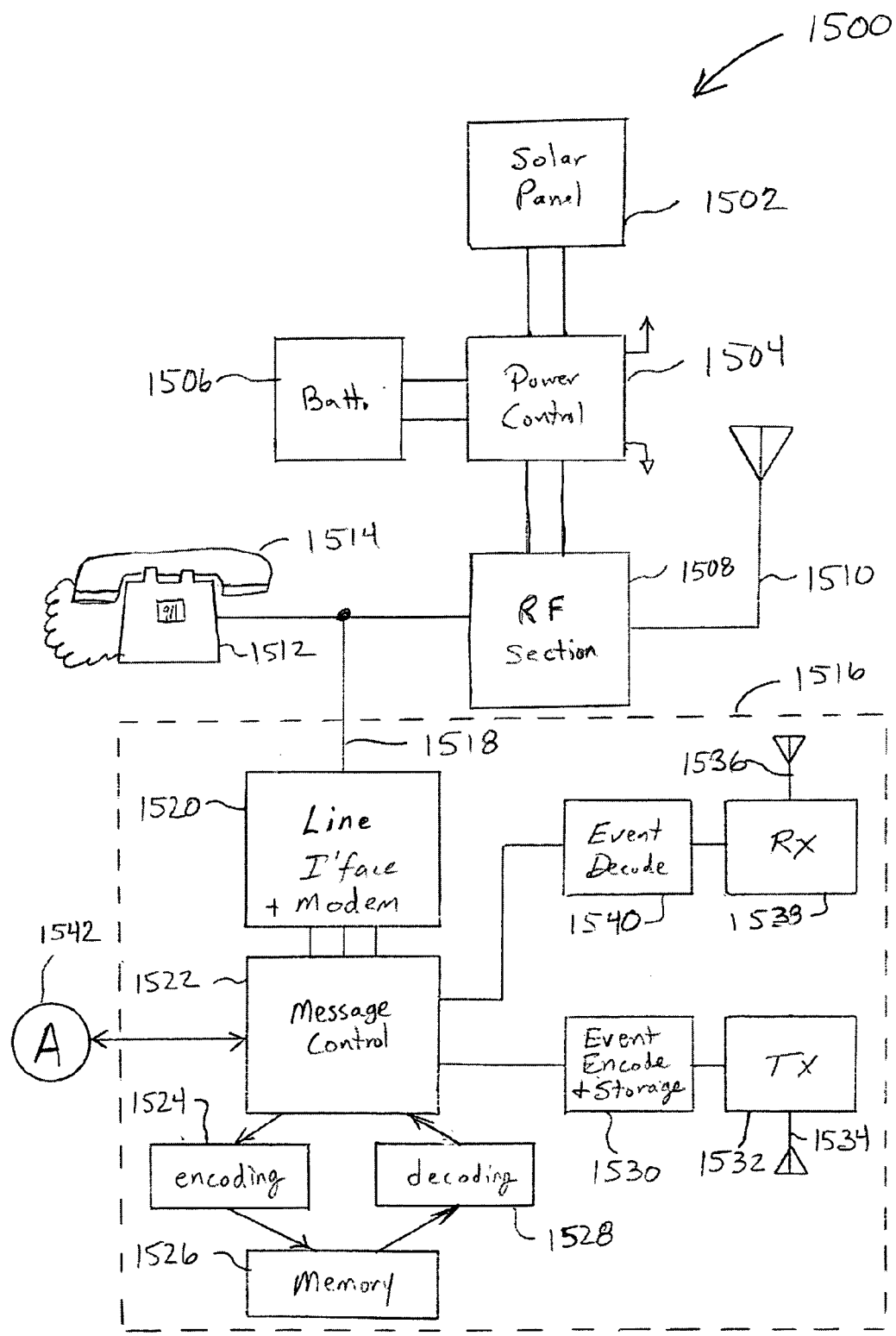
FIG. 30 is a block diagram of a transceiver using HBC protocols according to an aspect of the present invention shown embedded within a road side call box unit.

FIG. 30 is a block diagram 1500 of a call box shown with additional HBC related circuitry. The standard call box is powered by a solar panel 1502 whose output is controlled with a power controller 1504 which charges a battery 1506 and provides power to the remainder of the circuits within the call box. An RF section 1508 performs the modulation/demodulation of the voice data to/from the RF carrier of the wireless system which is broadcast and received via the antenna 1510. A phone 1514 is connected to the RF section which provides a microphone and speaker.

A new set of circuitry 1516 according to the present invention is thereby added to a conventional call box for extending the aforementioned functions. A line interface 1520 provides a phone line interface and a modem to the HBC type functions. A message control unit 1522 handles conversion of messages to/from the modem. Events can be generated (HB7 events) from the call box by passing data to an event encoder 1530 which passes the encoded data to an output transmitter 1532 whose antenna 1534 projects the signal generally opposite to the direction of traffic flow. Events can be collected (ALL events) by a receiver 1538 whose antenna 1536 is directed with the flow of traffic. Event data is decoded 1540 and passed to the message interface.

Drivers can be alerted to conditions on the roadway very easily using this system. For instance suppose that the message "Icy Road near Ice House Exit" was to be generated for drivers approaching this dangerous roadway condition. A call is made to the call box by a dispatcher. The call is picked up by the line interface 1518 and the modem collects ASCII data for "Icy Road near Ice House Exit". The data is passed to the message control section 1522 which formats it and passes it to the event encoder 1530. The event encoder 1530 uses HBC protocols to break the message down into multiple packets for transmission each of which are saved. If no events are occurring on the highway being monitored by the receiver section, then the event encoder starts packet sending to the transmitter 1532. The packets are sequentially sent one by one. Once all packets are sent, then a delay occurs after which the set of packets are sent again. Prior to sending each packet, a check for roadway events is made, so that no low priority packets get in the way of actual high priority events. Drivers approaching the call box receive the packets; a small beep alerts the driver as the message "Icy Road near Ice House Exit" scrolls on a text display on the console. Alternately, the received packet can be annunciated with audio by the receiving HBC of the vehicle which contains a speech synthesizer.

Emergency crews, Highway patrol and other personnel can be alerted to roadside conditions by the call box. Imagine a wheelbarrow has fallen off of a truck and is laying on the freeway. Cars approaching this debris will be swerving, and many will be slamming on their brakes. The HBC units of these vehicles will be correspondingly generating event data. The event data is being received by the receiver section 1538 in a call box. When a settable threshold level is reached on events (i.e. 4 hard braking events within 2 minutes), then the event decoder packages the event data into an ASCII stream which is passed to the message control 1522. Message control then adds other info (call box number, location, time) to the message and formats it for transmission. The modem in the line interface 1520 takes the message and transmits it via the RF section 1510. Emergency crews are alerted that some condition exists here on the roadway and nearby units can be quickly dispatched to remove the debris so as to reduce the chances of damage or accidents.

Alternatively, the call box unit can send data to the dispatchers as a series of voice data. This requires that the call box contain a speech synthesis and storage ability, such as stored speech segments for numbers and location, or formant encoding speech synthesis routines. Dispatchers would be capable of download new speech segments remotely by calling in and providing a special DTMF code, wherein speech is encoded 1524 and stored in memory 1526. Receipt of roadside events causes packet info to be collected by message control 1522. When the threshold is reached, then message control assembles audio message tokens pointing to speech segments in memory 1526. The message control section initiates a call via the line interface which provides the call connection. Message control then controls the playback from the token stream by passing pointers to the decoder which extracts and synthesizes the audio segments which are transmitted out to the dispatcher.

Various other message encoding formats can be used aside from voice and digital ASCII via a modem. For example DTMF or MF coding may be used for passing textual type data.

The circuitry added to the call box to provide these functions contains a microcontroller as used within the HBC, a modem, a phone line interface, an event receiver module, and an event generator module. The firmware within the HBC microcontroller is modified to perform the additional control of the modem and line interface but already contains protocol information and packet knowledge.

8.3.2. Monitoring of Roadway Conditions within a Roadside Audio Status System

In another embodiment of an intelligent call box, the call box is additionally, or alternatively, configured as a roadside audio status system which is capable of detecting traffic parameters, roadway conditions and of discerning accidents by the processing of audio information from the roadway to discern roadway information. It will be appreciated that the "call box" functionality described in this section is equally applicable to other roadside equipment, or vehicles. It has been a long-felt need to determine the conditions of a section of roadway, such as vehicle speed, and so forth, for communication and control purposes. However, the conventional devices for monitoring roadway conditions teach the use of active systems such as laser systems, broken beam light sensors, pressure pads, and the like which consider vehicles as passive devices from which an active energy source must be reflected and analyzed. These teachings treat the vehicles decidedly similar to articles, for instance cans of hairspray moving down an assembly line, while in addition they are expensive to implement and maintain. The present system eschews the necessity for active detection in favor of passive audio detection and realizes that the vehicle is already an active transmitter which may be passively detected to determine the number of vehicles, vehicle speed, and even vehicle size and type.

In general, the technique of the present invention utilizes audio sensors within a call box, or other roadside contrivance, which receives and processes the sounds of the vehicles as they pass to determine road and vehicle parameters. It will be appreciated that each vehicle on the roadway at any particular point in time presents a unique signature, or "voice", to the stationary audio sensor. The system processes the audio to identify each unique vehicle in its field of audio reception. Vehicles are "identified" by a set of audio signature characteristics, sufficient characteristics are preferably extracted to uniquely identify each subject vehicle, without regard to temporal displacement. Digital signal processing techniques are utilized for extracting signatures, and signature analysis itself is well known in the electronic arts and is widely practiced, such as in relation to voice print analysis, analyzing radar signatures, and the signature analysis of submerged vessels. As the signatures are temporally analyzed, the number of individual vehicle signatures will be easily discerned, because each engine is at a specific set of conditions, such as RPM and acceleration, whereby the differences between vehicles can be detected. If the signal analysis routine is sufficiently sensitive, it can be determined how many cylinders are in each engine within the individual vehicles. This is possible since each firing cylinder produces a slightly different sound due to slight variation, such as spark timing, mixture, cylinder condition, and so forth. Additionally, it will be appreciated that the sound of the vehicle, such as amplitude, will change as the vehicle position in relation to the audio sensor changes. Extracting the signature, therefore, provides a measure of the number of vehicles on the roadway, which may be augmented by detecting the doppler shift points on the audio streams being detected. Furthermore, the system is preferably configured to recognize emergency vehicles with active sirens which traverse the road, so that emergency vehicle position may be relayed by the system, along with the detection of impact audio for the direct discernment of accidents on the roadway.

Speed may be determined for each identified vehicle by using at least two coordinated audio sensors. Based solely on the audio sound being detected, the position of a vehicle is precisely known as it passes the audio sensor due to the Doppler shift that occurs. The Doppler effect on the sound received from the vehicle will be readily recognized by anyone that has ever stood beside a roadway or a train track; as a vehicle approaches it has a particular sound frequency with a rising amplitude, as the vehicle passes out position the sound shifts to a lower frequency and the amplitude then begins falling off with respect to time. By detecting the Doppler shift point, the position of each vehicle is known at a given instant in time with relation to the audio sensor. Speed is thereby accurately measured by detecting the Doppler shift point for each particular vehicle at more than one location along the roadway.

Figure 31:
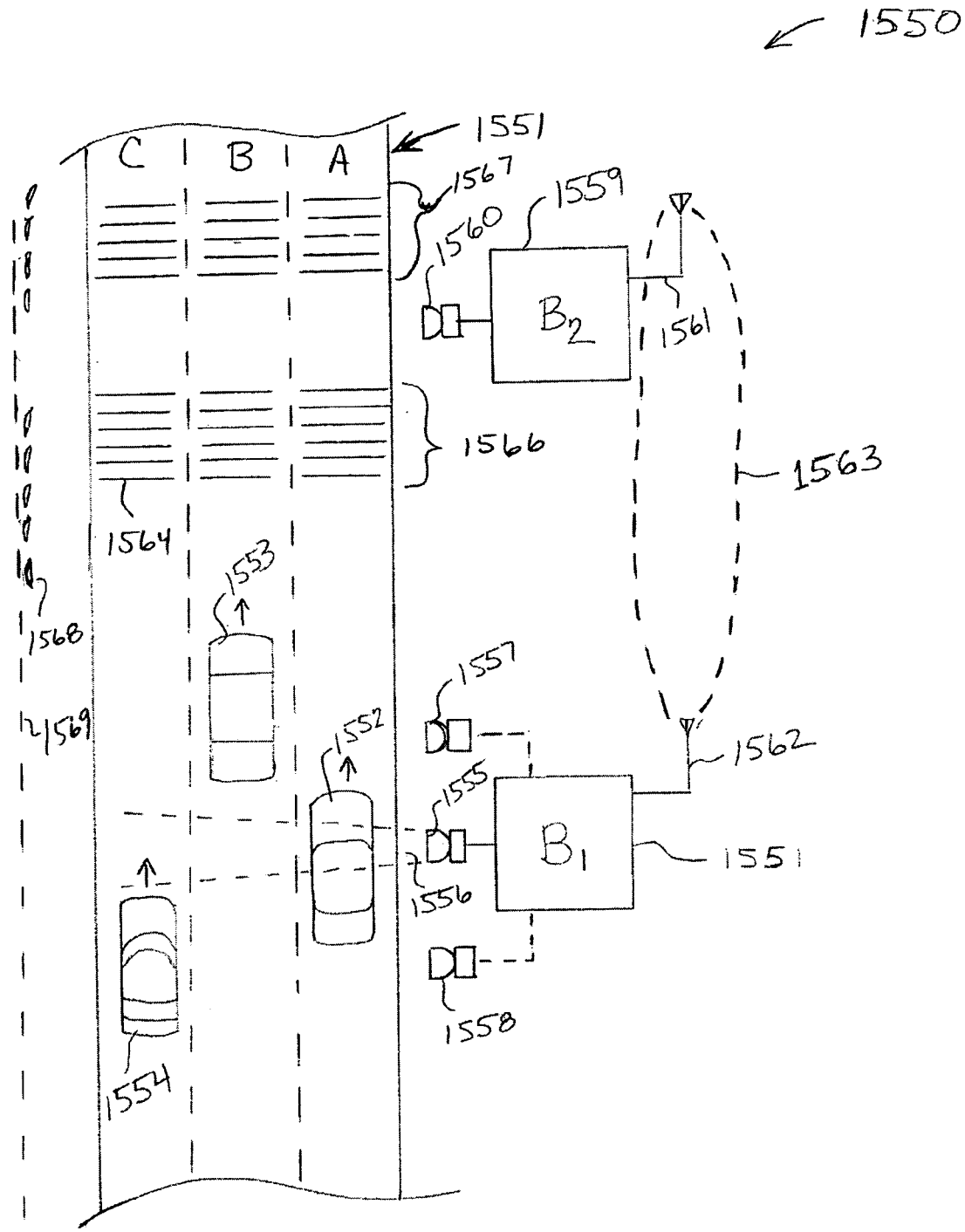
FIG. 31 is a block diagram of a roadside audio status system according to an aspect of the present invention shown detecting vehicle speeds and conditions on a span of roadway.

Referring now to FIG. 31 a section of highway 1551 is shown with three lanes A, B, and C. A call box 1551, or other apparatus, is shown alongside the roadway upon which three vehicles 1552, 1553, 1554, are traveling. A microphone 1555 is shown receiving audio from the roadway in a path 1556. Multiple microphones may be utilized to improve the detection ability, for instance, by improving reception, and removing deadspots. A pair of extra microphones 1557, 1558, is shown, although microphones may be across the roadway or otherwise disbursed. It will be appreciated that the microphones should be preferably position at a height of at least six feet so as to reduce the amount of sound blocking, wherein a vehicle in a lane near the microphone such as vehicle 1552, blocks the sound from a vehicle, such as 1554, that is in a lane farther from the microphone. Configuring the audio status system for attachment to an overpass or overhead lighting could provide a near optimal angle from which to receive audio generated by traffic within any lane of the highway.

A first method of properly registering vehicle velocity according to the roadside audio status system aspect of the present invention utilizes coordinated information from widely spaced microphones. If the accurate registration of speed is desired, a separated microphone may be utilized so that time between the locations may be detected. FIG. 31 illustrates a pair of units in communication with one another, first box $B_1$, 1551 which communicates with a secondary status box $B_2$ 1559 having microphone 1560, and antenna 1561 through which a link is established with antenna 1562 of the first box 1551. The secondary box 1559, need not be a call box, but preferably comprises a small system unit mounted on a sign or other post near the roadway. The secondary box is optimally located between twenty and one-hundred feet from the first box and it transmits the collected audio back to the first box. Each vehicle passing the first box is identified as per its sound signature. The time of passing the first box is registered by means of the Doppler shift which takes place in the audio sound. The first box continues to "track" the various audio signatures as they continue past the first box, the first box is continuously receiving the audio from the second unit and correlates this information with the signatures, thereby extending the "tracking" for each vehicle. As the vehicles pass the second box, the Doppler shift is again detected for each vehicle and an average speed of that vehicle between the boxes can then be determined. As the second box requires only a microphone, amplifier, and transmitter it may be powered by a battery, or alternatively as a transponder circuit, wherein it receives a signal from the first box that is utilized for power in driving the transmission back from the second box to the first box.

A second method of properly registering vehicle speed utilizes sound modulators at fixed locations along the roadway which are capable of modulating the audio of the vehicle as received by the microphone. The intervals registered as a vehicle traverses these sound modulators is detected within the received sound pattern. One form of these sound modulators may be created as spaced grooves cut in the pavement as exemplified by a groove 1564 of FIG. 31. Two sets of parallel grooves are shown with a first group 1566 on the approach side of the microphone 1560, and a second group 1567 shown on the departure side of the microphone 1560. The grooves have been shown in connection with the second box 1559 for the sake of figure clarity, however, it should be recognized that by configuring the roadway in the described manner, only a single microphone unit is required which would preferably be associated with the first box, while the adjacent roadway surface would be configured with the sound modulators. In operation, the roadside audio status system in this second configuration detects the additional sound modulation caused by the vehicle traversing the spaced grooves and is capable of determining additional information about the vehicle, such as vehicle velocity, acceleration, braking, approximate weight, and number of axles. The two separate sets of grooves 1566 and 1567 simplify the process of determining speed, since the received audio for a traversing vehicle will contain the audio signature of the vehicle onto which is imposed two separate bursts of modulation, the interval between which being related to the known distance between the sets of grooves to accurately determine vehicle speed. The modulators have been exemplified as grooves in the pavement, yet they may alternatively be implemented as paintstrips, channels, or any of various dimpling or protrusions in the roadway surface. The modulation of vehicle audio produced by using on-surface horizontal modulators can be very simply and accurately detected by the vehicle audio discrimination circuits. However, for use on roads that may get icy in the winters, thereby obscuring modulation, the modulators may be alternately implemented as above ground vertical sound reflectors on the opposite side of the roadway from which the sound of the vehicle is reflected prior to being received by the microphone. The vertical posts used to secure the center partition on the roadway may provide adequate sound reflection so as to pick up the modulation in the received audio, otherwise other forms of spaced reflectors may be utilized. A preferred vertical modulator may consist of parabolic dishes 1568 attached to the center partition 1569 and focused on the microphone. The discrimination of vehicle speed from vertical modulators is more complex than with the use of horizontal modulators because the microphone must discern the modulation in a reflected, "echo", of far lower sound energy while it still tracks the original sound. In addition, in using the vertical reflection modulators, the reflection geometries and audio reflection distances can come into play.

The roadside audio status system of the present invention provides a very inexpensive and low maintenance method of monitoring traffic flow and status within a section of roadway, and is preferably capable of determining: number of vehicles, speed of vehicles (average, high, low, median), level of safety level (based on amount and severity of brake application), size of vehicles, number of cylinders, determining number of axles on the vehicles, sensing emergency vehicles, and sensing accidents. The system can be calibrated as per sound level, so that the absolute value of the sound amplitude and characteristics thereof may be used to discern vehicle characteristics. It will be appreciated that the roadway status may be maintained at a central station into which numerous roadside call boxes and other system reports flow.

Figure 32:
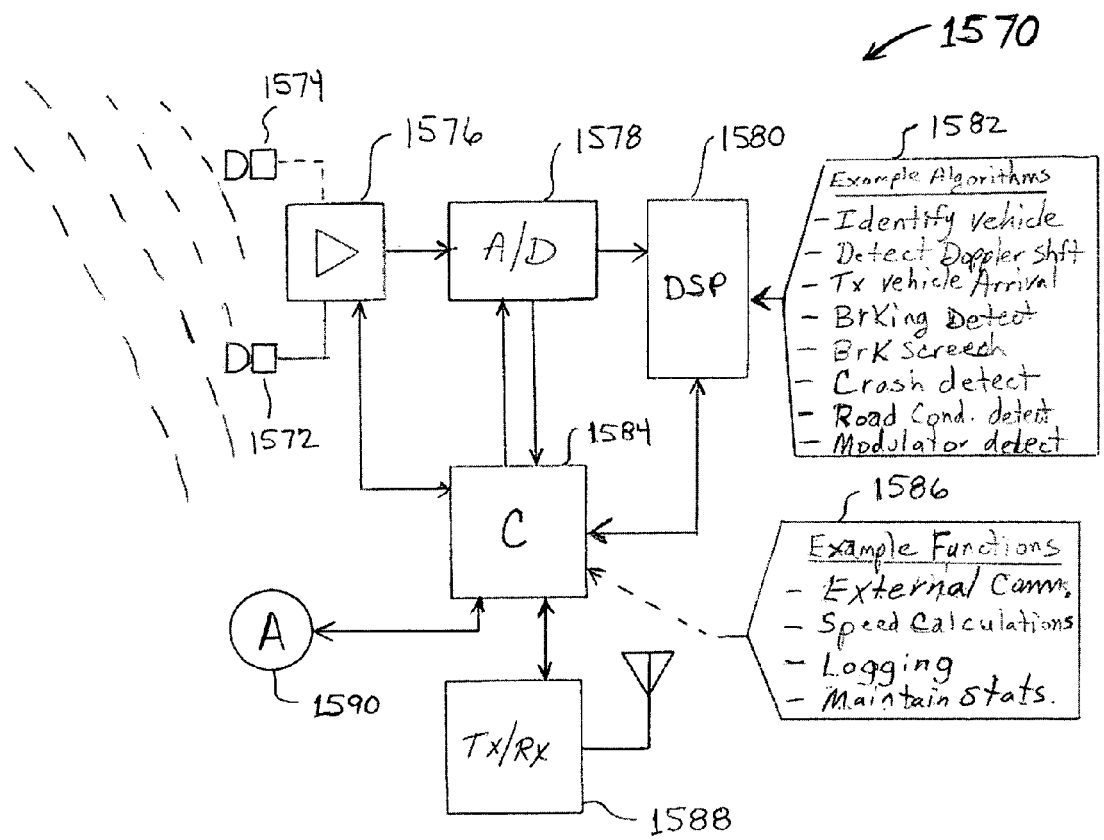
FIG. 32 is a schematic of the roadside audio status system of FIG. 31, shown sensing traffic conditions based on the tracking of vehicle audio signatures.

Referring now to FIG. 32 is exemplified a circuit 1570 for use within the roadside audio status system depicted in FIG. 31. A first microphone 1572 is shown for receiving roadway audio from the subject vehicles, while a second optional microphone 1574 is shown which may be utilized to improve signal discrimination. The microphone(s) outputs are conditioned and amplified by a pre-amp 1576 and digitized by A/D converter 1578 prior to receipt within a digital signal processor (DSP) circuit 1580. Numerous signal processing algorithms execute within the DSP unit for discerning various parameters of the received audio. It will be appreciated that numerous DSP circuits may be integrated, wherein they may each be configured to discern a separate metric of the audio stream. By way of example and not of limitation, a few types of algorithms which may be executed within the DSP circuit are shown in block 1582 to include: identifying vehicles, detecting the Doppler shift point, transmission of vehicle arrive time (for use with multiple boxes), detection of braking, heavy braking, crash detection, along with road condition detection, and the detection of sounds associated with the modulators. The DSP circuit is interfaced to a controller 1584, that orchestrates the functioning within the audio status system and additionally controls the configuration of the pre-amplifier 1576, A/D 1578, and the DSP 1580. The controller may also provide computation functions that relate to the logging, and calculation therefrom, of parametric data extracted by the DSP circuit. A block 1586 is shown containing example functions that may be performed by the controller 1584 which includes the external communication, speed calculations, logging of data, and maintaining statistics. The controller is optionally connected with a transceiver 1588 to allow it to communicate with other call box units. The controller is shown with a connection "A" 1590 that preferably interfaces with the message controller 1522 of the call box as shown in FIG. 30, so that the collected information may be relayed via the call box circuitry to vehicles as an event according to the aforementioned communication aspects of the invention, or by way of the call out functionality inherent within the call box unit.

8.4. Alternate Internal Driver Visual Displays

Figure 33:
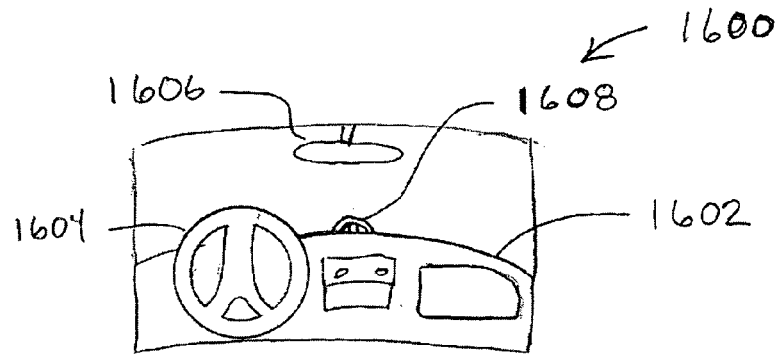
FIG. 33 is an internal driver alert signal according to one embodiment of the present invention, shown mounted to the dash.
Figure 34:
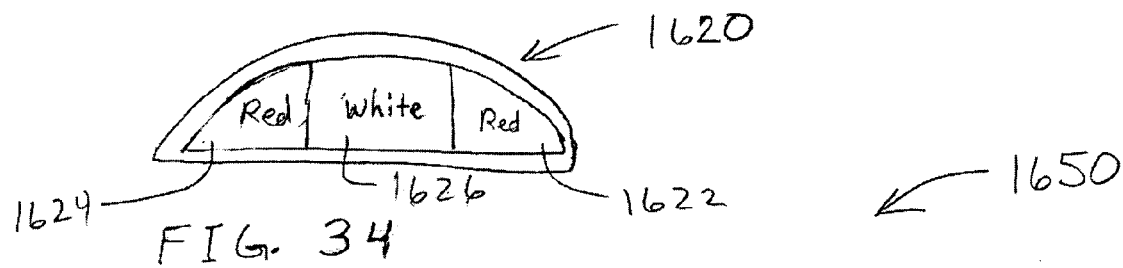
FIG. 34 is a close-up front view of the internal driver alert signal of FIG. 33.

The embodiment of the RAAC system previously described in FIG. 5, was illustrated with a simple set of LED indicators as a visual display for alerting the driver to events occurring ahead and the visual indicators should be placed and configured to function so that roadway alerts are readily seen, understood, and acted upon. FIG. 33 shows a driver alert signal 1600 containing the LEDs 186 as shown in FIG. 5 mounted for easy recognition. A dashboard is shown 1602 with a steering wheel 1604 and rear-view mirror 1606. The visual alert 1608 is positioned in front of the driver so that it is near his field of view. Preferably, the visual alert will appear similar to the auxiliary brake light displays attached above the rear deck up against many vehicles rear window. FIG. 34 shows a front view of the alert indicator 1620 with a set of 3 lighted regions: two red areas 1622, 1624, and a white light area 1626. These lights or LEDs are modulated on and off according to the event conditions received by the HBC unit from vehicles up ahead. The car immediately ahead may not have yet applied the brakes when this little warning indicator warns the driver of the possible danger ahead. Red LEDs are activated at low intensity for low levels of hard braking detection, or emergency flasher deployment. Red LEDs go to high intensity and white LED is activated for high levels of brake slamming, while additionally the white light is modulated on and off for severe events and crashes.

Figure 22:
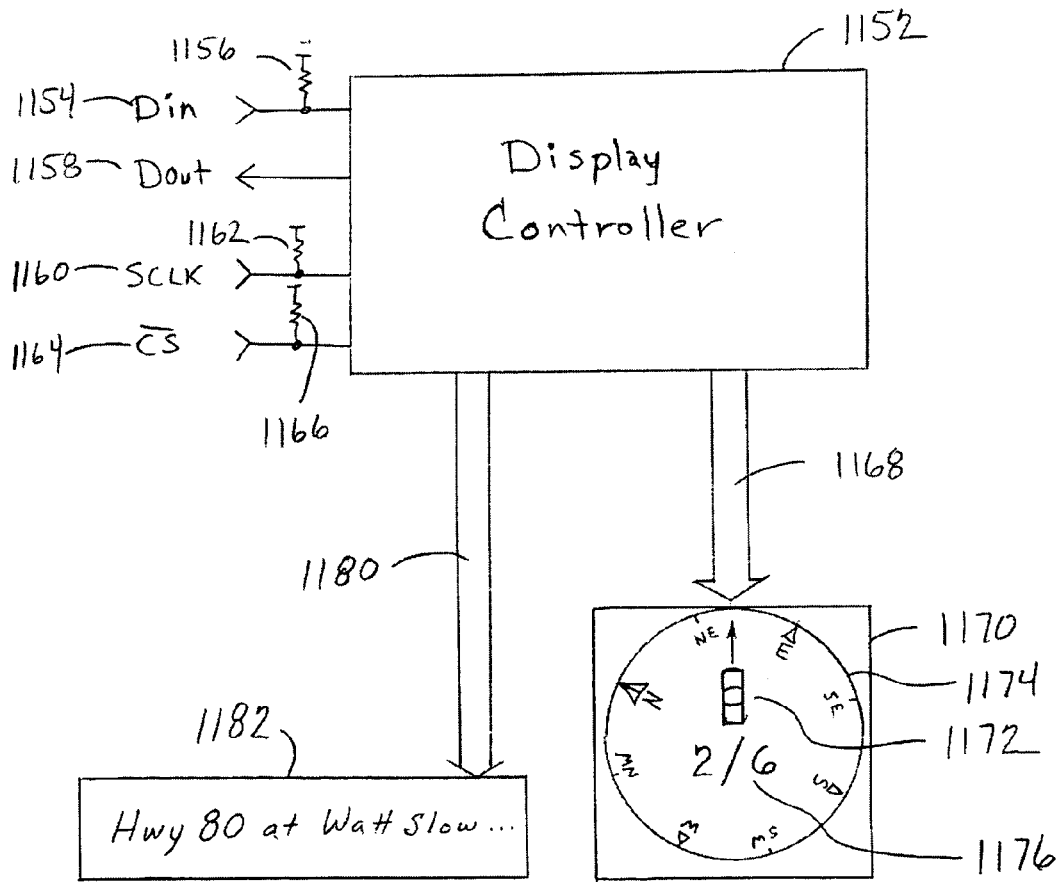
FIG. 22 is a block diagram of an alternate visual display system according to an aspect of the present invention.

To provide additional information to the driver an enhanced method of visually alerting the driver provides a graphic and textual display means. An SPI serial channel Disp 190 of FIG. 5 was provided for connection to a more complete visual display. The HBC can provide data which may be used with a wide variety of driver displays. An alternate embodiment of a display 1150 is shown in FIG. 22. A display controller 1152 is formed by a microcontroller or a mix of control and discrete electronic circuits. The display controller 1152 receives an SPI serial input from the HBC (not shown) which may additionally be used to receive input from other system circuits. The SPI has a data in line 1154 which is pulled up to Vcc by a resistor 1156. A data out line 1158, a system clock 1160 with pull-up 1162, and a chip select 1164 with pull-up are provided. The pull-ups allow devices aside from the HBC to also send information to the display controller. When the HBC is not sending data to the display controller it leaves the data in line 1154, synch clock 1160, and chip select 1164 outputs in tri-state mode. Prior to transmission the chip select is read as an input by the HBC, if it is not low, then the HBC can pull it low to grab the serial input at which time it clocks the synch clock signal to clock the bits of data out and data in. Other controllers wanting to pass information to the display controller follow the same procedure.

The display controller contains memory and an interface to a set of displays. Shown are a pair of displays where one is used for graphics and one is used for textual display. A set of multiplexed signal lines 1168 provides the drive signals for the graphic display 1170. The small graphic display is currently displaying representation of the vehicle 1172 with a surrounding compass rose 1174 and a tailgating value. The Value "2/6" shown indicates that the car is following about 2 car lengths behind another vehicles, when it should be at least 6 car lengths away. When an event occurs, the graphics display changes from that of a compass to an icon or animation which indicates what hard braking event has occurred. For example a accident up ahead may be shown as an icons wherein two vehicles are merged as in a rear-end collision. A textual display 1180 is used to convey general information or highway information to the driver. A set of multiplexed signal lines 1180 provides the display signals from the display controller 1152. The text line shown is indicating a roadway condition alert as provided by a call box roadway condition generator as previously described. The text line may be used by other vehicle system for a variety of purposes.

In addition it must be realized that vehicles can provide a wide ranging set of displays upon which HBC information can be displayed. Another example is the use of a moving map style graphic display to convey additional HBC information (not shown). These moving maps are often a part of a global positioning system (GPS) within the vehicle. In order to display event messages on the GPS moving map, the GPS system must provide for external input, whereas the HBC then signals the data to the GPS unit for display on the moving map. Furthermore a variety of additional display formats, such as a heads up display, may be utilized upon which to display driver alerts, 8.5. Alternate External Hard Braking Visual Indicators There are also numerous mechanisms by which the hard braking information from the HBC can be visually indicated to approaching drivers besides the use of the existing reverse lights, braking lights, and auxiliary braking lights modulated by the HBC that have already been described.

One or more additional indicator lights may be added to the vehicle for the display of hard braking event information, as previously mentioned, however implementation requires that relatively large vehicle design changes be made and that drivers be trained to the meaning of the new indicator.

Existing indicators can be modified to provide enhanced ability for displaying a visual hard braking indication. A number of alternative embodiments are described which can be used alternately or in combination with indicators already described.

Additional lights (including LEDs, and incandescent lights) can be added to existing auxiliary brake lights. These auxiliary brake lights are centrally located on the rear of a vehicle, usually on the rear deck inside the window or on the top portion of the trunk deck. The auxiliary brake lights provide another brake indication which is easy to see, and often these units contain a series of lights, such as LEDs which are activated in response to the brake activation. In some cases the lights are activated sequentially to increase speedy recognition. Lights of a color other than red, such as white or light blue, can be added to the auxiliary braking indicator assembly under the control of the HBC. A separate group of these lights may be added with a separate power line connected to the HB Ind signal 166 of FIG. 5. Alternately the existing wire may be used to provide power and for signaling.

To independently control a series of illumination sources within a single indicator without necessitating major vehicle wiring changes, conventional wiring can be used in conjunction with a light signal controller (LSC) which is mounted in proximity to the actual indicator lights on the vehicle. The conventional power line to the light, whether it be a turn signal, a brake light, an auxiliary brake light, or a reverse light, is used as a power and signal bus to a light signal controller (LSC). The power line is held high except for short negative pulses that form a signal bit stream to the LSC. (Opposite a traditional light wherein that is activated by high voltage). The LSC interprets the signals and sets the lighting accordingly. FIG. 36 depicts an LSC 1700 in this configuration with the HB Ind signal from the HBC, which by firmware or external select signal is configured to maintain the output signal and provide transitions only for the sending of serial data to the LSC. The HB Ind signal 1702 is shown coming from the HBC and connected to an LSC 1704 which in turn controls the activity of the reverse gear light 1706 (normally a white light). The LSC circuit preferably contains a microcontroller, such as the Microchip Technologies™ 12C508™, a power supply and I/O voltage conversion circuits so that the voltage levels of the microcontroller are compatible with the voltage levels of the power line, in this the HB Ind signal with 12–14 volts. Alternatively special purpose processors can be used that employ voltages already compatible with the power voltage. A power retention circuit 1710 retains power to the controller when the generation of negative going signals cause the power to drop for brief bit intervals. Alternatively the power line, HB Ind in this case can be modulated by a small signal voltage which is amplified within the LSC. Although slightly more complicated this has the advantages of easing LSC power supply design and reduces the emissive power resulting from swinging large currents. The LSC senses the logic level on the line 1702 (alternately measures via A/D converted the voltage and determines which logic level) to capture the serial signal transmitted by the HBC. Upon receiving the start of a signal, all indicators are switched off to facilitate the data transfer. The serial data of the signal indicates what is to be indicated by the combination of lights, 1706, 1716, 1718. The LSC upon receiving a signal sets the lights in a static setting (On/Off), or alternately performs sequencing actions upon the series of lights. The HB Ind signal is shown 1702 being routed to a subsequent LSC, which in this case would be the reverse light on the other side of the vehicle, and then perhaps to the auxiliary braking indicator. This bus arrangement can connect to a series of lights used for the same general function. The indicator light 1706 is shown incorporating an optional RF signal generator 1720 to comprise an event signal transmitter (EST). The incorporation of the RF transmitter within the bulb, or indicator module is beneficial as power is continually available at the indicator 1706 and the indicator lamp is positioned within a plastic lens case through which RF may be transmitted.

This aforementioned mode of controlling indicators has numerous benefits over conventional indicator control while it retains many of the benefits. The same power line from a fuse box provides a conventional connection that is easy to understand and troubleshoot. Providing a constant power to the LSC allows active circuitry to be incorporated in the indicator package. The LSC can control a series of lights for signaling a single action or multiple actions. In this case the LSC controls a normal reverse light and additional LEDs. Within this embodiment the LEDs are bright Blue LEDs used to flicker along with the hard brake light to attract extra attention. Alternately any form of lighting can be controlled as well as various other output devices, such as a sound generator. The LSC can control various forms of lighting which include incandescent lights, flash circuits, LEDs or semiconductor lasers. The LSC circuitry can be provided as a separate module or fully integrated into a lamp or lamp cluster that may even connect to the vehicle with the same bayonet style mount as used with conventional incandescent lights.

A light cluster containing a group of semiconductor indicator lights integrated into a bayonet mount are shown in FIG. 37 and FIG. 38. A top view 1750 of FIG. 37 shows a cluster with a bayonet mount light housing 1752 with a central mounted LED 1754, a bayonet mounting nub 1756 and a series of LEDs 1758 attached to extension arms 1760. The extension arms shown are of various lengths for optical and to facilitate easier removal. The extension arms are flexible members that carry a pair of conductors to the LED. As a group these can be flexed into a form similar in size to a conventional bulb and inserted into a convention bulb socket. Upon removal, the LED attachment arms automatically flex to allow easy removal. FIG. 38 shows a cut-away view of the light cluster 1780. The main base of the lamp 1782 is a cylindrical form, whose outer surface forms one electrical contact, with a rounded sealed bottom that contains a contact nub 1786 for the other contact. A printed circuit board containing the circuitry of the LSC 1788 is shown with attached central LED 1794 and extension arms 1790 that each terminate in an LED. In this embodiment LEDs are mounted as die on a flexible circuit which contains the twin conductors. The flexible circuits are bonded to a resilient plastic extension arm with the shape as shown. The extension arm assembly then has a plastic lens formed over its LED and the end of the flex-circuit and plastic support. A series of these arms are soldered to the LSC circuit board. The LSC circuit board contains an underside contactor pin and multiple sidewall contacts to the cylindrical housing. The assembly is inserted into the cylindrical housing and is filled with a nonconductive potting compound which secures the assembly to the housing. A number of variations can be created to the light cluster without departing from the inventive principles.

Another example of the use of an LSC provides adding unique lighting features to turn signals, brakes or reverse lights for conventionally wired vehicles. A lighting cluster as shown in FIG. 37 and FIG. 38 and an LSC as shown in FIG. 36 is used in a vehicle that is not equipped to control the LSC with serial signals. The LSC in this mode, upon receiving power, enters into its display routine under firmware control, wherein lights are alternately turned on and off in various patterns by the controller of the LSC to create a light display. For example a circular pattern may be created wherein a pair of opposing radially extended lights are activated, after 200 mS those lights are turned off and the next clockwise pair of lights are activated. The light pattern therefore is seen to swirl around the large center light which is on during the entire period. The colors of the lights can be varied as well as the patterns produced.

8.6. Use with various Serial Interfaces

The HBC in the previously described embodiment employed an SPI serial interface to communicate with the various sensors within the system. Currently a variety of serial protocols are vying for acceptance in the automotive field, and any of these standards can be employed within the HBC for signaling. Currently there are standards for air-bag sensor busses (higher voltage), and a CAN signaling protocol which is being adopted in a variety of forms by various manufacturers, while some auto industry leaders are proposing a shift to higher voltage systems (i.e. 42 Volts) and new buses. it must be understood that the system shown can be modified for use with any serial protocol or implemented by one skilled in the art to provide the alternate serial interface signaling.

8.7. Event Communication

The previous description of the communication of event signals referred to the use of a rearward mounted transmitter unit and a forward mounted receiver unit, however transceivers can be substituted at either or both locations. The use of single direction communication is all that is necessary, however, added functions can be provided at an added cost by using a forward and reverse transceiver instead.

8.8. Enhanced HBC System Monitor

Figure 17:
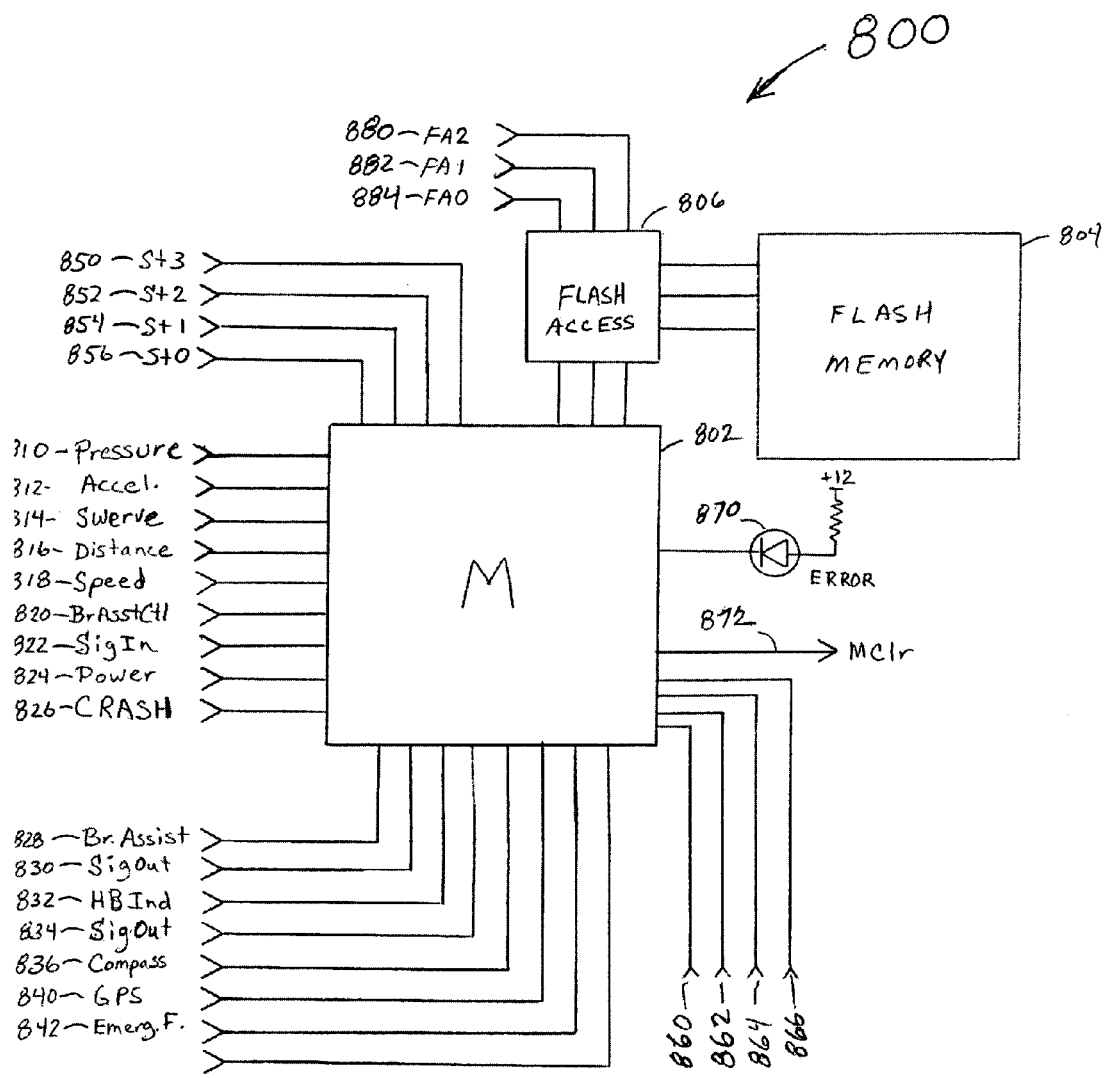
FIG. 17 is a block diagram of an enhanced monitor circuit according to an aspect of the present invention showing inputs and outputs.

FIG. 17 is an enhanced HBC monitor 800 that contains crash data logging. It may be desirable to provide a more in-depth HBC monitor than the one previously described in FIG. 5 monitor circuit 150. The monitor circuit 800 of FIG. 17 provides in-depth circuit state monitoring as well as a sensor log. This extended monitor circuit can be especially useful with regard to a Phase IV implementation wherein a form of automatic reaction is performed by the system. When automatic functions are performed (as contrasted with alert functions) it is especially useful from a manufacturer standpoint to log the conditions under which the critical actions took place. General Motors Corporation™ has begun to include simple black boxes for monitoring the status of the airbag systems. This monitor provides this form of logging whereby system activity just prior to a crash is recorded. The monitor circuit of this embodiment preferably employs an identical microcontroller circuit 802 as used within the HBC. A three wire serial Flash memory circuit 804 is connected to the microcontroller 802 through a Flash access device 806 which provides dual port access to the Flash memory 804. HBC condition inputs are shown 810–842 that represent the internal inputs of the HBC and the outputs provided by the HBC. A group of four state inputs 850, 852, 854, 856 additionally receive state information provided by four digital outputs from the HBC microcontroller (not shown). These inputs to the monitor provide additional information regarding the operating state of the HBC so that a more complete log entry is kept. Also a set of inputs 860, 862, 864, 866 is received from the airbag deployment system and additional safety inputs, so that this data also stored for correlation along with the HBC collection of data. As with the simple monitor circuit, an error indicator is provided 870 and an output that allows the HBC to be held in reset via the Master Clear signal 872 by this extended monitor circuit.

The monitor circuit continuously logs data in an internal buffer. Data is checked continuously for large changes of invalid HBC conditions. The data is tested to assure correct HBC operation according to the same tables and criterion used within the HBC. Data is only recorded to the log when changes to conditions warrant it, this saves log space. Additionally cumulative changes are lumped together in a log entry so that the majority of useful information gets recorded. Each entry contains a relative timestamp value, so that event relationships may be later gauged. At least 5 seconds of data is contained in the internal log. When the HBC crash sensor activates, the log is copied to Flash and additional logging is performed for another 10 seconds. Upon analyzing the crash, this log may be downloaded via the serial port bits 880, 882, 884 to a collection device. Analyzing the log provides details on what the vehicle experienced prior to and just after the crash. This data is similar to what a cockpit recorder provides (black box), yet is much simpler and less expensive. The information can prove very useful in post-crash analysis to determine which driver was at fault, and additionally may be used to squelch invalid driver assertions of system malfunctions.

8.9. Simple Phase I implementation

A few simple but less robust phase I implementations can be created less expensively and with lower tooling costs than the previously described phase I implementation. The following implementations are perhaps more suitable as an after-market addition than as a manufactured item.

(1) Bladder pressure sensor—Herein an air bladder reservoir is manufactured into the brake pad, with a small pressure hose that leads from the foot pedal reservoir to a simple HBC containing only the pressure input and the HB Ind signal output shown in FIG. 5. The HBC in this case contains a pressure transducer for registering the pressure applied to the air bladder. Although workable and less expensive, such a system is difficult to implement reliably.

(2) Audio output pressure sensor—Herein an air bladder reservoir is manufactured into the brake pad. The air bladder in this case contains a valve responsive to pressure above a predetermined level which corresponds to hard braking (>30 pounds of pedal pressure), which terminates in an audio emitting mechanism. The pedal pressure sensor can be thought of similarly to a child's squeak toy, yet with a pressure valve that only allows activation above a given threshold. When pedal pressure is reduced after activation the pressure reservoir refills automatically due to the surrounding structure of the reservoir. The HBC is configured with a microphone for reception of the squeak sound from the pressure sensor. The circuitry of the microphone is set as a bandpass filter set to the squeaker frequency, while the HBC firmware contains additional digital processing of the squeak sound. When a correct squeak sound is registered then the hard braking light is activate. Reliability of this system could be difficult to achieve due to both the mechanical nature of the sensed pressure and in trying to discriminate the pedal pressure "squeaker" sound from other sounds that occur within the vehicle, such as squeaky pedals.

8.10. Forward Looking Audio Correlation System

Figure 39:
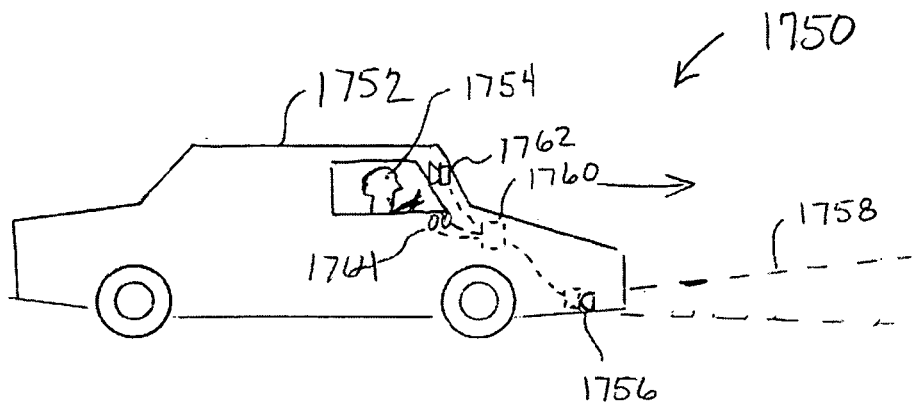
FIG. 39 is a side view of a forward looking audio correlation system according to an aspect of the present invention which is shown mounted within a vehicle.
Figure 40:
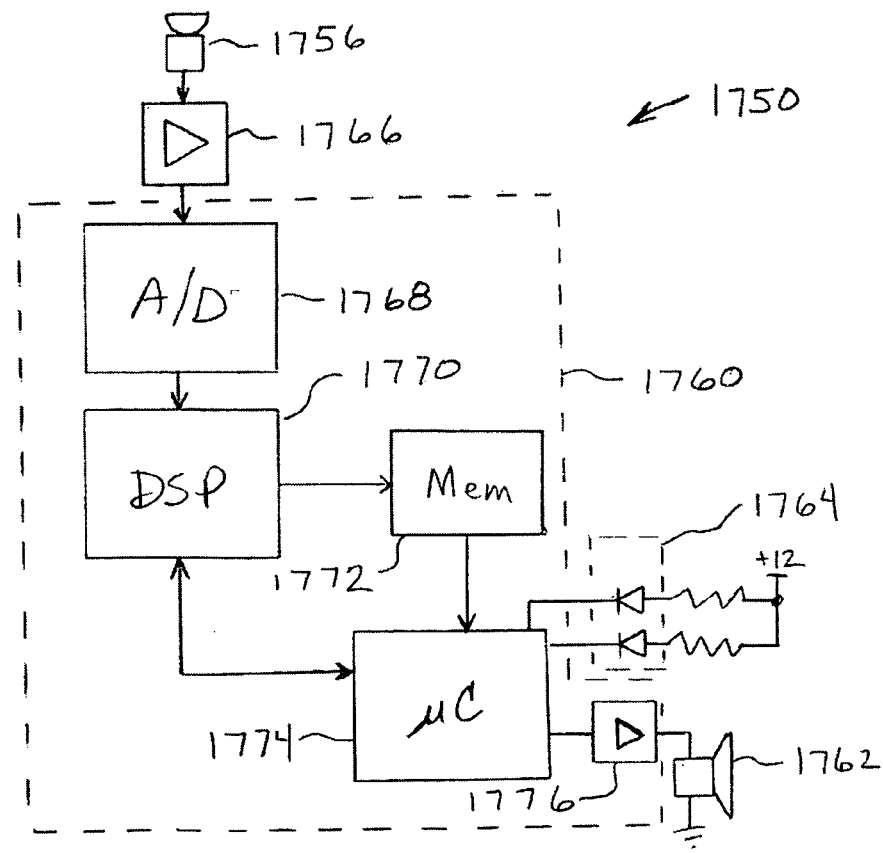
FIG. 40 is a block diagram of the circuit for the forward looking audio correlation system illustrated in FIG. 39.

FIG. 39 and FIG. 40 exemplify a forward looking audio correlation (FLAC) system that is capable of being utilized in combination with the HBC of any phase, in combination with other vehicle safety systems, or as an individual system. The FLAC system is similar in numerous respects to the aforementioned roadside audio status system described for detecting roadway status, such as from within a roadside call box. The FLAC system utilizes audio detection of external event, preferentially sensed from a forward direction, to provide extended sensing of roadway events that the driver may be otherwise unaware. It will be appreciated that the implementation of the RAAC system as of Phase II and beyond is capable of providing extended sensing beyond the capabilities of an audio system, whereas if all vehicle were simultaneously equipped with a Phase II system, there would be no need of implementing a FLAC system. However, as the implementation of the RAAC system may require a number of years to reach full deployment, it is beneficial to provide additional capability to protect the subject driver from accidents, while additionally providing an inexpensive system that may be independently deployed to reduce traffic collisions. FIG. 39 shows a FLAC system 1750 exemplified 1750 within a vehicle 1752 with driver 1754 in forward transit. An acoustic transducer 1756 is preferably directed forward of the vehicle to receive sounds, such as braking, hard braking, swerving, transition over an obstruction, tire squeeling, emergency vehicles, and the sounds of a collision. The acoustic transducer 1756 is preferably mounted low on the front of the vehicle so as to receive sounds traveling underneath the vehicles, as would be consistent with the sounds of tires on the pavement. A processing unit 1760 is coupled to the transducer 1756 to digitize and process the audio signals received. The processing unit preferably comprises a DSP circuit for analyzing the received audio for a set of trigger conditions indicative of a roadway event to which the driver should be alerted. Upon detecting such an event the driver 1754 may be notified by means of an audio output transducer 1764 and/or visual display 1764. For example an audio beep or voiced annunciation may be generated to alert the occupant of the condition ahead, such as "braking ahead". It is preferable, however, and in keeping with one of the basic tenets of the system, that upon detecting an event, the driver should be provided with information so that they may decide the relevance of the data. Therefore, the system preferably generates audio that includes a quick alerting beep followed by a sample of the sound, preferably accentuated by the DSP. As the FLAC system detects an event it preferably generates an audio rendition of the event to the driver, wherein the critical elements of the event such as squeeling sounds are accentuated and the non-important sounds, such as engine sounds are attenuated. FIG. 40 is an embodiment of the FLAC system 1750 showing internal circuit blocks. To processing unit 1760 are connected acoustic transducer 1756 through a pre-amp circuit 1766 and the output audio annunciator 1762 along with display 1764. The audio signal is converted within a A/D converter 1768 and received by a DSP chip, or circuitry, 1770 wherein the audio is analyzed for event conditions according to algorithms executing therein. The DSP 1770 can generate output into a memory 1772 for the storage of audio segments. A microcontroller 1774 performs the overall control of the FLAC system and is capable of controlling the DSP 1770 and operating on the memory 1772, such as for retrieving and playing audio contained therein. The microcontroller 1774 can generate output through an amplifier 1776 to audio annunciator 1762. It will be appreciated that FLAC system may be implemented in a variety of ways using numerous forms of circuits without departing from the inventive principles contained herein.

8.11 Qualifying Alert Signals

Preventing alerts from being annunciated in vehicles that are not in a position to benefit from the alert signal. The patent application included by reference described qualification of the alert signal using position data and/or heading information. This application expands on the use of qualification data with regard to the signal.

w/GPS System:

(1) More accurate GPS—GPS system use is more beneficial within the system since accuracy increased because restrictions have eased. Vehicle position may be known within 10M.

(2) GPS Roadway Identification

A preferred feature of a GPS system, in relation to the present invention would be for it to use its position information in combination with its map data base to determine what road it is on. This is performed by logging coordinates as the vehicle travels and comparing this track with the map. Additionally, it is preferred that the GPS software also determine an error bar for the roadway determination. For instance a percentage confidence, should accompany the indicated roadway. This is accomplished by measuring the fit between the positions in the log and the roadway surfaces listed within the database of the map. The comparison should take into account speed changes so that turns from roadways can be recognized and so forth. It will be appreciated that in certain situations, especially when the driver may be changing roads, the GPS signals are unreliable, or other confusing situations may arise in which the GPS may not be certain as to which road it is on, although this should be infrequent. By generating not only a roadway identification, but an indication of probably error, the system utilizing the roadway can determine how the data is to be utilized.

The GPS roadway data is valuable for communication by automatic crash reporting systems such as described within the application, wherein the GPS can furthermore communicate the distance from other roads and such as it is more "people friendly" to have a road and a distance from an onramp heading in that direction than it is to have a coordinate. Furthermore, this data may be utilized for qualifying event alerts as generated by the RAAC (reaction advantage anti-collision) system.

(3) Heading and Location Information

It is important that the alerts be properly qualified before an alert is generated. The system should not be generated alerts that are not pertinent to the driver, if it does then the driver will either turn off the system, or ignore the alerts.

The present invention attempts to improve qualification by always sending information on both direction of travel and position. The following are a number of ways of providing this.

(A) Heading & Position—The direction of travel is determined, such as by a compass, or by analyzing the changes in location over time. The qualification data sent should include both a direction (heading) for the vehicle and a set of position coordinates.

The anti-collision system within a receiving vehicle, according to how it is programmed, determine how pertinent the information is. (i) A fixed offset may be added to the heading of the receiving vehicle to determine the heading range that is pertinent. (ii) The qualification software can determine a heading range of significance based on its own history of movement. For instance, if it is entering or within a long sweeping turn to the right, then the heading range should be expanded toward the right, since vehicles ahead would have a heading oriented more in that direction. (iii) The heading range can be qualified further if the GPS has determined on what it is traveling, wherein the upcoming curves in the road can be evaluated in determining the range of headings which may be pertinent given the location on the road and known speed of the vehicle.

(B) Heading range & Position—Additional information is provided by the transmitting vehicle to aid in qualifying the alert. One aspect is for the sender system to compute a range of headings for which the alert should pertain. The range of headings is preferably determined based on the heading range that the transmitting vehicle has experienced within a given period of time. For example, knowing that the signal really only need be pertinent to vehicles following within 10 S of the primary vehicle, the primary vehicle computes what range of headings it has experienced within the last 10 S and can use this as the range. It will be appreciated that on driving down a straight road the alert can be selective as to secondary vehicles which annunciate the alert. On a curving road, however, the range of valid headings associated with a pertinent even alert can be expanded based on the curvatures of the road. A range of heading data may then be sent for use by the receiving vehicle in making the qualifications.

(C) Historical Data—(i) Coordinates—Rather than compute headings and a range, the unit could transmit a series of coordinates that occurred, over a short prior period, that may be utilized by the receiver in qualifying alert signals. For instance it may send a series of 10 coordinates taken at 2 S intervals thereby spanning 20 S. (ii) Headings—A series of headings could also be sent for use in qualifying the alert. These headings span a predetermined length of time as known to both the sender and receiver, unless additional information is provided on the time the headings were valid. (iii) Roadway info—The sender can pass along a roadway identifier and travel direction for use by secondary vehicles in qualifying the signal. This is the easiest for the secondary vehicles to qualify, however, it requires the largest amount of data transfer, especially unless roadways are provided with identifiers.

w/o GPS:

Other information is communicated as a motion history by which the receiving vehicle can qualify the alert signal for pertinence. This is preferably a set of headings, or a heading range as described above. Preferably a range of headings is determined by the primary vehicle based on motion over time (up to approximately 10–30 seconds depending on speed, conditions, type of event, and severity of event). Alternatively a set of headings may be communicated that were taken over a given period of time. If the receiving vehicle is on the same road as the transmitting vehicle then it should have experienced a similar set of heading over that period of time. The time span should generally be short, as the vehicles which would find the information most pertinent are those following nearest the transmitting vehicle. By way of example, the period of time may be such as a period of 30 S wherein readings were taken 5 seconds. The receiving vehicle can adjust the portion of the history evaluated by a predetermined following offset, and may also add additional factors if the signal has been regenerated wherein the distance to the lead car is obviously extended. Other parameters may be interest, such as speed history, although it is not uncommon for different lanes of the same road to be moving at distinctly different speeds.

8.12 Following Distance Sensing Enhancements.

In another embodiment of the hard braking safety system, the forward distance to another vehicle is registered either additionally or alternatively to the registration of the braking intensity. Although this distance sensing is described within the parent application, this enhancement adds aspects to that utilization.

A distance sensor may be selected from any of a number of different technologies which typically transmit a signal and evaluate its received reflection. The transmission being optical, radio-frequency, ultrasonic. The present system appreciates that low cost radar can be implemented using newly available ferroelectric phase shifters within smart antenna arrays. Other forms of proximity detection may be less preferably utilized, such as those based on sensing magnetism, electric field effects, image collection and processing, and so forth.

The system processes the information to determine the relative threat based on the available information, such as the absolute distance and closing speed. If the threat level exceeds a threshold, then the threat is communicated to approaching vehicles (following behind the vehicle in which the system is located), such as via lighting, and preferably including transmitting a signal (i.e. RF) to approaching vehicles which can preferably be repeated (retransmitted) by those vehicles. The receiver is preferably integrated with the distance detection module for mounting toward the front portion of the vehicle directed forward.

A global positioning system (GPS) may be configured for performing the radio frequency transmission and reception of danger signals between vehicles, although less preferably directional transmission characteristics can result. The annunciation ability of the GPS unit, such as a moving map display device, may be utilized by the system for announcing danger situations to the driver. Optionally the computation power of the GPS unit can be utilized as the main computer processor of the system, wherein distance and other metrics are evaluated to determine if the level of danger that exists exceeds an annunciation threshold, wherein the danger is communicated visually from the rear of the vehicle or via communication transmissions directed rearwardly to approaching vehicles.

The forms of annunciating the alert are described in the parent application, such as including activating reverse lights, and providing visual or audio alerts near the dash for the approaching driver in response to danger information received in data communication from preceding vehicles.

A computer processor within the system evaluates the dangers to determine if the danger should be annunciated, and to what extent. Preferably the program executing on the processor evaluates additional metrics such as described in the parent application, incorporated herein by reference, to assess the danger. For example, vehicle speed can be very important to properly determining the danger associated with a given following distance and closing speed. Speed can be registered from a separate sensor, although it preferably receives information from the speed sensor integrated within the vehicle.

The system is also preferably configured for receiving information from tire-based sensors, such as inflation sensors, an application of the inventor being incorporated herein by reference. Problems registered by the tire-based sensor, such as a blow-out, are utilized by the system in assessing the threat danger to be annunciated to approaching traffic. Furthermore, the system can evaluate information from tire-based sensors such as swerving, braking, skidding, and so forth depending on what information is available from the specific tire-based sensor utilized within the vehicle.

Figure 43:
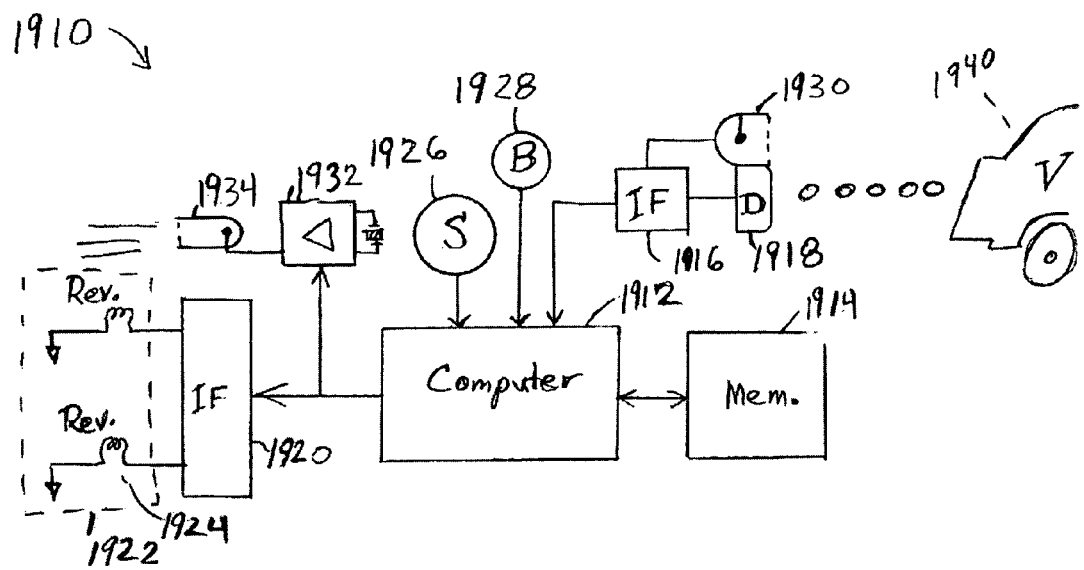
FIG. 43 is a block diagram of sensor input to the hard-braking controlling according to an embodiment of the present invention.

FIG. 43 is a block diagram of an illustrative embodiment of the collision avoidance system 1910. A computer 1912 with memory 1914 is configured for registering sensory inputs, evaluating dangers based substantially on the monitored distance, and of generating danger signals for annunciation to approaching vehicles, such as optically or via data communicated to a system within the approaching vehicle which annunciates the data if it exceeds the danger threshold, such as set by the driver of that vehicle. An interface 1916 is shown which controls the operation of a distance sensor 1918, such as one which transmits a directional signal and registers its reflection. Distance sensor 1918 may operate on any convenient electromagnetic wavelengths such as optical or ultra-high radio frequency, or may comprise audio in the ultrasonic wavelengths. Other forms of sensor may be utilized without departing from the present invention.

Computer 1912 registers the distance and computes closing speed determined from comparing sequential distance measurements. The distance and closing speed, preferably along with other factors, are compared against a collision danger threshold. If a sufficient collision danger is found (i.e. short distance and fast closing speed) to exist then computer 1912 generates an annunciation to approaching traffic, such as controlling lighting interface 1920 which activates a mode of rearward exterior lighting 1922, such as conventional incandescent back-up lighting. The light output is preferably modulated to aid in recognizing the collision danger situation, such as at a frequency within the range of frequencies spanning from about 2 Hz to 200 Hz, or more preferably in the range of from 4 Hz to 10 Hz. It will be appreciated that the use of lighting other than incandescent lighting can be utilized, such as LED lighting, and so forth without departing from the teachings of the present invention.

The computer preferably receives additional information upon which to assess the relative level of collision danger which exists. By way of example, a speed sensor 1926 is shown for registering the speed of the vehicle, for basing the dangers associated with distance and closing speed. Furthermore, a braking intensity sensor 1928 is shown for registering panic braking or other forms of rapid braking by the driver of this vehicle to be communicated to approaching drivers as a form of collision danger alert. As described in the parent application, additional and/or alternative information may be sensed, such as direction of travel, roadway incline, rate of turn (i.e. swerving), impacts (i.e. air-bag deployment), emergency vehicle approach, posted emergencies or construction, tire-conditions (i.e. blow-outs), and so forth and combinations thereof. The directional nature of the data communicated between vehicles is preferably enhanced both by limiting the distance and/or depth of vehicles over which retransmission occurs, by encoding directional information into the data being communicated, wherein upon receipt the receiving system can determine the applicability of the data, for example ignoring reflected signals from traffic passing in the opposing direction, side streets and so forth.

Each packet of data transmitted may optionally include a timestamp, such as from an onboard GPS unit, which can be utilized for very accurately time stamping a data transmission. Vehicles receiving a collision alert transmission from another vehicle can then compare the timestamp with the time maintained by their GPS unit (extremely accurate high resolution satellite updated time base), to determine if the alert is still valid. Optionally, with each retransmission of a collision alert signal the original time of the alert and the time of the latest retransmission can be included within the data, wherein the system receiving the alert can better assess the age of the alert, how recently retransmitted, and in some cases the distances. The number of retransmissions for a collision alert signal is preferably controlled at least in part by the timestamp value. For example, controlling regeneration based limiting the duration over which a retransmission can be performed in relation to the originating event and/or the previous transmission. It should be appreciated that the distance that the system is preferably configured with programming for determining the time delay since an alert was transmitted (and compensating for encoding and reception delays which are preferably predetermined for the system), wherein the system can determine the distance to the transmitting vehicle so that the validity of the alert and possible retransmission thereof can be properly assessed.

The distance information received from the distance sensor within the present invention also preferably regulates the number of sequential retransmissions of the collision danger alert sent within data communicated rearwardly. For example, a hard braking signal generated at freeway speeds by vehicle 1 is received by vehicle 2 which is following vehicle 1 at a distance of 100 yards, wherein an abrupt stop by vehicle 1 does not present a collision danger to vehicle 2, and so the system of vehicle 2 does not retransmit the collision signal. By way of a second example, if vehicle 2 were following at 20 feet at freeway speed, then the collision avoidance signal from vehicle 1 based on hard braking or excessive closing speed with a vehicle ahead would be communicated with a high repeat value to approaching traffic. It will be recognized that in so doing the available response time for the approaching vehicles can be substantially increased.

Additionally, or less preferably alternatively, the annunciation is generated as a data communication directed to receivers located in approaching vehicles. Signals are received from previous vehicles (vehicles ahead) from an antenna 1930, preferably directional and directed forward, which is coupled to interface 1916 containing a receiver (it should be appreciated that the distance sensor and receiver can be implemented as fully separate modules without the need to share interface 1916). The computer thereby receives data from vehicles up ahead as to the dangers that exist. A transmitter 1932 is shown coupled to a directional antenna 1934, for communicating collision dangers that have been detected within this vehicle and those received from vehicles up ahead, insofar as the signal depth of repeatability remains valid to allow for retransmission.

9.0 Traffic Monitoring—Offset Unique Sound-Gen Structures

The following portion describes additional aspects to simplify registration of sound for determining number and speed of vehicles traversing past a traffic registration system.

Patterns of lateral structures are formed over portions of roadway surface. These patterns are misaligned on a lane by lane basis in relation to the microphone wherein sound being generated by one of said patterns as the vehicle traverses it will not be subject to substantial audio interference from other pattern structures on other lanes.

Each pattern preferably comprises a substantially unique pattern of either spaces, structure widths, structure heights, and structure audio responses (within the set of lanes upon which the structures exist) so that a particular audio pattern is generated in response to traversal of the structures, and can be readily discerned as to which lane was traversed and the speed over which the traversal occurred.

The structures for generating the sound in response to tire traversal may comprise: grooves formed in the road surface (i.e. when surface applied, surface cut, etc.), structures added to the surface of the road (i.e. paint, adhered strips, texturing, and so forth). It will be appreciated that these lateral structures may be created from one or more of the materials. Variation in width, spacing, structural cross-section, and material provide for generating different sound patterns for a given set of tires under a fixed set of conditions. Using the same material for each lateral strip and varying strip width and spacing allows for creating substantially unique sound patterns which can be matched to the pattern of the structures for determining which lane a vehicle has traversed. The speed with which the pattern is traversed is indicative of the speed of travel.

Furthermore, during testing of the lateral structures a number of additional sound metrics should be discerned wherein the type of vehicle, weight, and so forth may be readily determines.

Figure 44:
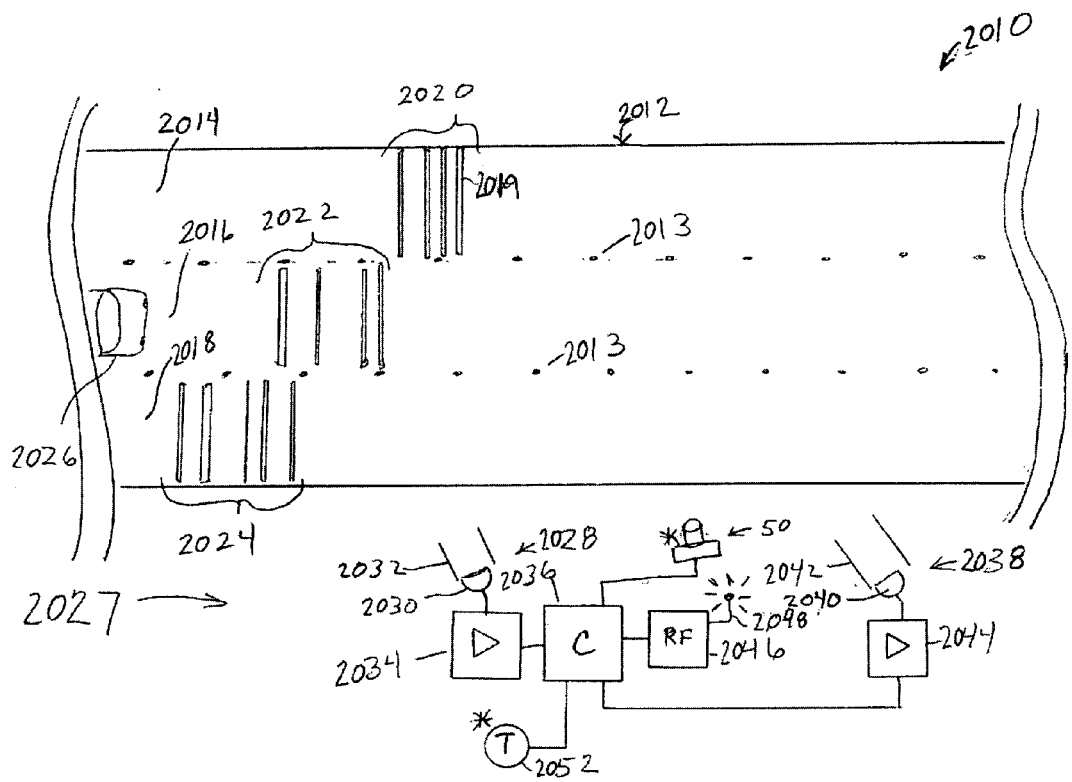
FIG. 44 is a top view of a roadway surface with traffic monitoring system according to an embodiment of the present invention.
Figure 45:
FIG. 45 is a side view of the bumps on the roadway surface of FIG. 44.

FIG. 44–45 exemplifies the use of the present invention 2010, wherein a roadway 2012, shown with roadway dividers 2013 (i.e. Bot's dots) forming three lanes 2014, 2016, 2018, each with lateral acoustic generating structures 2019 in patterned groups 2020, 2022, 2024 that generate a unique pattern of sound for each lane in response to a vehicle 2026 traversal thereupon.

Alternatively, the same pattern may be created for each lane, wherein the sounds may be discerned from one another based on spatial orientation in relation to one or more acoustic pickups, or differentiated in relation to the sounds generated by the vehicles traversing the structures (i.e., different engine sounds, tire to roadway acoustic characteristics, and so forth), and other differentiable characteristics.

A means for registering traversal acoustics 2027 is exemplified as comprising a means for detecting roadway acoustics 2028, such as comprising a microphone 2030, sound director 2032, and signal conditioning circuits 2034. A means for processing the acoustic information 2036 preferably comprises a microprocessor, or DSP (digital signal processing) circuit adapted with software for performing digital signal processing. Alternatively, a neural net processing element or other circuit element capable of discerning acoustic patterns within the registered acoustic information may be utilized. Additional processing elements and acoustic registration elements may be utilized for processing the sound emanating from the roadway as vehicles pass over the lateral structures. A second means for registering traversal acoustics 2038 is shown again by way of example comprising microphone 2040, sound director 2042, and conditioning circuit 2044.

Although a microphone configured to register airborne acoustics is a traditional manner of registering acoustic information, it should be appreciated that acoustics are transmitting through the pavement surface itself. Therefore, a transducer such as an acoustic transducer, surface wave device, accelerometer, and other devices capable of registering vehicle traversal over the lateral structures 2019, may be utilized.

Information being extracted from the acoustic information, such as the number of cars passing by, speed information, accident information, vehicle types, and so forth are communicated by way of any convenient form of communication link, such as wired connection, wireless connection, and so forth. The information may be communicated to other similar units, or to other roadway equipment, such as in a relay manner, or it may be communicated directly to a site that processes the information. A wireless RF device 2046 with antenna 2048 is shown by way of example for communicating the registered information for use.

Optionally a camera is shown 2050 which is configured to capture still or moving images in response to, or in synchronous with the acoustical registration. For example, it may be desirable to capture images and speeds for a large truck as it travels along the road, or to capture images of vehicles traveling at a high rate of speed, for example over 100 mph. It will be appreciated that the acoustics may be utilized in conjunction with image capture to serve a number of purposes.

Additional parametric data may be collected for use at the site, such as temperature data from one or more thermal transducers 2052, which may be located to gauge air temperature, roadway temperature, and so forth. Other forms of sensors may be utilized to detect light levels, humidity, precipitation, rain, and so forth.

As vehicles 2026 pass over the groups of lateral structure 2020, 2022, 2024, a set of unique acoustics are generated for each group, depending upon the pattern and composition of the lateral structures, and the speed and tire characteristics of the vehicle. It will be readily understood that processing techniques devised for voice recognition may be applied or extracting information from the registered acoustics. The pattern of sounds generated by the different groups of lateral structures are more readily discerned as a pattern of sound is created with temporal spacing that matches the structure being traversed for a given speed. Therefore, the presence and speed of the vehicle is easily determined, and additional metrics may be extracted in similar manner to voice recognition algorithms for extracting acoustic characteristics.

Furthermore, the means for registering the acoustics can additionally discern information about the vehicle itself, such as classifications as to large truck, small truck, motorcycle, electric car, economy car, sports car, luxury car, and so forth.

FIG. 45 depicts a roadway surface 2012 configured with a number of different forms of lateral structures 2019. A groove, or channel, 2054 is shown cut into the roadway, a wire 2056 or similar structure, a strip 2058, 2060 attached to the roadway, or a painted strip 2062, 2064. It will be recognized that the lateral structure may comprise any material or adaptation of the roadway that is adapted for generating a different sound than that surrounding roadway surface. Furthermore, lateral structure 2019 may comprise a continuous strip, or a series of structures generally aligned in a lateral region, such as an array of cylindrical protrusions. Lateral structures 2019 may span all or a portion of the lanes and it may be configured in any desired patterns along the roadway.

The means for registering traversal acoustics 2027 may be housed in a number of locations, or existing equipment for detecting roadway information. By way of example, the circuits may be housed within emergency roadside telephone units, structural elements, vertical signs, horizontal sign, under bridges, on light poles, and so forth. The units may be wired to an existing source of power (i.e. AC power, or power from existing unit such as solar) or operated from separate solar power, fuel cells, batteries, and so forth.

The present system generally describes a system for detecting information about vehicles traversing a roadway surface, comprising:

a plurality of lateral structures attached to or within a roadway surface and adapted for generating a sound discernable from the surrounding roadway surface upon being traversed by a vehicle; and means for registering traversal acoustics as vehicles traverse said lateral structures, wherein the number and speed of vehicle traffic is detected.

Accordingly, it will be seen that this invention, Reaction Advantage Anti-Collision Systems and Methods of the present invention may be implemented in a variety of ways and can provide various levels of reaction time advantage to drivers which can translate to a reduction in the number of rear-end collisions which occur each year. The described systems present drivers with information which provides a reaction time advantage to the drivers, while further providing for the blind communication of dangerous events on the highways. The system may be economically produced for widespread adoption, while it requires no infra-structure changes. The systems provide driver information, and do not attempt to completely control the subject vehicles. It will be appreciated, therefore, that system errors and failures can lead only to the loss of driver reaction advantage. Failure modes of the described system and methods thereby reduce both the liability and the cost of implementing the described solutions.

It should be appreciated that each aspect of the invention may generally be practiced independently, or in combinations with elements described herein or elsewhere depending on the application and desired use. Modes may be utilized with the aspects described or similar aspects of this or other devices and/or methods. Embodiments exemplify the modes and aspects of the invention and may include any number of variations and features which may be practiced with the embodiment, separately or in various combinations with other embodiments.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

TABLE 1A

Hard Braking Controller (HBC) Phase IV - Signals by Type

| Signal Name | Use | Phase |
| --- | --- | --- |
| SPI Serial Select & IRQ lines: | | |
| PSense | Pressure & Acc. Sensor data | I |
| PSense IRQ | Active when large sensor change | I |
| Sig Out | Event Signal Output | II |
| Sig Out IRQ | Output Complete | II |
| Sig In IRQ | Event Signal Receipt | II |
| Sig In | Event Signal reception | II |
| Speed | Vehicle Speedometer data | II |
| Compass | Vehicle Direction | II |
| Disp | Display Controller Output | II |
| GPS Data | GPS coordinate data input | III |
| GPS Dta IRQ | GPS data rdy | III |
| GPS Control | GPS control setting | III |
| WPh | Wireless phone data | III |
| WPh IRQ | Wireless phone request | III |
| SPI Serial - Common lines: | | |
| Din | serial Data Input to HBC | I |
| Dout | serial Data Output from HBC | I |
| SClk | serial bit Clock | I |
| Analog Data: | | |
| Swerve | Sense wheel rotation | II |
| Crash | Sense crash impact Gs | II |
| Alert Sensitivity | Sense user setting | II |
| Tailgate value | Sense use setting of tailgate value | IV |
| Special Signals: | | |
| HB Ind | Hard Braking Indicator Power | I |
| Reset | Reset HBC controller signal | I |

TABLE 1B

| Signal Name | Use | Phase |
| --- | --- | --- |
| Digital Output: | | |
| Error | HBC Error indicator drive | I |
| Disp0 | Event indicator bit 0 | II |
| Disp1 | Event indicator bit 1 | II |
| Disp2 | Event indicator bit 2 | II |
| Dist Out | Distance Out signal (INIT) | II |
| SSMute | Sound System Mute | II |
| CanCr | Cancel Cruise Setting | II |
| Brk Lt Mod | Brake Light Modulation | II |
| BrAssist | Brake Assist activation | IV |
| Digital Input: | | |
| E. Flash | Emergency Flasher Sense | II |
| E. 911 | Emergency 911 activation | |
| HdLight | Headlight sense | II |
| Dist In | Distance In signal (ECHO) | II |

TABLE 2

Monitor Circuit Inputs and Outputs

Inputs:

| | |
| --- | --- |
| Log | SPI CS - Log data rcvd from HBC anytime action performed |
| Log IRQ | Monitor can send cmds to HBC |
| BrAssist | Check condition of brake assist |
| HB Ind | Check status of hard braking indicator |
| Sig Out | Monitor signals sent to the event transmitter module |

TABLE 2-continued

Monitor Circuit Inputs and Outputs

Outputs:

| | |
|---|---|
| MClr | Clear/hold in reset mode, the microprocessor of the HBC |
| ERROR | An error indicator |

TABLE 3

Hard Braking Events

| Level | Causitive Event |
|---|---|
| HB1 | Vehicle Collision (Crash!) |
| HB2 | Slamming Brakes |
| HB3 | Hard Braking |
| HB4 | Emergency vehicle/incident |
| HB5 | Emergency Flashers |
| HB6 | Abrupt Swerving |
| HB7 | Condition Report (a serial sequence) |

TABLE 4

Speed versus Event Overrides

| Speed mph | Event Generation Override |
|---|---|
| 0–15 | No Events (Except Crash!) |
| 15–30 | Visual Indicator Only |
| 30–45 | No Regeneration of event signal |
| >45 | ALL Functions |

TABLE 5

Sensor Threshold Values

| Meas. Param | Value | Threshold |
|---|---|---|
| Pressure | L | <2 lbs |
| | M | 2–10 lbs |
| | H | 10–20 lbs |
| | VH | >20 lbs |
| Delta Press. | L | <0.05 lb/ms$^2$ |
| | M | 0.05–0.10 lb/ms$^2$ |
| | H | >0.10 lb/ms$^2$ |
| Acceleration | L | <15 microns/ms$^2$ |
| | H | >15 microns/ms$^2$ |

TABLE 6

Events registered from inactive state

| P | D P | Event |
|---|---|---|
| L | L | -none- |
| L | M | -Alert- |
| L | H | HB3 |
| M | L | -none- |
| M | M | -none- |
| M | H | HB3 |
| H | L | HB3 |
| H | M | HB2 |
| H | H | HB2 |
| VH | L | HB2 |
| VH | M | HB2 |
| VH | H | HB2 |

TABLE 7

Events registered from HB3 state

| P | D P | Event |
|---|---|---|
| L | L | -none- |
| L | M | -Alert- |
| L | H | HB3 |
| M | L | -none- |
| M | M | HB3 |
| M | H | HB3 |
| H | L | HB3 |
| H | M | HB2 |
| H | H | HB2 |
| VH | L | HB2 |
| VH | M | HB2 |
| VH | H | HB2 |

TABLE 8

Event Signal Data Packet

| Description | No. Bits |
|---|---|
| HB Level | 3 |
| Active event flag | 1 |
| Regen Number | 3 |
| Aux. Data Flag | 1 |
| Slot number | 4 |
| Direction | 4 |
| ID number | 32 |
| *Aux Position Data | 32 |
| Checksum | 8 |

TABLE 9

HB7 Event Signal Data Packet

| Description | No. Bits |
|---|---|
| HB Level | 3 |
| — | 1 |
| Direction | 4 |
| Packet Number | 4 |
| Total Number of Packets | 4 |
| Packet Data | 64 |
| Checksum | 8 |

What is claimed is:

1. An anti-collision system for use within a motorized vehicle, comprising:
   means for sensing the urgency with which the brakes of a first vehicle are being activated and generating a first alert signal in response thereto;
   a visual indicator directed rearwardly of said first vehicle and configured to respond to said first signal;
   means for rearwardly communicating said first alert signal as a second alert signal, in the radio-frequency signal spectrum, said second signal configured to include vehicle position related data for qualifying said second alert signal upon receipt by anti-collision systems within vehicles following said first vehicle toward providing advance warning to drivers for the avoidance of collisions;
   wherein said position related data for qualifying said second alert signal comprises heading information and/or locating coordinates of said vehicle generating said second alert signal;
   wherein upon receipt said position related data may be compared with heading and/or locating coordinates by the anti-collision system within another vehicle and said alert signal ignored if generated from a sufficiently different heading or location; and wherein said means for rearwardly communicating is adapted for generating multiple levels of alert severity, including crash events associated with a collision along with levels of hard braking and swerving.

2. An anti-collision system as recited in claim 1, wherein the means for sensing the urgency of said brake activation comprises a pressure sensor responsive to the pressure with which the brake is being applied.

3. An anti-collision system as recited in claim 1, wherein the means for sensing the urgency of said brake activation comprises an acceleration sensor responsive to the acceleration to which the brake pedal is being subjected.

4. An anti-collision system as recited in claim 1, wherein said visual indicator comprises a circuit adapted for activating the reverse lights of said vehicle in response to said first alert signal and of being seen from behind said vehicle.

5. An anti-collision system as recited in claim 1, wherein said means for rearwardly communicating said first alert signal comprises a remote communications link adapted for generating second alert signals which include signal retransmission control data for limiting the dissemination of said alert signals.

6. An anti-collision system for communicating events from a first vehicle to secondary vehicles following said first vehicle for increasing the available reaction time provided to the drivers of said secondary vehicles, comprising:

a sensor configured for attachment to the braking system of said first vehicle and configured to generate an alert signal in response to the urgency with which the brakes are applied by the driver of said first vehicle;

a visual indicator directed rearwardly from said first vehicle which is adapted to annunciate said alert signal;

a controller operably coupled to said sensor and configured to remotely communicate said alert signal including signal regeneration data to activate event indicators within secondary vehicles;

wherein event signal regeneration is controlled by the transmission of a regeneration limiter value encoded within the transmitted event signal that limits the number of consecutive times that said alert signal may be retransmitted by a controller not associated with the vehicle originally registering the event; and wherein said limitation on consecutive number of retransmissions depends on which of multiple severity levels the alert signal belongs.

7. An anti-collision system as recited in claim 6, wherein the urgency of brake application is characterized by said sensor responding to changes in applied brake pedal pressure.

8. An anti-collision system as recited in claim 6, wherein said sensor is mounted to the brake pedal, or within the linkages connecting to the brake pedal.

9. An anti-collision system as recited in claim 6, wherein the urgency of brake application is characterized by said sensor in response to brake pedal accelerations.

* * * * *